United States Patent
Wexler

(10) Patent No.: US 8,923,650 B2
(45) Date of Patent: Dec. 30, 2014

(54) SYSTEM AND METHOD OF MEASURING DISTANCES RELATED TO AN OBJECT

(71) Applicant: Ronald M. Wexler, Rochester, NY (US)

(72) Inventor: Ronald M. Wexler, Rochester, NY (US)

(73) Assignee: WexEnergy Innovations LLC, Rochester, NY (US)

( * ) Notice: Subject to any disclaimer, the term of this patent is extended or adjusted under 35 U.S.C. 154(b) by 103 days.

(21) Appl. No.: 13/735,449

(22) Filed: Jan. 7, 2013

(65) Prior Publication Data

US 2014/0193039 A1 Jul. 10, 2014

(51) Int. Cl.
*G06K 9/36* (2006.01)
*G01C 11/04* (2006.01)

(52) U.S. Cl.
CPC ..................... *G01C 11/04* (2013.01)
USPC ........................................................ 382/286

(58) Field of Classification Search
None
See application file for complete search history.

(56) References Cited

U.S. PATENT DOCUMENTS

| | | | |
|---|---|---|---|
| 3,069,654 A | 12/1962 | Hough | |
| 4,189,880 A | 2/1980 | Ballin | |
| 4,380,140 A | 4/1983 | Abbott | |
| 4,399,640 A | 8/1983 | Porter | |
| 4,453,585 A | 6/1984 | Ruggeberg, Sr. et al. | |
| 5,390,454 A | 2/1995 | Coddens | |
| 5,649,389 A | 7/1997 | Coddens | |
| 5,732,760 A | 3/1998 | Pattison | |
| 5,737,885 A | 4/1998 | Stoyke | |
| 6,400,848 B1 | 6/2002 | Gallagher | |
| 6,848,492 B2 | 2/2005 | Thomas | |
| 7,038,701 B2 | 5/2006 | Niemi | |
| 7,293,368 B1 | 11/2007 | Faulk et al. | |
| 7,487,598 B2 | 2/2009 | Krachtus | |
| 7,625,595 B2 | 12/2009 | Zhuang et al. | |
| 7,675,057 B2 | 3/2010 | Drechsel et al. | |
| 7,847,711 B2 | 12/2010 | Niemi et al. | |
| 7,893,963 B2 | 2/2011 | Gallagher et al. | |
| 7,912,320 B1 * | 3/2011 | Minor | 382/286 |
| 7,912,743 B2 | 3/2011 | Kollman | |
| 2004/0096578 A1 | 5/2004 | Colwell | |
| 2004/0233280 A1 | 11/2004 | Aoyama | |
| 2004/0261959 A1 | 12/2004 | Forcelli | |
| 2005/0228614 A1 * | 10/2005 | Usbeck et al. | 702/179 |

(Continued)

OTHER PUBLICATIONS

UPHOTOMEASURE. 2010. Photograph It. It's Measured, accessed via http://www.uphotomeasure.com/UPM_a2/index.html. Jan. 25, 2013.

(Continued)

*Primary Examiner* — Tahmina Ansari
(74) *Attorney, Agent, or Firm* — Woods Oviatt Gilman LLP; Howard Zaretsky, Esq.

(57) ABSTRACT

A system and method for the measurement of distances related to an object depicted in an image. One aspect including delivery of supplemental materials for fenestration and for constructing insulating materials for fenestration. A digital image containing a primary object dimension and a reference object dimension in substantially the same plane undergoes digital image processing to provide improved measurement capability. Information regarding a primary object is provided to an automated measurement process, design and manufacturing system to provide customized parts to end users. A digital image is obtained having an observable constraint dimension to which a customized part is to conform wherein the digital image contains a reference object having a reference dimension and a constraint dimension is calculated from the digital image based on a reference dimension. The custom part is designed and manufactured based on the calculated constraint dimension.

20 Claims, 25 Drawing Sheets

(56) References Cited

U.S. PATENT DOCUMENTS

| | | |
|---|---|---|
| 2007/0065004 A1* | 3/2007 | Kochi et al. .................... 382/162 |
| 2007/0100490 A1* | 5/2007 | Hartt et al. .................... 700/134 |
| 2007/0168153 A1 | 7/2007 | Minor et al. |
| 2007/0188633 A1 | 8/2007 | Mandy et al. |
| 2008/0198177 A1 | 8/2008 | Niemi et al. |
| 2010/0079683 A1 | 4/2010 | Kobori et al. |
| 2010/0172546 A1 | 7/2010 | Sharp |
| 2012/0105825 A1* | 5/2012 | Gogolla et al. .................... 356/8 |
| 2012/0125419 A1 | 5/2012 | Pfeiffer et al. |
| 2012/0262553 A1 | 10/2012 | Chen et al. |
| 2013/0011069 A1* | 1/2013 | Quan et al. .................... 382/190 |

OTHER PUBLICATIONS

Ballard, D. & Brown, C., 1982. Computer Vision, Chapter 4, pp. 123-131. Prentice Hall.

RULERPHONE. Measure anything your iPhone can take a picture of, accessed via http://benkamens.com/rulerphone. Jan. 31, 2013.

* cited by examiner

SYSTEM AND METHOD OF MEASURING DISTANCES RELATED TO AN OBJECT

FIELD OF THE INVENTION

The present invention relates generally to image processing and in particular a system and method for measuring the distances related to an object depicted in an image. One aspect of the invention relates to energy efficiency for buildings and other habitable structures, whether static or mobile and includes improved methods for the measurement and delivery of supplemental materials for fenestration. In another aspect, the invention relates to improved methods and apparatus for constructing insulating materials for fenestration.

BACKGROUND OF THE INVENTION

In recognition of the ecological and cost impact of fossil fuels and other conventional energy sources, significant effort has been expended in developing methods for more efficient use of such energy sources. An important area of energy use for which greater energy efficiency is needed is the heating and cooling of spaces in which human activity is desired. Many approaches have been developed to decrease the amount heat transfer through the shell of such spaces. One of the most active and important areas of activity is the transfer of energy through fenestration where the activity has included use of window films or inserts, increasing the number of glazings per opening, and window treatments such as drapes, blinds, etc. While these approaches have shown considerable improvement in building energy efficiency, significant problems prevent more widespread and effective utilization.

Several problems exist in the approaches to minimizing heat transfer through fenestration. In particular for existing windows, it is desirable to maintain the optical transparency opening, operation of the window treatments and windows and the aesthetics of the interior view of the window while providing thermal insulation. Furthermore, reuse of the insulating materials is highly desirable so that new materials do not need to be purchased each season. When adding supplemental window elements such as films, film support elements and window treatments, ease of installation (including measurement and fabrication), reusability and storage and aesthetics during and after use are very important while obtaining the thermal and radiation insulation desired. With window films intended for creating an additional "dead air" space adjacent to the window as well as window treatments, accurate measurement of the film dimensions is necessary, often requiring the assistance of a professional with the associated added cost and time. Other window films, such as tints or low-e films, adhere directly to the window pane and encounter the similar issues.

SUMMARY OF THE INVENTION

The present invention is a system and method for measuring distances and delivery of supplemental materials and for constructing insulating materials for fenestration. One embodiment of the present invention provides a method of photogrammetric measurement in which a digital image is obtained that contains a primary object dimension and a reference object dimension in substantially the same plane or line. The digital image may then undergo digital image processing to provide improved measurement capability. In embodiments of the present invention, information regarding a primary object, such as fenestration, and its immediate surroundings is provided to an automated or semi-automated measurement process, design and manufacturing system such that customized parts are provided to end users. In one method of the present invention, a digital image is obtained that contains at least a portion of an observable constraint dimension to which a customized part is to conform wherein the digital image contains a reference object having a reference dimension and calculating a constraint dimension from the digital image based on a reference dimension. The custom part is then designed and manufactured based on a calculated constraint dimension.

Another embodiment of the present invention provides an improved information gathering method and data extraction where the measurements used to design custom parts that meet the needs of the fenestration and user are obtained from photographic information, e.g., digital images. The customized parts may include materials that provide for thermal insulation, emissivity control, tinting or support for such materials.

The invention provides improved means for installing fenestration materials that allow for re-use of fenestration materials. To aid in the re-use of the fenestration materials, the invention provides for identifying marks on the fenestration materials so that re-installation by the end user is simplified.

The invention provides improved fenestration materials allowing for operability of other fenestration mechanisms such as those needed for opening/closing windows or their associated treatments, such as blinds. The invention provides improved means for supporting materials whose optimal positioning is dependent upon external factors such as the weather. Such means allows for fewer parts needed for optimal energy performance to maintain comfortable conditions within the room associated with the fenestration.

The invention provides improved means for storing supplemental fenestration materials and support means when not in use. The invention provides improved means of providing low cost thermal insulation to fenestration. When designing improved means, asymmetric parts may be preferred so as to provide sturdy mounting of the supplemental parts while also inhibiting formation of convective loops.

Another embodiment of the present invention provides a window covering and support frame that are removable and reusable. In one such embodiment, multiple alternating adhesive and non-adhesive layers are used to mount the covering and frame, while in another embodiment pressure and friction are used to mount and hold covering and frame. A further embodiment provides for reversibly sealing a window covering to provide access to operable aspects of primary or secondary objects. Yet another embodiment provides support frame elements having a continuously compressible means and a multi-position adjustable means for changing the length of the frame elements.

The advantages of the system and method of measuring distances and providing supplemental fenestration materials associated with fixed buildings, mobile homes, travel trailers and other habitations include the following.

The ease of specification, assembly and installation of the supplemental element is improved for the end user. The involvement of the end user in specifying, fabricating and installing the supplemental element is minimized. The end user's involvement is relatively easy to perform so the end user does not require a professional and requires minimal time commitment.

The initial financial commitment for the end user is relatively low. By keeping the initial end user financial outlay low, very short payback periods and high returns on investment may be realized.

The supplemental element is capable of being reused. This relates to the long-term cost and overall sustainability and environmental impact of the supplemental elements. In addition to keeping the societal impact of the element low, the ability to reuse the element for multiple seasons increases the return on the initial investment and minimizes the payback period for the purchase.

The supplemental element can be easily stored when it is not in use. Since it may be desirable to use the supplemental elements intermittently, convenient storage is needed when not in use. Elements that may become compact, easy to transport or storable within the fenestration are highly desirable.

The aesthetics of the fenestration during and after use of the supplemental element can be maintained. This relates to maintaining the appearance of the interior view of the fenestration and its immediate surrounding as well as the ability to see through the fenestration when desired. Also, it relates to the ability to return the fenestration to its original state when the supplemental element is not being used.

Operability of the fenestration and associated treatment during use of the supplemental element can be maintained without the need to demount the supplemental element. Since the fenestration is often designed for opening and closing, it is beneficial to maintain this capability while the supplemental element is in place. This would allow for temporarily bringing fresh air into the space adjacent to the fenestration. This can be particularly useful during periods of moderate temperatures within a heating or cooling season.

Ability to gain energy efficiency improvement during both heating and cooling seasons. The advent of low-emissivity coatings for window films provides for additional energy savings. Optimal placement of such films, however, requires the ability to move such films to either keep heat in during the heating season or keep heat out in the cooling season.

There is no waste material generated at the point of installation. This relates to cost and sustainability of the supplemental elements. The end user does not generate any waste and does not need to dispose of unused materials or find a way to recycle such waste materials.

The accuracy of the automated measurement is relatively high. This relates to ease of use and removing the potential for end user error from the process. The existence of easily obtained and ubiquitous standard objects in an automated process allows the process to provide accurate measurement of object dimensions and color. This is important for end user satisfaction and minimizing return of product. Also, accuracy is necessary to minimize the amount of material used in the supplemental element and to meet the minimum standard width of window casings of about two and a quarter inches, mullions in complex windows having a width of about two inches or windows with a sash stile or rail width of about one and a quarter inches. Thus, measurement accuracy impacts cost, waste and ease of use.

There is a capability for visual confirmation of designed parts and remote or customized support of end user installation. This relates to the ease with which a design may be confirmed by the end user prior to fabrication. Since the end user and service provider or fabricator may view the same image easily, any necessary correction to the design prior to fabrication is facilitated by the use of a digital image. In addition, the digital image may be used as part of remote installation support or customized media that may be used by the end user for each installation. This enhances end user satisfaction with the delivered product and minimizes waste of time and materials due to design error.

There is thus provided in accordance with the invention, a method of determining measurements for designing a part, said method comprising obtaining a digital image containing at least a primary object constraint dimension to which said part is to conform and a reference object having a known reference object dimension, calculating a planar constraint dimension from said digital image in accordance with said reference dimension, and wherein said digital image is obtained substantially within a projection of said primary object.

There is also provided in accordance with the invention, a method of obtaining a measurement from a digital image, said method comprising obtaining said digital image containing the measurement to be obtained and a reference object having a known reference object dimension substantially in the plane of the distance to be measured, said measurement plane nearly parallel to the digital image plane, correcting distortion of said digital image, calculating a pixel calibration factor relating the known reference dimension to the corrected digital image, and determining said measurement in accordance with said pixel calibration factor.

There is further provided in accordance with the invention, a system for measuring a distance in a digital image, comprising a receiving unit operative to receive a digital image containing said distance to be measured and a reference object having a known reference object dimension substantially in the plane of the distance to be measured, said measurement plane nearly parallel to the digital image plane, an image processing unit operative to correct distortion of said digital image, calculate a pixel calibration factor relating the known reference object dimension to the corrected digital image, and calculate said distance in accordance with said pixel calibration factor.

BRIEF DESCRIPTION OF THE DRAWINGS

The invention is herein described, by way of example only, with reference to the accompanying drawings, wherein.

DETAILED DESCRIPTION OF THE INVENTION

Figure 1:
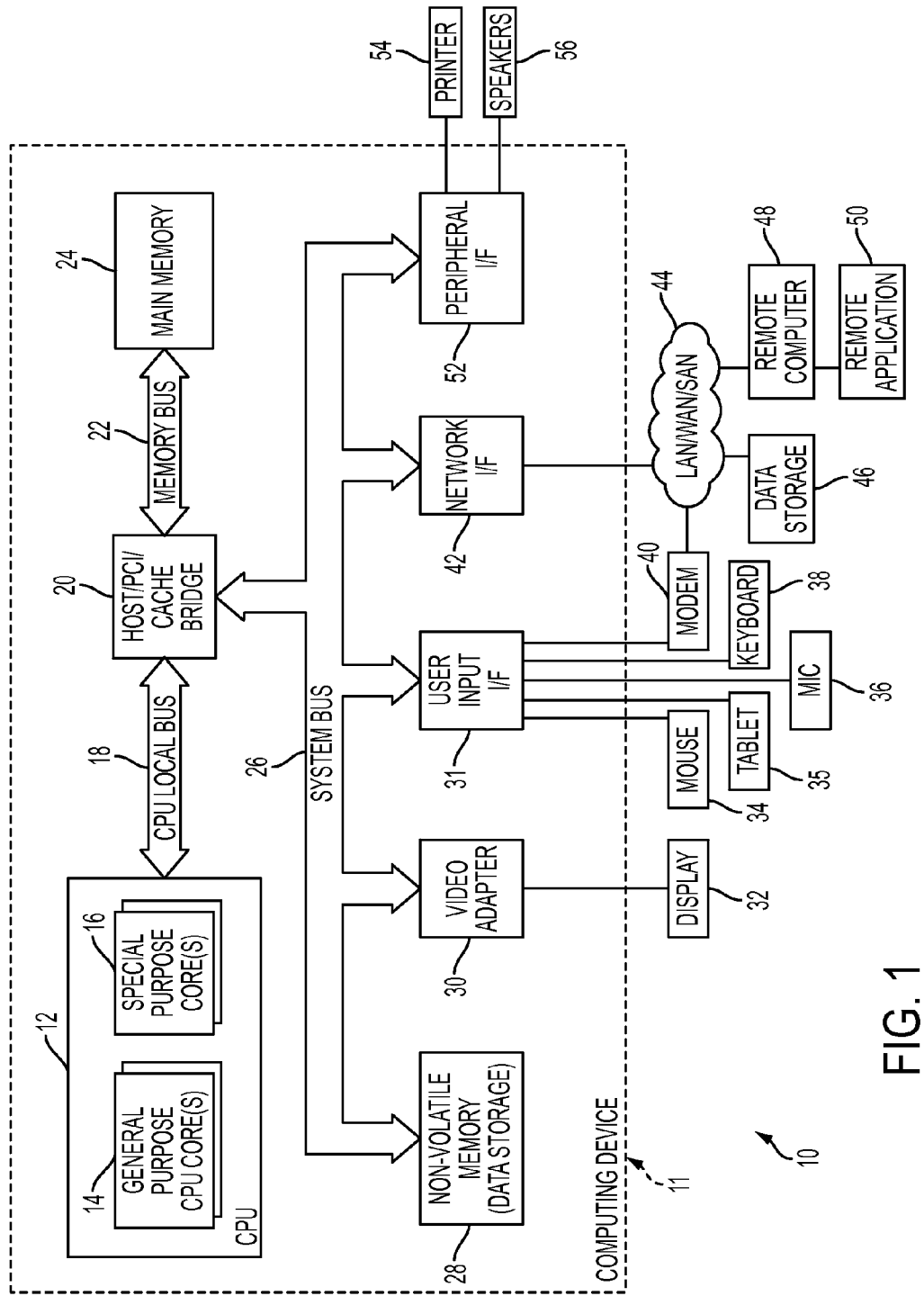
FIG. 1 is a block diagram illustrating an example computer processing system adapted to implement the measurement and image processing mechanism of the present invention.

The present invention is a system and method for the measurement of distances related to an object depicted in an image, a method of delivery of supplemental materials and a method and apparatus for constructing insulating materials for fenestration. One embodiment of the invention includes a method of photogrammetric measurement in which a digital image is obtained that contains a primary object dimension and a reference object dimension in substantially the same plane or line. The digital image then undergoes digital image processing to provide improved measurement capability. In embodiments of the present invention, information regarding a primary object, such as fenestration, and its immediate surroundings is provided to an automated or semi-automated measurement process, design and manufacturing system such that customized parts are provided to end users. In one method of the present invention, a digital image is obtained that contains at least a portion of an observable constraint dimension to which a customized part conforms wherein the digital image contains a reference object having a reference dimension. A constraint dimension is then calculated from the digital image based on a reference dimension. The custom part is then designed and manufactured based on a calculated constraint dimension.

As will be appreciated by one skilled in the art, one or more embodiments of the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention or portions thereof may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), optical storage device or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

A block diagram illustrating an example computer processing system adapted to implement the distance measurement and image-processing mechanism of the present invention is shown in FIG. 1. The exemplary computer processing system, generally referenced 10, for implementing the invention comprises a general purpose computing device 11. Computing device 11 comprises central processing unit (CPU) 12, host/PCI/cache bridge 20 and main memory 24.

The CPU 12 comprises one or more general purpose CPU cores 14 and optionally one or more special purpose cores 16 (e.g., DSP core, floating point, etc.). The one or more general purpose cores execute general purpose opcodes while the special purpose cores executes functions specific to their purpose. The CPU 12 is coupled through the CPU local bus 18 to a host/PCI/cache bridge or chipset 20. A second level (i.e. L2) cache memory (not shown) may be coupled to a cache controller in the chipset. For some processors, the external cache may comprise an L1 or first level cache. The bridge or chipset 20 couples to main memory 24 via memory bus 20. The main memory comprises dynamic random access memory (DRAM) or extended data out (EDO) memory, or other types of memory such as ROM, static RAM, flash, and non-volatile static random access memory (NVSRAM), bubble memory, etc.

The computing device 11 also comprises various system components coupled to the CPU via system bus 26 (e.g., PCI). The host/PCI/cache bridge or chipset 20 interfaces to the system bus 26, such as peripheral component interconnect (PCI) bus. The system bus 26 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 28, video/graphics adapter 30 connected to display 32, user input interface (I/F) controller 31 connected to one or more input devices such mouse 34, tablet 35, microphone 36, keyboard 38 and modem 40, network interface controller 42, peripheral interface controller 52 connected to one or more external peripherals such as printer 54 and speakers 56. The network interface controller 42 is coupled to one or more devices, such as data storage 46, remote computer 48 running one or more remote applications 50, via a network 44 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 28 may include various removable/non-removable, volatile/nonvolatile computer storage media, such as hard disk drives that reads from or writes to non-removable, nonvolatile magnetic media, a magnetic disk drive that reads from or writes to a removable, nonvolatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 31. Examples of input devices include a keyboard and pointing device, mouse, trackball or touch pad. Other input devices may include a microphone, joystick, game pad, satellite dish, scanner, etc.

The computer 11 may operate in a networked environment via connections to one or more remote computers, such as a remote computer 48. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 11 is connected to the LAN 44 via network interface 42. When used in a WAN networking environment, the computer 11 includes a modem 40 or other means for establishing communications over the WAN, such as the Internet. The modem 40, which may be internal or external, is connected to the system bus 26 via user input interface 31, or other appropriate mechanism.

The computing system environment, generally referenced 10, is an example of a suitable computing environment and is not intended to suggest any limitation as to the scope of use or functionality of the invention. Neither should the computing environment be interpreted as having any dependency or requirement relating to any one or combination of components illustrated in the exemplary operating environment.

In one embodiment, the software adapted to implement the system and methods of the present invention can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another embodiment, software adapted to implement the system and methods of the present invention is adapted to reside on a computer readable medium. Computer readable media can be any available media that can be accessed by the computer and capable of storing for later reading by a computer a computer program implementing the method of this invention. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data such as a magnetic disk within a disk drive unit. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well known to those skilled in the art of computer systems.

It is noted that computer programs implementing the system and methods of this invention will commonly be distributed to users via Internet download or on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Figure 2:
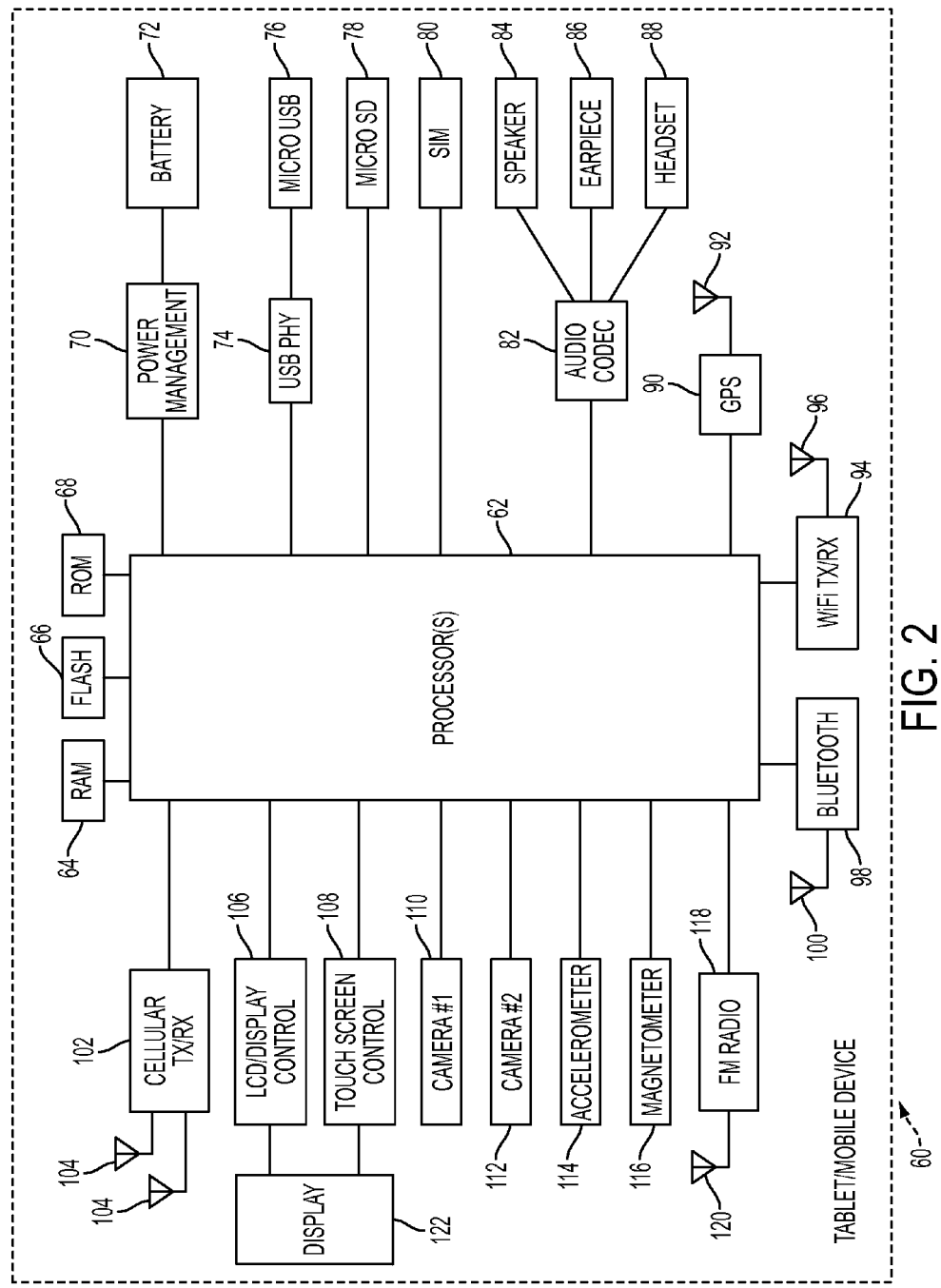
FIG. 2 is a high level block diagram illustrating an example tablet/mobile device incorporating the measurement and image processing mechanism of the present invention.

Tablet/Mobile Device Incorporating the Mechanism for Measuring the Distances Related to an Object A high-level block diagram illustrating an example tablet/mobile device incorporating the distance measuring mechanism of the present invention is shown in FIG. 2. The mobile device is preferably a two-way communication device having voice and/or data communication capabilities. In addition, the device optionally has the capability to communicate with other computer systems via the Internet. Note that the mobile device may comprise any suitable wired or wireless device such as multimedia player, mobile communication device, digital still or video camera, cellular phone, smartphone, PDA, PNA, Bluetooth device, tablet computing device such as the iPad, Surface, Nexus, etc. For illustration purposes only, the device is shown as a mobile device, such as a cellular based telephone, smartphone or superphone. Note that this example is not intended to limit the scope of the mechanism as the invention can be implemented in a wide variety of communication devices. It is further appreciated the mobile device shown is intentionally simplified to illustrate only certain components, as the mobile device may comprise other components and subsystems beyond those shown.

The mobile device, generally referenced 60, comprises one or more processors 62 which may comprise a baseband processor, CPU, microprocessor, DSP, etc., optionally having both analog and digital portions. The mobile device may comprise a plurality of cellular radios 102 and associated antennas 104. Radios for the basic cellular link and any number of other wireless standards and Radio Access Technologies (RATs) may be included. Examples include, but are not limited to, Code Division Multiple Access (CDMA), Personal Communication Services (PCS), Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc.

The mobile device may also comprise internal volatile storage 64 (e.g., RAM) and persistent storage 68 (e.g., ROM) and flash memory 66. Persistent storage 68 also stores applications executable by processor(s) 62 including the related data files used by those applications to allow device 60 to perform its intended functions. Several optional user-interface devices include trackball/thumbwheel which may comprise a depressible thumbwheel/trackball that is used for navigation, selection of menu choices and confirmation of action, keypad/keyboard such as arranged in QWERTY fashion for entering alphanumeric data and a numeric keypad for entering dialing digits and for other controls and inputs (the keyboard may also contain symbol, function and command keys such as a phone send/end key, a menu key and an escape key), headset 88, earpiece 86 and/or speaker 84, microphone (s) and associated audio codec or other multimedia codecs, vibrator for alerting a user, one or more cameras and related circuitry 110, 112, display(s) 122 and associated display controller 106 and touchscreen control 108. Serial ports include a micro USB port 76 and related USB PHY 74 and micro SD port 78. Other interface connections may include SPI, SDIO, PCI, USB, etc. for providing a serial link to a user's PC or other device. SIM/RUIM card 80 provides the interface to a user's SIM or RUIM card for storing user data such as address book entries, user identification, etc.

Portable power is provided by the battery 72 coupled to power management circuitry 70. External power is provided via USB power or an AC/DC adapter connected to the power management circuitry that is operative to manage the charging and discharging of the battery. In addition to a battery and AC/DC external power source, additional optional power sources each with its own power limitations, include: a speaker phone, DC/DC power source, and any bus powered power source (e.g., USB device in bus powered mode).

Operating system software executed by the processor 62 is preferably stored in persistent storage (i.e. ROM 68), or flash memory 66, but may be stored in other types of memory devices. In addition, system software, specific device applications, or parts thereof, may be temporarily loaded into volatile storage 64, such as random access memory (RAM). Communications signals received by the mobile device may also be stored in the RAM.

The processor 62, in addition to its operating system functions, enables execution of software applications on the device 60. A predetermined set of applications that control basic device operations, such as data and voice communications, may be installed during manufacture. Additional applications (or apps) may be downloaded from the Internet and installed in memory for execution on the processor. Alternatively, software may be downloaded via any other suitable protocol, such as SDIO, USB, network server, etc.

Other components of the mobile device include an accelerometer 114 for detecting motion and orientation of the device, magnetometer 116 for detecting the earth's magnetic field, FM radio 118 and antenna 120, Bluetooth radio 98 and antenna 100, Wi-Fi radio 94 including antenna 96 and GPS 90 and antenna 92.

Figure 3:
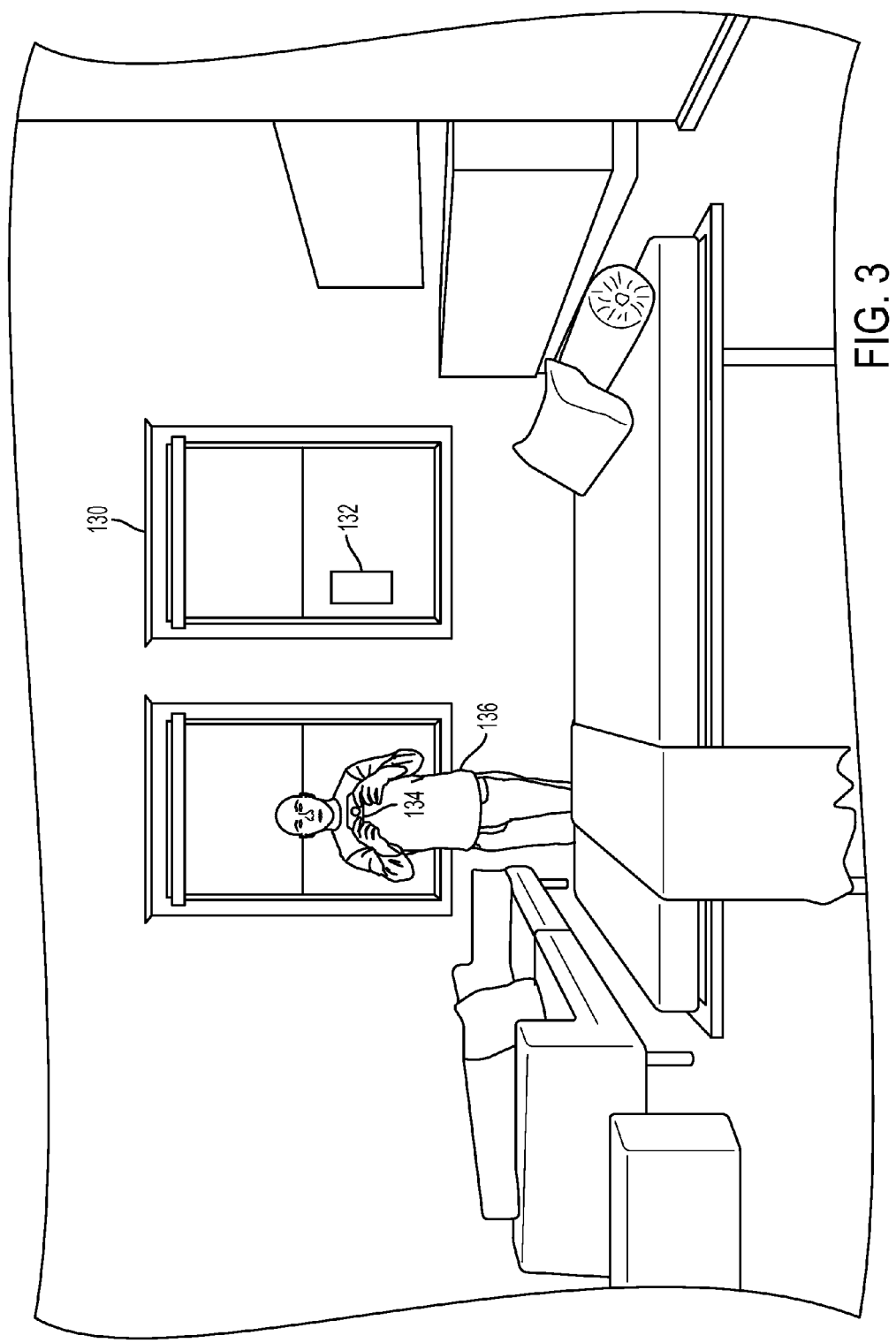
FIG. 3 is a block diagram illustrating an example room in which an end user obtains a digital image of sample window.

In accordance with the invention, the mobile device 60 is adapted to implement the distance measurement and image processing mechanism as hardware, software or as a combination of hardware and software. In one embodiment, implemented as a software task, the program code operative to implement the distance measurement and image processing mechanism is executed as one or more tasks running on processor 62 and either (1) stored in one or more memories 64, 66, 68 or (2) stored in local memory within the processor 62 itself Measurement of Distances Related to an Object and Related Image Processing System A block diagram illustrating an example room in which an end user obtains a digital image of sample window is shown in FIG. 3. The distance measurement mechanism enables the automatic measurement of dimensions for a window part from a digital image of the window that includes a reference object in substantially the same plane as the constraint dimension associated with the window. The end user 136 takes a photograph, using a digital image acquisition device such as digital camera 134, which includes a window 130 and the reference object 132. Knowledge of the reference object dimensions is used to calculate any dimensions needed for fabrication of one or more parts for the window. The image processing calculations may be performed on the digital image acquisition device such as a smartphone with built-in camera, on an end user's PC, an external website or any other computing device after the image is uploaded to it.

Figure 4:
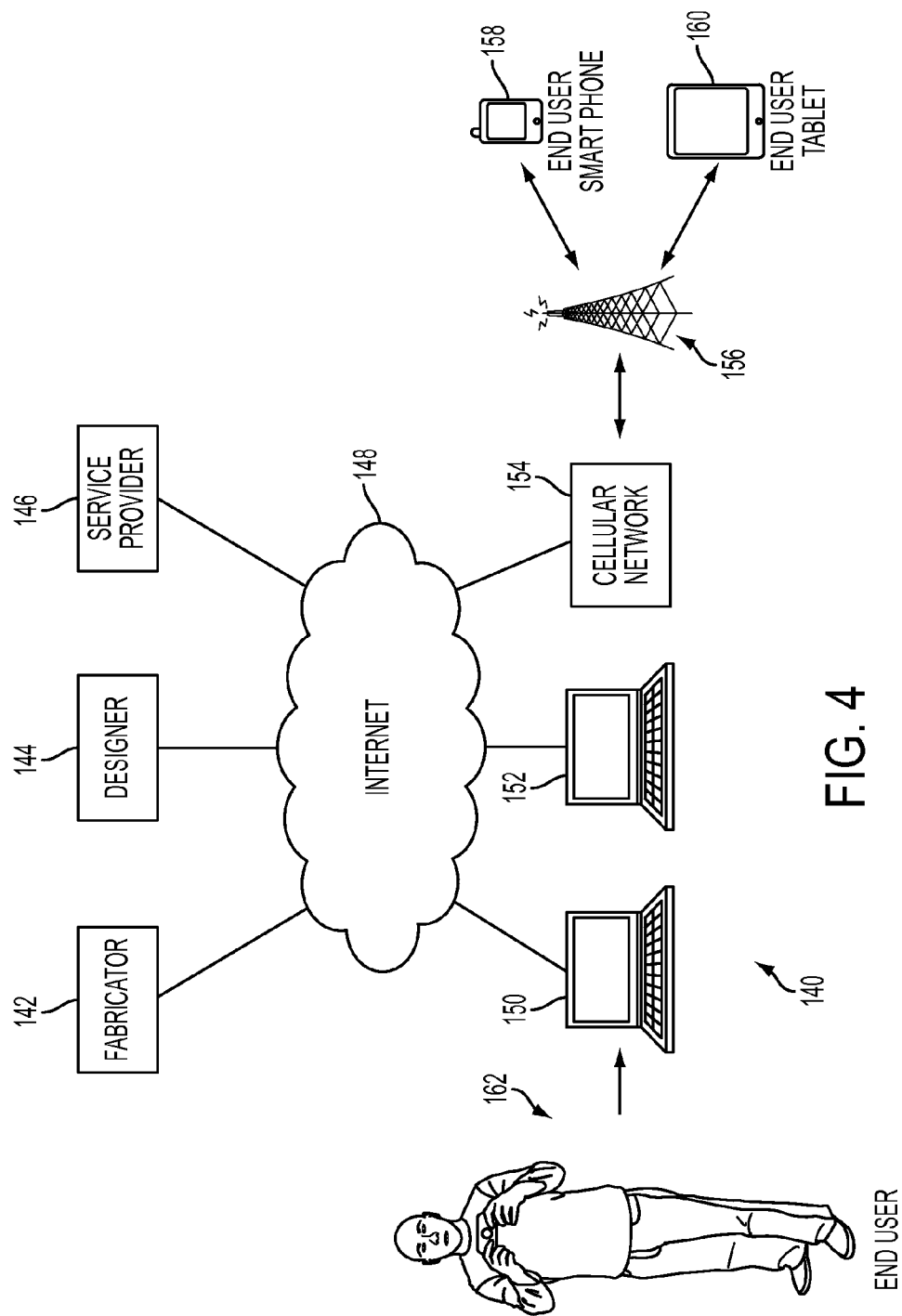
FIG. 4 is a block diagram illustrating an example network showing the data flow between fabricator, designer, service provider and end user.

A block diagram illustrating an example network showing the data flow between fabricator, designer, service provider and end user is shown in FIG. 4. The network, generally referenced 140, comprises an end user 162, PC or other computing device 150, 152 connected to the Internet or other wide area network 148, fabricator 142, designer 144 and service provider 146. End users may also be connected, for example, via smartphone 158 running an appropriate application (app) or a tablet device 160 running an appropriate app. Both the smartphone and tablet are connected to the internet via cellular base stations 156 and the cellular network 154. Note that the tablet and smartphone may be connected to the Internet through WiFi to an access point that is connected to the Internet.

End users communicate with the fabricator, designer and service provider via the Internet and connect via any number of devices such as a tablet (e.g., iPad, Surface, Nexus, etc.) connected via Wi-Fi or through a cellular connection, desktop/laptop (via wired or wireless connection) computer, mobile device such as a smartphone or cellular enabled wireless tablet both in communication with the fabricator, designer and service provider via cellular network (e.g., 3G, 4G, etc.) including base stations.

The fenestration measurement and image processing mechanism provides the capability of accurately measuring and determining the dimensions of one or more parts from a digital image. The system is intended for use on any computer system such as desktop computers, laptop computers, notebook computers, netbook computers, ultrabook computers, wireless mobile devices, mobile phones, tablets, etc. It is however, especially applicable for use on tablets and mobile devices such as the Apple iPad, Android based tablets such as Google Nexus, Microsoft Windows tablets such as the Surface and other tablet formats or smartphones such as the Apple iPhone, Android based smartphones or Windows based smartphones.

Throughout this document the term "website" is used to refer to a user-accessible network site that implements the basic World Wide Web standards for the coding and transmission of hypertext documents. These standards currently include HTML (the hypertext mark up language) and HTTP (the hypertext transfer protocol). Note that the term "site" is not intended to imply a single geographic location as a website or other network site can, for example, include multiple geographically distributed computer systems that are appropriately linked together.

It is to be understood that elements not specifically shown or described herein may take various forms well known to those skilled in the art. Figures provided herein are given to show overall function, operation, and relationships and are not drawn with the intention of showing components or elements to scale. It is also to be understood that while the figures and descriptions provided relate to windows and modifications to windows, the method of the present invention may be used in the design, fabrication or specification of any objects meant to work with, within or to replace a primary object having one dimension that is substantially smaller than the other two dimensions or having a substantially planar face.

Various terms are used in the art to describe aspects of fenestration and windows in particular. In describing the present invention, "window" may refer to a single frame, one or more frames within a complex or an entire complex frame. A "complex" frame refers to multiple windowpanes within the same frame. In describing the present invention, the terms "interior" and "exterior" are used to describe the indoor side and outdoor side, respectively, relative to a perimeter wall in which the fenestration resides. "Inward" and "outward" facing refers to frame surfaces perpendicular to the perimeter wall plane facing toward or away from, respectively, the center of the fenestration.

The term "overlay" is defined as designed to cover an interior or exterior side of a windowpane using as support surfaces such as sash, interior facing trim casing or wall surfaces and includes surfaces that may reside between a screen and windowpane of, for example, casement or awning windows. The term "in-frame" is defined as designed to cover an interior or exterior side of a windowpane using for support surfaces of, for example, jambs or jamb liners, sash channels, stops or inward facing surfaces of trim casing.

The terms "automated", "semi-automated" and "manual" are used to describe different degrees of human intervention in a process by an end-user, professional or service provider. "Manual" refers to a process performed entirely by a human; "automated" refers to a process performed entirely by computational or other electronic devices; and "semi-automated" refers to a process involving computational or other electronic devices with human intervention at a point in the process.

Note that various people or entities may perform different aspects of the present invention. An "end-user" refers to a person or entity or their designee, that specifies, orders, installs or uses the supplemental parts of the present invention and may perform digital image capture, supply metadata and/or confirmation of design steps of the process of the present invention. A "service provider" refers to a person or entity performing a service that is part of the method of the present invention such as reviewing and accepting or confirming orders from an end-user, providing image processing capability, designing (as a "designer"), fabricating (as a "fabricator") or installing (as an "installer") parts, or providing support for installation of such parts.

Other aspects of the present invention relate to dimensions of objects to be measured or imaged. A "primary object" of the present invention refers to an object having a constraint dimension that is measured by one or more methods of the present invention. A "secondary object" of the present invention refers to an object that is associated with a primary object and is intended to be in the vicinity of its associated primary object after a supplemental part has been installed on its associated primary object. In describing the present invention, "constraint dimension" refers to a measured portion or a multiple of a measured portion of a primary object to which a designed part is to conform and a "constraint pixel dimension" refers to the length of a constraint dimension measured in pixels. Similarly, "reference dimension" refers to a reference object dimension whose bounds are detectable in a captured digital image and a "reference pixel dimension" refers to a reference dimension measured in pixels. A primary object may contain a "symmetry element" which in the present invention refers to an aspect of the primary object that in standard practice resides at a position within the primary object such that the symmetry element divides a constraint dimension in an integer number of equal parts.

Embodiments of the present invention contemplate improved method and apparatus for decreasing heat transport through fenestration in which the method of obtaining measurements for custom manufacturing of the insulation and its support is done through photogrammetry using digital images and digital image processing. Other embodiments of the present invention contemplate improved methods and apparatus for supporting, storing and re-using the insulating materials. While the description primarily discusses embodiments related to windows as primary objects, other embodiments may include other planar primary objects such as a wall, ceiling, floor, furniture or portions thereof, artistic painting, poster, photograph, appliance, or any other object where it is desired to estimate a constraint distance or dimension.

Window Measurement Digital Image Processing

One aspect of supplemental window elements that is critical is the attainment of accurate measurement fenestration attributes for proper matching of the supplemental window element to the fenestration. Necessary measurements may include physical dimensions such as width, height and depth as well as color. Such measurements, however, can be time consuming and difficult to achieve for those not accustomed to such work or if the installation site is difficult to access. Depending on the approach, a significant amount of material may be wasted, either from mismatch of delivered product and the area to be covered or from errors made by end users having insufficient fabrication and installation experience. Further, the presence of objects such as furniture or existing window treatments may complicate attainment of requisite measurements. In addition, depending on the type of window, frame and window treatment, supplemental windows may be difficult or impossible to properly install for optimal thermal and radiative insulation.

While prime windows (e.g., single and multiple pane windows generally usable on a stand-alone basis in fixed buildings, mobile homes, travel trailers and other habitations) are sufficient for structural integrity and habitation security, they are often found to be an insufficient thermal and radiation barrier. To conserve the energy necessary for heating and/or cooling a building supplemental windows are employed in addition to the prime windows. Such supplemental windows have included exterior and interior "storm" windows mounted over the prime windows with a "dead air" space therebetween.

Supplemental windows are structurally and functionally distinct from prime windows. Supplemental windows are primarily intended to protect the prime window and reduce thermal losses therethrough. In many instances, supplemental windows are intended to be installed by the building owner and/or relatively inexperienced workers. As a result, supplemental windows are preferably lightweight, uncomplicated and inexpensive. To avoid detracting from the appearance of either the building in general or the prime window itself and to fit within often tight pre-existing spatial constraints, supplemental windows have tended to have minimal framework, the visible bulk of the window assembly being the window panes. Also, "weep holes" or passageways from the environment to the dead air space are usually provided to avoid condensation build up between the exterior storm window and the prime window. Thus, an optimal thermal barrier between the windows is not achieved.

Interior storm windows can be installed regardless of building height and legal restrictions on exterior building appearance, but suffer other disadvantages. Such windows are generally mounted within the window opening or on the interior building wall outside of the window opening. In such cases these windows are preferably constructed with frames from plastic material, such as vinyl, to reduce thermal conductivity, weight, and expense. These materials, however, have been found to sag and warp in response to the weight and thermal stresses particularly in large windows subject to extended periods of direct sunlight. This sagging is destructive of the structural and air seal integrity of the window unit and can increase the difficulty of raising or lowering the window panes. Further, in tall windows vinyl material has been found to lack sufficient rigidity to maintain close air seals between the sides of the window pane and the receiving channels. Moreover, in those instances where such windows are installed within the window opening, custom sizing and installation are typically needed for each window opening, especially when retrofitting such storm windows to older buildings.

In one embodiment, a customer who wishes to have custom windows or supplemental materials must provide the vendor with window dimensions. Alternatively, an estimator/installer obtains the dimensions. These dimensions are manually input by a skilled operator into a computer aided design device (commonly referred to as a CAD) which creates an electronic image which in turn is input to a plotter/cutter. The plotter/cutter generates the sheet of film cut to the custom specifications. The film is then applied to the window by the customer or installer. Alternatively, the customer or estimator/installer may input the dimensions into an input device and directly receive the cut film without utilizing the services of a skilled operator through a service such as www.computercut.com. Such a service provides the cut film order created at a location remote from the source of the film and then sent (by mail, courier, etc.) to the requestor at the remote location.

Note that using other methods other window related custom products such as window treatments or coverings are efficiently delivered. Window coverings are sold in standard sizes by department stores, discount stores and home centers. They are also sold by custom fabricators who come to the home or office, measure the windows and make blinds to fit. Some retailers sell custom blinds based upon measurements provided by the customer. These retailers keep a limited inventory of stock blinds in standard sizes and popular colors. If the customer does not want a blind from the retailer's current inventory, the retailer may custom order the blind from the manufacturer using the customer's measurements.

Stock blinds have a standard width and length and come in a limited number of colors and materials. In a stock blind, lift cords and tilt controls, if any, are in the same location on every blind. In a custom blind, the blind is made to have a length and width that corresponds to the size of the window opening. The customer specifies whether the lift cords and tilt control are to be on the left side or right side of the blind to avoid nearby secondary objects. The customer can often obtain a custom blind in colors not available in stock blinds. Other options may be available to the buyer of a custom blind that are not available in a standard or stock blind.

The alternative window coverings ("AWC") industry provides soft and hard window treatments to customers desiring window coverings other than conventional draperies. Hard window treatments include faux wood and wood horizontal blinds, vinyl and metal horizontal blinds, vertical blinds and interior shutters. Soft window treatments include cellular shades, pleated shades, roller shades, soft shades, vertical blinds and soft window shadings. AWC products are offered to customers through a variety of retail channels, including home product centers, independent retailers, discount department stores, retail fabricators, department stores, catalogs, internet, home builders and interior designers and decorators. Typically, custom-made products are manufactured by a wholesale fabricator or a retail fabricator and then are sold either directly to customers or to a retail source that, in turn, sells the completed product to the customer.

A customer desiring a custom-made window covering typically places an order with a retail source, specifying the features of the finished product desired. Such features can include information about the size of the window, the style, the desired color and various additional options including the type of hardware to be included for mounting and controlling the window covering after installation. The retail source passes the order along to the fabricator. Upon receiving the order, the fabricator cuts the pre-colored bulk material into the size specified by the customer and adds the desired hardware to produce the custom window covering. The completed product is then sold directly to the customer and/or shipped to the retail source.

This fabrication technique has disadvantages for the fabricator. Notable drawbacks include wasted inventory due to the generation of scrap material in the manufacturing process and obsolescence of inventory due to changes in manufacturer color lines. The cost of this wasted inventory is typically absorbed by the fabricator and is typically passed along to the end user or customer.

Figure 5:
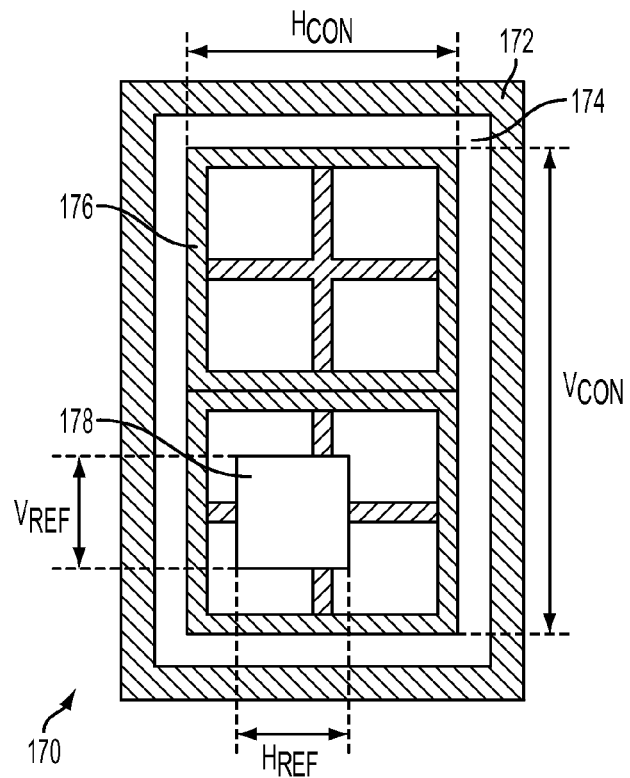
FIG. 5 is a diagram illustrating a sample window and reference object.

A diagram illustrating a sample window and reference dimensions are shown in FIG. 5. The window, generally referenced 170, comprises the wall 172, frame casing 174, top and bottom sash window 176 with muntins, having example constraint dimensions (corresponding in this case to the inward facing frame casing surfaces) $H_{CON}$ and $V_{CON}$ and reference object 178 having dimensions $H_{REF}$ and $V_{REF}$.

Figure 6:
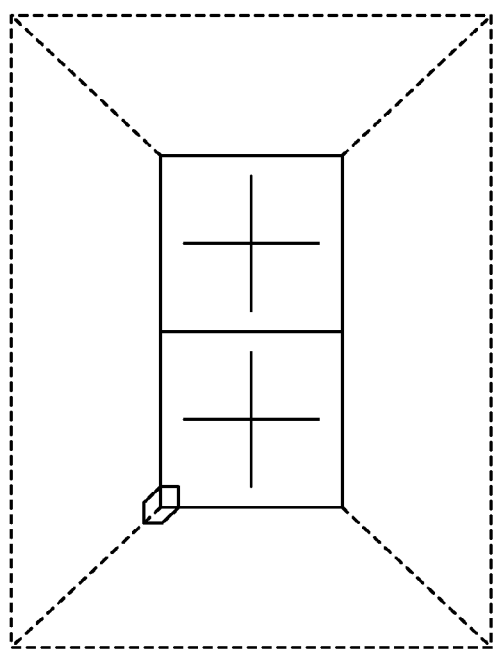
FIG. 6 is a diagram illustrating the volume of space an end user must be in when acquiring the digital image of the window.

A diagram illustrating the volume of space an image acquisition device must be in when acquiring the digital image of the window is shown in FIG. 6. Since the proficiency of end-users capturing the digital images may be highly variable, there are a number of aspects of the image capture that are preferred in order to keep measurement error to a minimum. It is preferable for the camera (image acquisition device) to be substantially within the orthogonal projection of the primary object toward the image acquisition device, in this case substantially within the cuboid volume extending from the window opening into the room in which the window exists, so that the imaging plane is nearly parallel to the plane in which the primary object window/fenestration resides. Image acquisition conditions resulting in $\theta_h$ and $\theta_v$ (shown in FIG. 12) having values less than about 6 degrees for all primary object horizontal and vertical lines, respectively, in the captured digital image are most preferred.

Figure 7A:
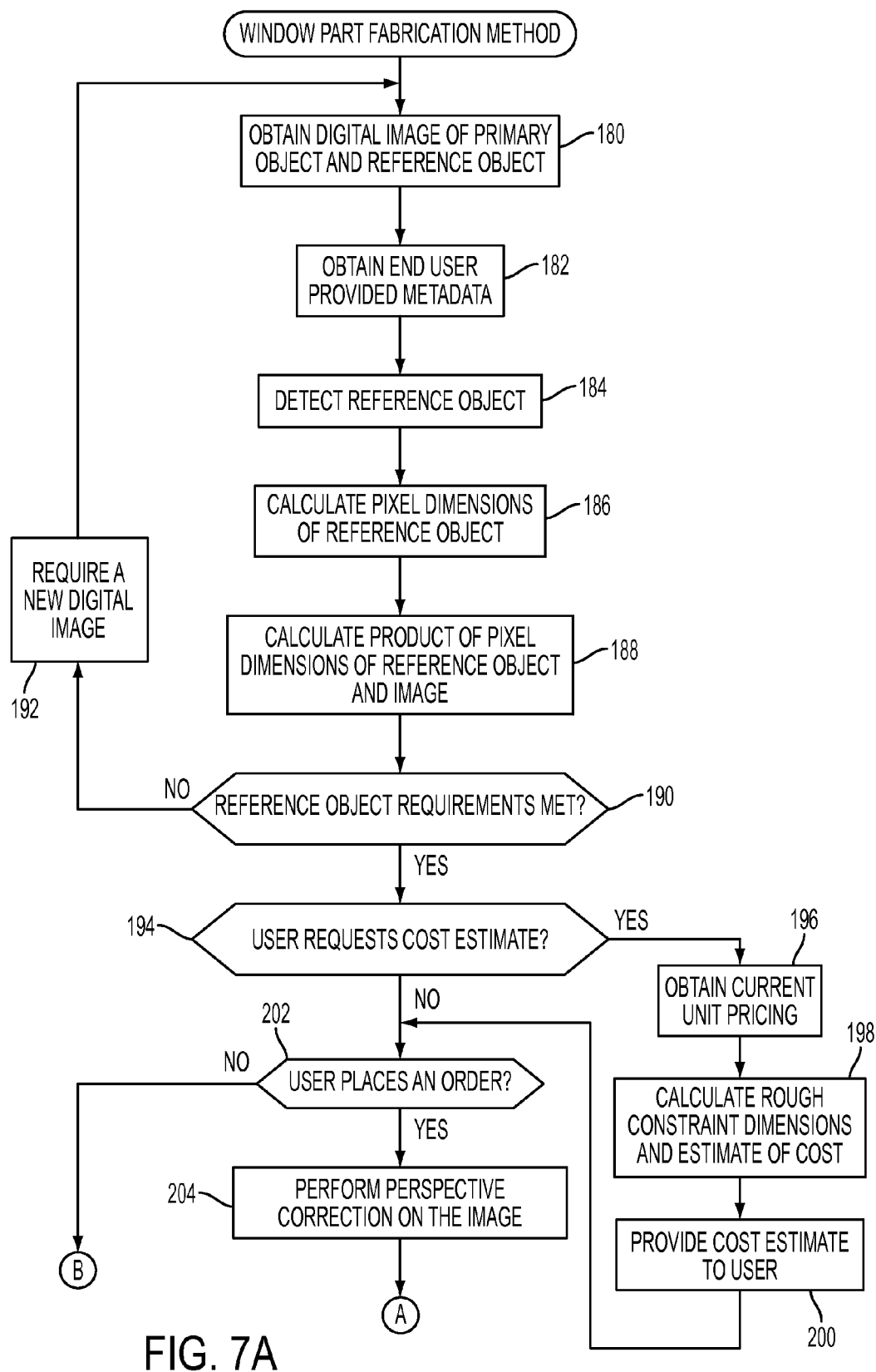
FIGS. 7A and 7B are a flow diagram illustrating an example part fabrication method.
Figure 7B:
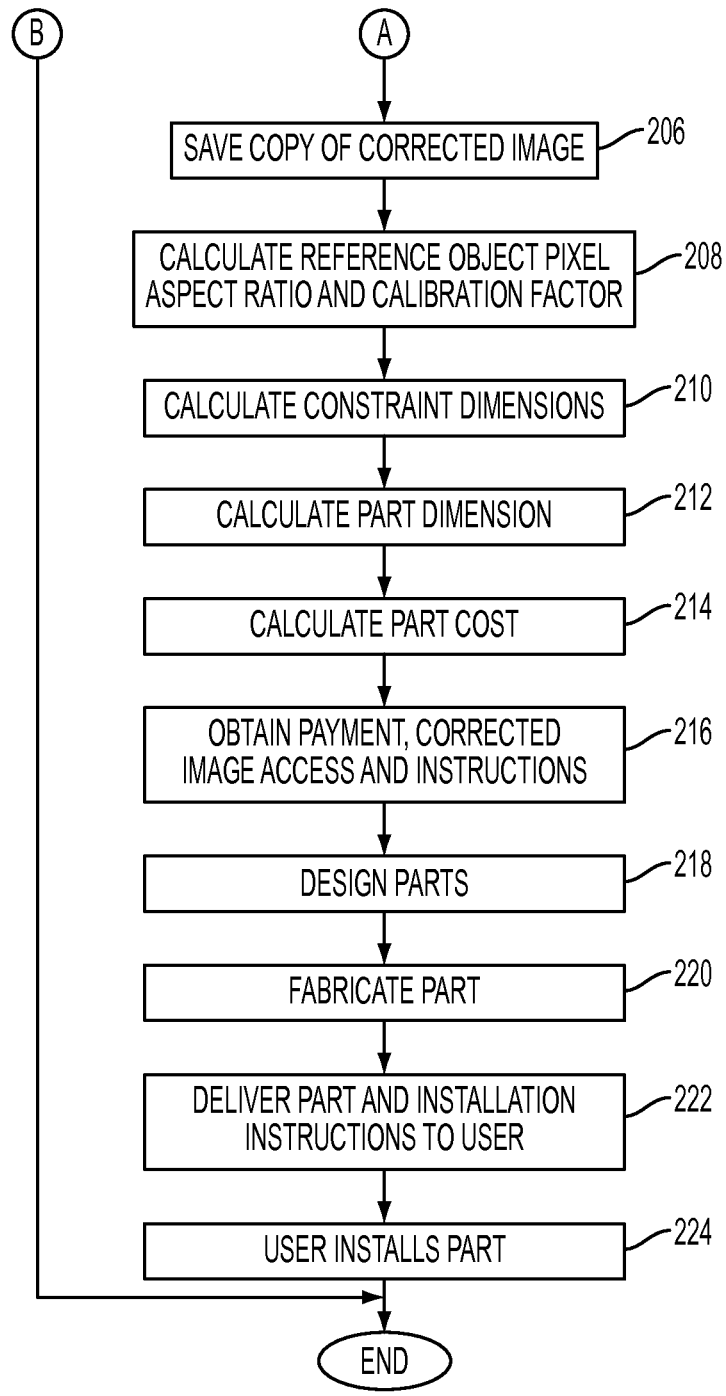

A flow diagram illustrating an example part, such as a custom supplemental window part, fabrication method is shown in FIGS. 7A and 7B. Initially, a digital image of the primary object and reference object are obtained (step 180). End user provided metadata is obtained using any suitable means (step 182). The identification and indication of the reference object may be passed to the application (running on the smartphone, tablet, image acquisition device or external website after the image is uploaded to it), via metadata or other explicit means. The actual means of communication of the reference object type and/or dimensions to the image processing application is not critical to the invention. The reference object is then detected using image processing means as described in more detail infra (step 184). Using image processing techniques, the pixel dimensions of the reference object are calculated (step 186). The product of the pixel dimensions of the reference object and the image are then calculated (step 188).

If the reference object requirements are not met (i.e. sufficient size and resolution in relation to the primary object) (step 190), then a new digital image is required (step 192) and the method returns to step 180. Otherwise, the method continues and it is checked whether the user is requesting a cost estimate (step 194). If the user requests a cost estimate, the current unit pricing is obtained (step 196). This may be through an internal database, from an external website, etc. Rough constraint dimensions and an estimate of the cost are then calculated (step 198) and the cost estimate is provided to the user (step 200).

The user can then place an order for the part (step 202). If an order is not placed, the method ends and optionally, the image data, metadata and any calculated information can be stored and retained for the possible use in the future.

If an order is placed, distortion correction, such as a perspective correction, is performed on the image using image processing techniques described in more detail infra (step 204). A copy of the corrected image is stored (step 206) and the reference object pixel aspect ratio and the calibration factor are calculated (step 208). Constraint dimensions are then calculated from the pixel calibration factor and constraint pixel dimensions (step 210). The dimensions of the part to be fabricated are then calculated from the constraint dimensions (step 212) and the associated cost is calculated as well (step 214). Payment, corrected image access and instructions are then obtained from the user (step 216). The part is then designed (step 218), fabricated (step 220) and delivered with installation instructions to the user (step 222). The user then installs the part (step 224).

Figure 8:
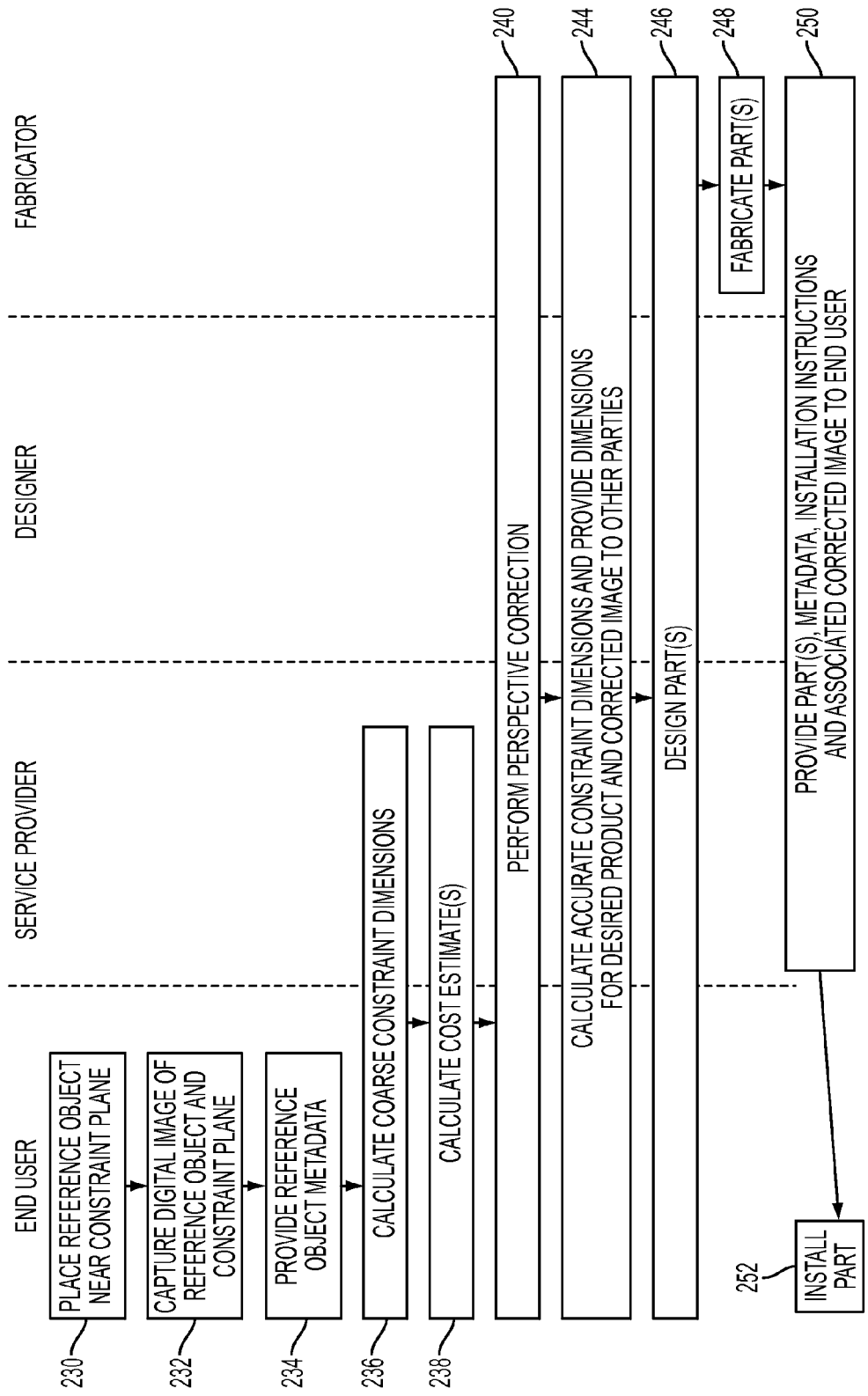
FIG. 8 is a flow diagram illustrating an example workflow when the end user purchases a window part.

A flow diagram illustrating an example workflow when the end user purchases a window part is shown in FIG. 8. The end user places the reference object near or in the constraint plane (step 230). The digital image of the reference object and the constraint boundaries is captured (step 232) and reference object metadata is provided in any suitable manner (step 234). The next steps may be performed by different entities depending on the particular implementation of the invention. The coarse constraint dimensions are calculated (step 236) either at the end user side (such as via a smartphone or tablet app) or by the service provider after uploading the image via the Internet. Cost estimate is then calculated (step 238) and distortion correction, such as perspective correction, is performed by any of the entities (i.e. end user, service provider (e.g., web site), designer or fabricator) (step 240). Accurate constraint dimensions are then calculated and dimensions and corrected images are provided for designing and fabricating the desired product (step 244). The part is then designed using the calculated constraint dimensions (step 246). Once designed, the part is then fabricated (step 248). The parts, metadata, installation instructions and associated corrected image are provided to the end user (step 250). Finally, the end user installs the part (step 252).

Note that in the image acquisition step 180 (FIGS. 7A and 7B), at least one digital image is obtained that includes a primary object that may have associated secondary objects nearby that are also captured in the digital image. In one embodiment, the primary object is a type of fenestration and its accompanying frame with secondary objects such as window treatments or blinds that may interfere with the operation or view through the fenestration. If no accompanying interior frame is present, the wall near the fenestration may be part of the primary object and, for example, a nearby picture hanging on the wall would be considered a secondary object. When using such digital images to obtain measurements for the design of custom supplemental parts images are preferably captured to minimize perspective distortion and perspective error, which, if present may lead to significant measurement error if it is too large, even after image processing corrections.

It has been found that images captured outward from the constraint projection, in this case the window trim casing, can lead to distortions that are difficult to correct without leaving distortion in the reference and/or constraint dimensions or may render a constraint edge hidden in the captured image. To aid with this positioning for image capture, it can be helpful to capture the image with minimal or no backlighting so as to make reflection of the person capturing the image readily visible to this person when within the projection of the window opening. Further, it is more preferred that the camera reside close to the projection of the window/fenestration center. The capture of images with the camera near the fenestration center also aids in embodiments of the present invention where vanishing point methods are employed to calculate supplemental part dimensions. When employing vanishing point methods, lines perpendicular to the plane of the fenestration such as those associated with the sill, stool, check rail top edges of the lower sash of a vertically operable sash, and inward facing stop edges can be used. Additionally, for reasons discussed below, it is preferred to use an image capture device that allows for minimization of camera motion during exposure. The image capture device may comprise a still camera, video camera, sequence of still images taken in rapid fire fashion, smartphone camera, etc.

Since windows are generally transparent and rectangular in shape they offer the opportunity for further automation of distance measurement. By capturing the digital image under conditions of either predominantly front lighting or predominantly back lighting of the window, high contrast portions of the image are easily obtained and identified. Front-lit images with minimal or low levels of back lighting (for example, taken at night) can be advantageous for choosing custom supplemental part color with respect to the wall, frame and or existing window treatment, easier identification of details in frame molding that may affect mounting, and minimizing shadows that could adversely impact choice of measurement points if minimal image processing is used. In addition, having a dark background eliminates the potential for irrelevant rectangular shapes to be present in captured digital images thus simplifying the process of identifying relevant features, such as a reference object, a frame or sash element or muntin.

Thus, capturing the image at nighttime with room lighting or with flash illumination, the transparent portion of the window will appear very dark with respect to a light colored window sash. Such lighting conditions also allow the person capturing the image to adjust the camera position within the frame projection by observing the location of the camera reflection. Back lighting can be beneficial for accurate identification of the sill or stool plane intersection with the frame or sash plane. This can be done by placing the reference object on or near the plane that intersects the sill or stool plane. When backlighting conditions exist, a shadow of the reference object can be caused to fall on the sill or stool plane. When a vertical edge of the reference object falls on the sill or stool, the intersection of the line containing the reference object edge and the line containing the shadow of the same edge will intersect at or near the line of intersection of the vertical plane and the sill or stool plane. The location of this line of intersection is useful for calculating the vertical dimension of the interior frame surface.

Note that while the object whose shadow is cast on the sill or stool is referred to as the reference object, any other suitable object may be used for this purpose so long as the vertical edge used is on or near the plane of interest. Also, if such an object has a horizontal edge resting on the sill or stool at the line of intersection such horizontal edge may be used to identify the line of intersection.

For windows that may be opened and closed, it may be helpful to have the window at least partially open while capturing the image, thus avoiding reflections and providing well defined edges around the open portion. By providing a measurement of one of the edges of the transparent region, e.g., the bottom edge where the transparent window portion meets the sash, the end user need only provide the length dimension and descriptor. The service provider can then automatically find the end points of the dimension measured by the end user. Alternatively, to aid in finding the end points, the end user may also provide rough end point locations using software on the capture device by clicking or tapping specific points on the displayed image or through the use of a crop tool or the like. In such a case, the service provider may suggest certain portions of the window to serve as reference dimensions. When using a back lit image, it is particularly useful to employ image processing that limits the range of light levels in the shadow regions generated around the frame so that lines of intersection are more clearly defined.

An alternative method of the present invention provides reference dimension measurement using a reference object, optionally having another use when not used in the present invention, or may be a standard size reference object. Prior to capturing the digital image, the end user may place a standard sized object on the window frame, sill, stool, sash, windowpane, next to the window or within the window frame being photographed, as shown in FIG. 3. Standard sized objects should have an easily identified linear dimension that is viewable in the image. More than one standard sized object may be used in an image. Non-limiting examples of such standard sized objects include an open tape measure, a ruler or meter stick, a piece of printing paper or lined paper having known standard dimensions, e.g., letter, legal, A4, A5, etc., a CD jewel case, currency, credit or debit card, government issued documents such as a driver's license or passport or an electrical plug.

When using an object similar in color or that does not provide sufficient contrast with its surrounding elements it is preferred to have a high contrast border at the peripheral edges or high contrast lines that terminate at the its edge. The reference object may also be a thin electronic display device such as a tablet or laptop computer display or a cell phone display for which the make and model is known and conveyed to the service provider as metadata. Such a display may be altered to provide high contrast and/or color distinction from the surrounding primary and secondary objects to aid in finding and dimensioning such a reference object. Alternatively, a standard object or figure provided by the service provider may be used, printed or displayed electronically whereby the service provider predetermines the dimensions of the standard object or printed figure. When a standard object is provided by the service provider, such standard object is preferably planar and rigid or semi-rigid and may optionally have printed on it a standard figure.

In one embodiment, a standard object or figure may have an uncommon color defining the standard length so that the end user may capture a digital image of the standard object or figure that will subsequently be used as the reference object in the present invention. Using the same capture device and colored standard object and providing their identity to the service provider in the present invention can then aid in automated locating of the reference object in one or more digital images used in the present invention. Additionally, the end user may create a reference object by measuring a non-standard sized object's dimensions and supplying the reference dimensions to the service provider as metadata. Similarly, color information may be calibrated by providing the end user with a standard color sample that can be used to calibrate colors in the image. Examples of objects predetermined by the service provider include pre-printed paper, plastic sheet, picture frame, clip board, cork board or bulletin board sent to or otherwise obtained or purchased by the user and digital files that may be printed by the user near the point of use. Preferably, reference objects should be rigid or can be made rigid during the image capture. For example, if a piece of printing paper is used, at least two, preferably three, adjacent corners should be taped to a flat surface with the entire edge between the adjacent corners in contact with the flat surface. When using a reference object, it is preferred to place the plane of the reference dimensions of the reference object as close as possible and parallel to the plane of the measured constraint. Therefore, reference objects that are thin in the dimension parallel to the constraint plane are preferred. If the reference dimensions are not placed in the same plane as the constraint dimensions, size correction may be performed to account for the perspective error induced by such placement. Preferably, such reference objects are placed near window dimensions of similar length to be determined. That is, a ruler might be placed near the window stool/sash interface to measure the visible sash width while the electrical plug used for recharging a mobile phone might be placed near the frame channels of a double hung or sliding window to measure the frame channel depth.

When using a measuring device such as tape measure or ruler, the length demarcations of the measuring device should be visible in the digital image if an image of sufficient resolution is captured. If the reference object has different dimensions in its length and width, it is preferred to orient the reference object with its longer dimension parallel to the longer dimension of the window. While thin, flat objects are preferred for reference objects in the present invention, objects such as a beverage can or bottle, or a may be used. Such three dimensional objects may be used as standard reference objects and may be useful in obtaining depth information from the image.

The captured and processed images should have a resolution of greater than one megapixel, preferably greater than two megapixels, more preferably greater than three megapixels and most preferably greater than four megapixels. At the same time, to facilitate edge and corner identification and decreased camera motion errors, reference pixel dimensions must be of sufficient length relative to the image pixel dimensions. Through extensive experimentation capturing digital images using imaging devices of different resolution, reference objects of different dimensions, and different image plane to fenestration plane distances, it has been found that the reference object and its dimensions must be carefully chosen and placed so that symmetrical elements and constraint elements may be readily observed.

In addition, some embodiments of the present invention require acquisition of the location of sash handles and window treatment actuators for proper design of the supplemental parts. Further, standard reference objects are preferably easy to obtain, move and store when not used in the present invention. At the same time, if the reference dimension is too small with respect to the constraint dimension to be measured or image dimension, large errors in calculated dimensions may occur. Therefore, the size of a reference object of the present invention has upper and lower limits for general use.

As shown in FIG. 5, the area of the reference object projected onto the constraint plane should cover less than half of the constraint area and preferably less than one fifth of the constraint area. This leads to images in which the product of perpendicular reference pixel dimensions in the constraint plane should be less than 50% of the product of the associated perpendicular constraint pixel dimensions and preferably less than 20% of this product. FIG. 5 also shows dimensions important to determining the usefulness of a digital image in calculating constraint dimensions.

To determine whether an image is likely to provide useful measurements by photogrammetry, at least one of the following parameters, $\lambda_v$ and $\lambda_h$, may be calculated based on the resolution of the image to be analyzed and the relative size of the reference object in the image, where MP is the image resolution in pixels, $V_i$ and $H_i$ are the number of pixels in the vertical and horizontal directions of the image, and $V_{ref}$ and $H_{ref}$ are the vertical and horizontal pixel dimensions of the reference object in the image.

$$\lambda_v = MP*V_{ref}/V_i = (H_i*V_i)*V_{ref}/V_i = H_i*V_{ref} \quad (1)$$

$$\lambda_h = MP*H_{ref}/H_i = (H_i*V_i)*H_{ref}/H_i = V_i*H_{ref} \quad (2)$$

As shown in Table 1 below, it has been found that $\lambda_v$ or $\lambda_h$, a product of a reference object pixel dimension and the image pixel dimension perpendicular to it in the image plane, is preferably greater than 100,000 and more preferably greater than 200,000 to obtain calculated constraint dimensions having acceptable errors with respect to the true constraint dimensions, though useful calculated constraint dimensions may be obtained when $\lambda_v$ or $\lambda_h$ is greater than 40,000. Furthermore, when applying perspective correction and aspect ratio optimization, images with $\lambda_v$ or $\lambda_h$ as low as 20,000 may yield usable measurements for some applications.

TABLE 1

Example Calculation Results

| | Reference Object | Persp. Corr.? | Aspect Ratio Opt.? | NP (×10⁻⁵) | $H_1$ (pixels) | $V_1$ (pixels) | $H_{ref}$ (pixels) | $V_{ref}$ (pixels) | $C_H$ (Pixels/inch) | $C_V$ (pixels/inch) | $H_{con}$ (pixels) |
|---|---|---|---|---|---|---|---|---|---|---|---|
| Ex. 1A | Credit Card | No | No | 5.02 | 1936 | 2592 | 85 | 131 | 40.00 | 38.81 | 784 |
| Ex. 1B | Credit Card | Yes | No | 5.02 | 1936 | 2592 | 83 | 130 | 39.06 | 38.52 | 781 |
| Ex. 1C | Credit Card | Yes | Yes | 5.02 | 1936 | 2592 | 83.2 | 132.1 | 39.15 | 39.14 | 781 |
| Ex. 2A | Paper (7.5" × 10.5") | No | No | 6.01 | 1840 | 3264 | 323 | 447 | 43.07 | 42.57 | 1415 |
| Ex. 2B | Paper (7.5" × 10.5") | Yes | No | 6.01 | 1840 | 3264 | 320 | 446 | 42.67 | 42.48 | 1419 |
| Ex. 2C | Paper (7.5" × 10") | Yes | Yes | 6.01 | 1840 | 3264 | 318.9 | 446.5 | 42.52 | 42.52 | 1419 |
| Ex. 3A | U.S. Paper Currency | No | No | 1.23 | 960 | 1280 | 51 | 110 | 19.54 | 17.92 | 611 |
| Ex. 3B | U.S. Paper Currency | Yes | No | 1.23 | 960 | 1280 | 49 | 110 | 18.77 | 17.92 | 626 |
| Ex. 3C | U.S. Paper Currency | Yes | Yes | 1.23 | 960 | 1280 | 47.1 | 110.8 | 18.05 | 18.05 | 626 |
| Ex. 4A | Muntin/Sash Rail | No | No | 1.23 | 960 | 1280 | 19 | 41 | 23.38 | 20.50 | 610 |
| Ex. 4B | Muntin/Sash Rail | Yes | No | 1.23 | 960 | 1280 | 18 | 39 | 22.15 | 19.50 | 626 |
| Ex. 4C | Muntin/Sash Rail | Yes | Yes | 1.23 | 960 | 1280 | 16.3 | 39.5 | 20.06 | 19.75 | 626 |

| | $V_{con}$ (pixels) | $H_{concalc}$ (inches) | $V_{concalc}$ (inches) | Horizontal Error ($H_{concalc}$ − $H_{contrue}$) | Vertical Error ($V_{concalc}$ − $V_{contrue}$) | $\lambda_H$ | $\lambda_V$ | True Constraint Dimensions ($V_{contrue}$ × $H_{contrue}$) |
|---|---|---|---|---|---|---|---|---|
| Ex. 1A | 2164 | 19.60 | 55.75 | −0.77 | 0.38 | 22030 | 253616 | 55.375" × 20.375" |
| Ex. 1B | 2144 | 20.00 | 55.66 | −0.38 | 0.29 | 215136 | 251680 | 55.375" × 20.375" |
| Ex. 1C | 2144 | 19.95 | 54.78 | −0.43 | −0.60 | 215654.4 | 255745.6 | 55.375" × 20.375" |
| Ex. 2A | 2400 | 32.86 | 56.38 | −0.64 | −0.62 | 1054272 | 822480 | 57" × 33.5" |
| Ex. 2B | 2432 | 33.26 | 57.26 | −0.24 | 0.26 | 1044480 | 820640 | 57" × 33.5" |
| Ex. 2C | 2432 | 33.37 | 57.19 | −0.13 | 0.19 | 1040889.6 | 821560 | 57" × 33.5" |
| Ex. 3A | 1018 | 31.27 | 56.82 | −2.23 | −0.18 | 65280 | 105600 | 57" × 33.5" |
| Ex. 3B | 1042 | 33.34 | 58.16 | −0.16 | 1.16 | 62770 | 105600 | 57" × 33.5" |
| Ex. 3C | 1042 | 34.69 | 57.74 | 1.19 | 0.74 | 60288 | 106368 | 57" × 33.5" |
| Ex. 4A | 1075 | 26.09 | 52.44 | −7.41 | −4.56 | 24320 | 39360 | 57" × 33.5" |
| Ex. 4B | 1077 | 28.26 | 55.23 | −5.24 | −1.77 | 23040 | 37440 | 57" × 33.5" |
| Ex. 4C | 1077 | 31.20 | 54.53 | −2.30 | −2.47 | 20864 | 37920 | 57" × 33.5" |

In a first example, a fixed window, with muntins forming five panes vertically and two panes horizontally between two mullions that is part of a complex was imaged using front lighting. A window shade for the complex was raised as high possible, but it still inhibited the view of the top of the window. Image capture was performed using an Apple iPhone 4 at a distance of about 5.5 feet from the window plane. A credit card used as the reference object was placed in the lower left corner parallel to and in contact with the window. The long (3.375 inch) and short (2.125 inch) edges of the object were placed in the lower left corner parallel to and in contact with the window. The long (3.375 inch) and short (2.125 inch) edges of the credit card were in contact with the mullion and bottom frame edges, respectively. For the uncorrected image Example 1A, the reference object was measured by a semi-automated method using the "Magnetic Lasso Tool" of Adobe Photoshop Elements 10, a commercially available image editing software package sold by Adobe Systems Incorporated.

The Magnetic Lasso Tool was used with 0 pixel Feather, Anti-alias, 3 pixel width, and 5% Contrast. The horizontal constraint pixel dimension was measured directly using the Adobe Photoshop Elements 10 "Rectangular Marquee Tool".

The vertical constraint pixel dimension was estimated by finding the midpoint of the middle vertical pane as defined by the horizontal muntins around it using the "Rectangular Marquee Tool". The pixel dimension from the bottom frame edge to this vertical midpoint was multiplied by two to estimate the vertical constraint pixel dimension. For the corrected image, Example 1B, the image of Example 1A was perspective corrected using the "Correct Camera Distortion Filter" of Adobe Photoshop Elements 10 and analyzed as described for Example 1A. For Example 1C, the perspective corrected image used for Example 1B was analyzed in the same manner except the reference dimensions were refined using the matrix method in which the nearest pixel pair on the diagonal was calculated using interpolation, vide infra. The constraints in each of Examples 1A, 1B and 1C chosen and manually identified for measurement were the inward facing surfaces formed by the top and bottom framing and the mullions. The true constraint dimensions were measured manually using a tape measure and these were used to determine the errors in the photogrammetric measurements.

In a second example, a double hung window having a continuous cloth window shade covering most of the top sash was imaged. Each sash of the window had one symmetrically placed horizontal muntin and two evenly spaced vertical muntins. Image capture was performed using a Motorola Droid X at a distance of about 8 feet from the window plane. A 7.5 inch by 10.5 inch piece of paper used as the reference object was taped to the upper right corner of the bottom sash frame. The top (7.5 inch) and right (10.5 inch) edges of the paper were aligned with the top of the sash and the inward facing edge of the frame. The image correction (for Example 2B) and measurements (for Examples 2A, 2B and 2C) were performed as described for Example 1B, except that the pixel dimension from the top rail vertical midpoint of the bottom sash to the stool was multiplied by two to estimate the vertical constraint pixel dimension. In addition, the reference object aspect ratio was optimized for Example 2C as described for Example 1C.

In a third example, an image was obtained as described in the second example above, except using an LG Cosmos Touch at a distance of about 7.5 feet and using a United States one-dollar bill as the reference object. The dollar bill was taped to the lower sash in the upper left corner such that its left edge was aligned with the inward facing frame edge. The remaining aspects of analysis for Examples 3A, 3B and 3C were analogous to those described for Examples 2A, 2B and 2C, respectively.

In a fourth example, an image was obtained as described in the third example above, except using manually measured features of the lower sash for the reference dimensions. For the horizontal reference dimension, the lower left muntin width was measured to be 0.8125 inch. For the vertical reference dimension, the inside face height of the lower sash bottom rail was measured to be 2 inches from the stool with the lower sash completely closed to its stopping point. The remaining aspects of analysis for Examples 4A, 4B and 4C were analogous to those described for Examples 2A, 2B and 2C, respectively.

From comparison of the uncorrected examples in Table 1 (1A, 2A, 3A and 4A), it can be seen that $\lambda$ calculations greater than about 40,000 lead to acceptable constraint measurements but when values are less than about 40,000, as in example 4A, relatively large constraint measurement errors are obtained. In each example, performing perspective correction leads to improved measurement results as seen when comparing examples 1A to 1B, 2A to 2B, 3A to 3B and 4A to 4B. The effect of performing aspect ratio optimization, vide infra, can be seen by comparing examples 1C to 1A and 1B, 2C to 2A and 2B, 3C to 3A and 3B, and 4C to 4A and 4B. Improved results can be obtained, particularly for low $\lambda$ values.

Note that the $\lambda$ value limitation assumes that the reference pixel dimensions and image pixel dimensions have been aligned to the same Cartesian grid, whereas the reference object dimensions need not be aligned with the image dimensions in the captured digital image. If the reference object dimensions are not aligned, computational methods may be used to rotate the reference object dimensions into alignment. If an image does not meet the above limitations, the end user may be notified that a new image should be obtained. In one embodiment, optionally, suggestions for obtaining a useful new image may be provided to the end user, such as changing the distance between the capture device and the primary object, placing the reference object closer to or more parallel to the constraint plane, or using a different reference object. Notification and suggestion means may be incorporated into a software application that aids the end user in obtaining images as part of the present invention.

If a primary object window already has an associated window treatment that will be used with the custom supplemental parts, the image is preferably captured with the treatment opened allowing constraint surfaces and lines to be visible. If the open treatment still covers a portion of the window or frame, additional images of the covered portions may be captured to obtain constraint surfaces or lines hidden in other image views. Any additional image should also contain a reference object so that accurate calculations may be obtained.

In some cases it may be desirable to capture only a single image but the image may have omitted a portion of a relevant constraint, such as a corner or edge. In other cases, a window treatment may be in a fixed position covering at least one of the constraint surfaces or lines. In such cases, symmetry within the window and/or framing or digital extension of the observable constraints may be used to calculate a dimension for which a portion of one constraint is not visible in the image. Symmetry elements such as check rails or muntins may be used to estimate the location of completely hidden constraints.

In cases where a window treatment is moveable and covers different portions of constraint surfaces or lines when in different positions, it can be beneficial to capture more than one image of the same window such that different treatment positions are captured. The end user may select and adjust treatment positions to be captured such that the images provide complementary views of constraints. Software programs may be employed to merge two or more images creating a single image offering a clear view of the all desired constraint surfaces or lines in a single image. For example, vertical or horizontal blinds may allow image capture with partial view of a constraint rectangle when raised or pulled to the sides of a window. One constraint surface, however, may be partially or entirely hidden with the blind in such a position. To complement this image, the blind may be in its fully closed position with the blinds rotated to allow imaging of a constraint surface that is hidden in the first image. Subjecting the images with different treatment positions to image processing as is known in the art, for example as described in EP 2360644A2, may then be used to provide a less obstructed view of the constraints in a single image. This single image, having the non-stationary treatment portions removed, may then be used as the basis for further image processing described below.

After capture of an image and associated capture metadata, the image undergoes image processing to measure the reference dimensions and allow calculation of lengths for design of supplemental parts. Image processing may occur on one or more of the capture device, end user (or designee) computer, store based kiosk, service provider computer or any other suitable computational device. For example, if a digital camera without communication capability is used for image capture, the image may be stored on a storage device such as a memory card that may be physically transferred to a computer to access the image for image processing. Alternatively, if a camera phone, smartphone or tablet computer is used to capture the image, the image may be transferred electronically to another computer for image processing. After completion of any image processing done by the end user or designee, the digital image file is transferred, preferably electronically by, for example, upload to a service provider website or third party vendor, or server to be used as input to semi-automated (allowing user or service provider intervention, for example, to make or finalize choices, operate individual algorithms, determine whether and/or how estimates are to be made such as when a portion of the needed measurement is not visible due to a fixed window treatment) or fully automated algorithms (e.g., those found in PTLens, Adobe Photoshop or Photoshop Elements, or 3D image metrology algorithms such as those in VisualSize, uPhotoMeasure or Autodesk, etc.).

In one embodiment of the present invention, the captured image is subjected to correction, including perspective, rotation and optionally barrel and pincushion, which may be performed by any of a number of methods known in the art. Such methods often include analyzing lines in the image and determining a vanishing point to calculate corrections. When determining vanishing points, techniques well known in the art such as, for example, Gaussian mapping may be used. One such technique may include detecting line segments in the image, determining intersections from pairs of line segments, assigning a probability to each intersection of line segment pairs, determining a local maximum corresponding to a plurality of probabilities and outputting a vanishing point vector, corresponding to the local maximum, from which a vanishing point location is estimated. Such methods may be combined as needed with camera distortion correction methods, such as those incorporated in commercially available software programs such as PTLens, Photoshop, Photoshop Elements, PhotoXForm, or DxO Optics Pro or ViewPoint to provide correction for distortion occurring due to unwanted rotations of the image plane about the optical axis (z-axis) as well as two perpendicular axes that are parallel to the fenestration plane as well as barrel and pincushion distortions. Due to the uniquely inherent nature of fenestration and associated components and the walls and floors of buildings, characterized by carefully constructed verticals and horizontals, these methods may be modified in the present invention to use lines in the uncorrected image as known verticals and horizontals, having corresponding vanishing points that fall on the vertical and horizontal image axes, respectively. Another approach may advantageously utilize for perspective correction the right angles known or found to be in the image. In this case, two or more angles near ninety degrees are found and the difference of these angles from ninety degrees is minimized in the correction process. When using right angles for perspective correction, corners may be detected by corner detection algorithms known in the art, such as, Smallest Univalue Segment Assimilating Nucleus (SUSAN), Accelerated Segment Test (AST) or Features from Accelerated Segment Test (FAST) as non-limiting examples, or the many approaches cited in http://en.Wikipedia.org/wiki/Corner_detection. To minimize the amount of computation, the perspective corrections may be determined using a lower resolution image than that captured and applying the determined corrections to the higher resolution image prior to using the higher resolution image for calculation of dimensions. For this same reason, it may be beneficial to use orientation information to identify the bottom or center of the fenestration as a starting point for line or corner identification as an aid to avoid lines or corners present in the image due to secondary objects.

For the perspective correction portion of the present inventions, the captured digital image may be sub-sampled to minimize computational complexity. It facilitates understanding to note that the perspective correction is described in regard to a sub-sampled digital image having dimensions of 512 pixels by 768 pixels. In addition, the digital image is characterized by 12 bits per pixel per color channel. In a typical image, the code values fall in the range of 800-2200. Those skilled in the art will recognize that the preferred embodiment may be adapted to perform significantly the same operation using images of different size and data metric by adjusting constants mentioned in the preferred embodiment.

Figure 9:
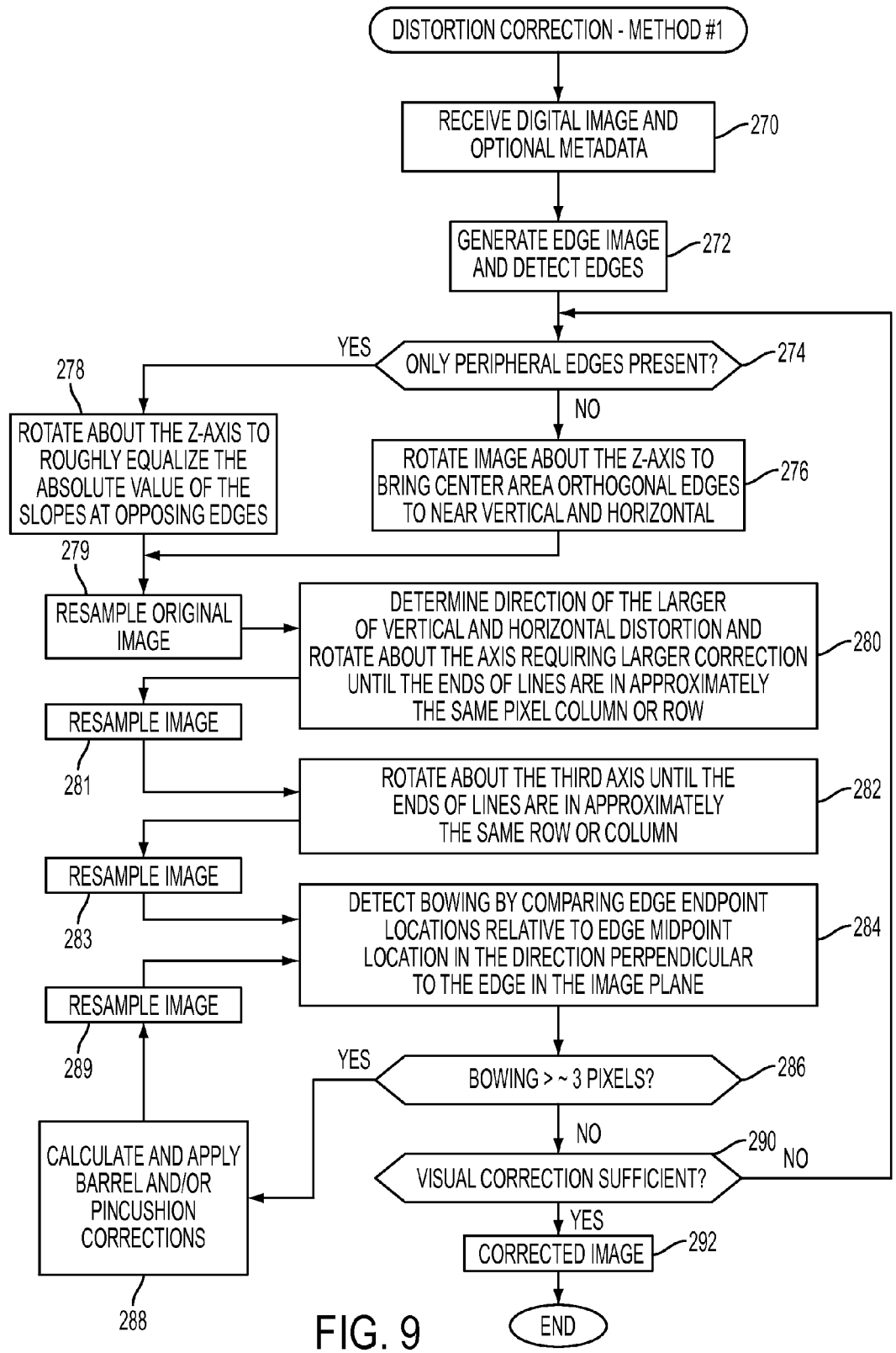
FIG. 9 is a flow diagram illustrating a first example perspective correction method.

A flow diagram illustrating a first, semi-automated, example perspective correction method for a rectangular primary object is shown in FIG. 9. For each step of this method that applies a correction, operator visual analysis is used to determine the direction and magnitude of correction needed and determines when the correction is complete. First, the digital image and optional metadata are received (step 270). An edge image is then generated, i.e. edge detection is performed (step 272). If only peripheral edges are present (step 274), the method then roughly equalizes the absolute value of the line slopes at opposing edges (step 278). Otherwise, the image is then rotated about the z-axis to bring the orthogonal edges near the center of the primary object to near vertical and horizontal (step 276).

The original image is then resampled (step 279). The direction of the larger of vertical and horizontal distortion is then determined and the image rotated about the axis requiring larger correction until the ends of lines are in approximately the same pixel column or row (step 280). The image is resampled (step 281) and is then rotated about the third axis until the ends of lines are in approximately the same pixel row or column (step 282). The image is resampled (step 283) and bowing is then detected by comparing peripheral edge endpoint locations relative to edge midpoint location of the same edge in the direction perpendicular to the edge in the image plane (step 284). If peripheral edge bowing is found to be greater than about three pixels (step 286), then barrel and/or pincushion corrections are calculated and applied (step 288), the image is resampled (step 289) and the method continues with step 284. If the visual corrections calculated and applied in the method are sufficient (step 290), the corrected image (step 292) is input to the next processing step, otherwise the method returns to step 274.

Figure 10:
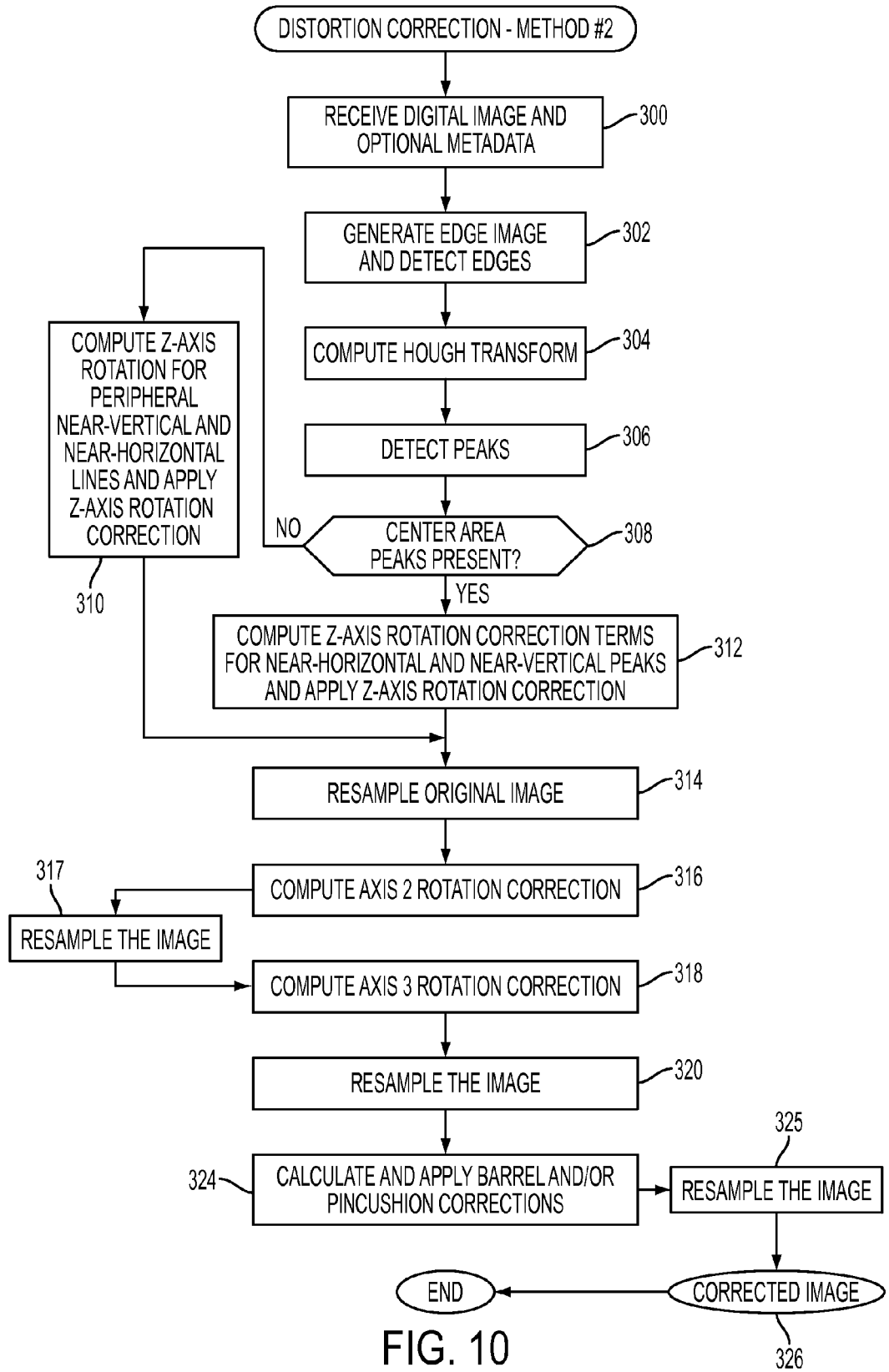
FIG. 10 is a flow diagram illustrating a second example perspective correction method.

The present inventions may include distinct sub-algorithms as discussed in more detail infra. When the perspective correction is performed for a rectangular primary object in an automated way as shown in FIG. 10, the second example method receives a digital image and optional metadata (step 300). The edges in the image are then detected to generate a binary edge map of the image (step 302). A Hough transformation is then computed (step 304). The result of the Hough transformation is referred to as a Hough accumulator, and the Hough accumulator is analyzed in later steps for detecting the presence and level of perspective distortion. A Hough accumulator peak detection (step 306) locates peaks in the Hough accumulator which correspond to lines in image space. The combined purpose of the steps of creating a binary edge map, computing a Hough transformation and detecting the peaks of the Hough accumulator is to detect lines in the original digital image. A correction term is computed which estimates the level of perspective distortion based upon the peaks located in the Hough accumulator corresponding to the center area of the window, such as the center area of a window divided into equal divisions of three each in the vertical and horizontal directions. If no Hough transformation peaks are detected from the central portion of the primary object (step 308), the z-axis rotation for peripheral near-vertical and near-horizontal lines are computed and z-axis rotation correction is applied (step 310) such that the sum of the average line slopes at opposing edges is minimized. If Hough transformation peaks are present from the central portion of the primary object, the z-axis rotation correction terms for near-horizontal and near-vertical peaks are calculated (step 312) such that sum of the central portion peak location deviations from 0 degrees and 90 degrees is minimized. The original inputted digital image is then resampled according to the correction term for removing part or all of the perspective distortion (step 314).

The second axis (e.g., x-axis) rotation correction is then calculated (step 316) followed by calculating third axis (e.g., y-axis) rotation (step 318). The image is then resampled (step 320). Barrel and/or pincushion corrections are then calculated and applied (step 324) as described supra. Optionally, the method may be repeated on the accumulator peaks of the corrected image 326 beginning with z-axis correction (step 310 or 312).

The method of generating the edge map will now be described in more detail. In the preferred embodiment, the edge map is formed from the green channel of the original, input digital image. First, the image is low pass filtered by convolution with a Gaussian filter in order to remove noise. Convolution of an image with a Gaussian filter is a technique well known in the image processing arts. In the preferred embodiment, the standard deviation of the Gaussian filter is two pixels. Next, at each pixel, the non-directional squared gradient of the low pass filtered image is calculated using the following formula:

$$\nabla_n^2 = \nabla_h^2 + \nabla_v^2 \qquad (3)$$

where:
$\nabla_n$=non-directional gradient;
$\nabla_h$=horizontal gradient $\{x(i,j)-x(i,j+1)\}$;
$\nabla_v$=vertical gradient $\{x(i,j)-x(i+1,j)\}$;
$x(i,j)$=the pixel value of the $i^{th}$ row, $j^{th}$ column;

A threshold, preferably 7500, is then applied to the non-directional squared gradient. If the squared gradient value is greater than the threshold, the pixel is considered an edge pixel and set to one. Otherwise, the pixel is considered to be a non-edge pixel and set to zero. It is noted that alternative edge detection algorithms could be used, as those skilled in the art will be able to compute.

In regard to the step of computing the Hough transform, the details of this step are well known in the art. For example, U.S. Pat. No. 3,069,654 discloses a method for generating the Hough transform. In the preferred embodiment, the polar Hough transform is implemented. The polar Hough transform is described in pages 123-124 in Ballard and Brown in Computer Vision (Prentice-Hall, Inc., Englewood Cliffs, N.J., 1982). In the preferred embodiment, the Hough accumulator generated has the same number of bins as the original image has pixels, although those skilled in the art will recognize that the dimensions of the Hough accumulator may differ from those described in the preferred embodiment without significantly affecting the performance of the present invention. In this case, each bin in the Hough accumulator represents a region of Hough space that is $2\pi$/col radians by 2 pixels of radius, where col represents the number of columns in the image.

Figure 11:
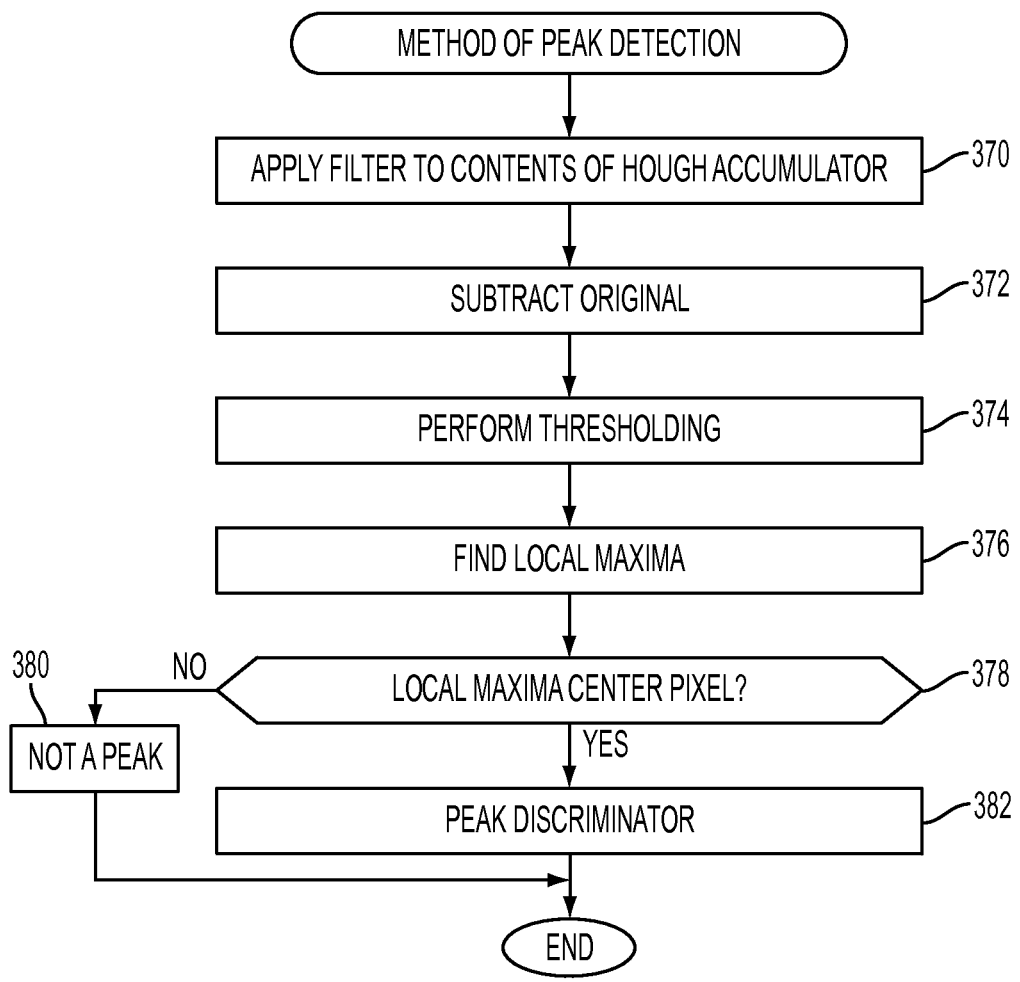
FIG. 11 is a flow diagram illustrating an example peak detection method.

Peaks in the Hough accumulator correspond to lines in the edge image. The Hough accumulator is, therefore, examined for peaks by filtering and thresholding operations. Referring to FIG. 11, the flow diagram for the peak detection is shown. The first stage of the peak detection involves convolving the Hough accumulator with a filter (step 370). The kernel values used in the filtering process are given by:

$$\text{Filter} = \begin{bmatrix} 0 & -2 & 0 \\ 1 & 3 & 1 \\ 0 & -2 & 0 \end{bmatrix} \qquad (4)$$

The original accumulator is then subtracted from the filtered accumulator, in order to generate a difference accumulator corresponding to those regions of the accumulator greatly affected by the filtering process (step 372). The next step is to threshold the difference accumulator (step 374). If the value at a position in the Hough accumulator is less than the threshold, then the value at that position is set equal to zero. Otherwise the value is preserved. This process is performed to avoid detection of peaks that are local peaks, but are low in magnitude. In the preferred embodiment, the value of this threshold is 350.

After the threshold operation, the image is then scanned for peaks, i.e. find any local maxima (step 376). If the maximum of any window (preferably a 11×11 pixel window, corresponding to a window size of $4.50 \times 10^{-2}$ radians by 22 pixels of radius) occurs at the center of the window (step 378), then that pixel is called a peak. If not, the pixel is labeled a non-peak (step 380).

Figure 12:
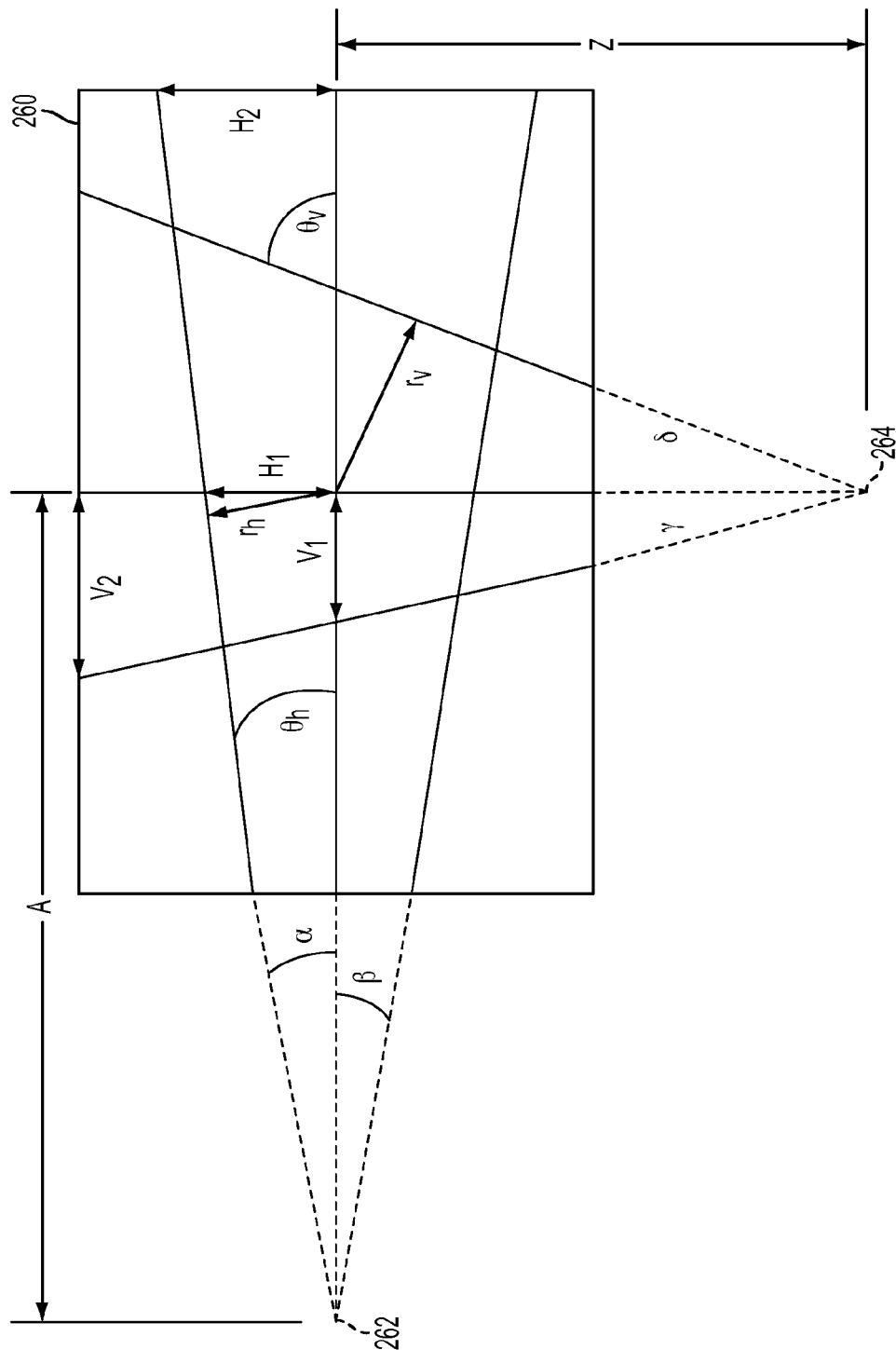
FIG. 12 is a diagram illustrating the correction factors used in the image processing portion of the measurement mechanism.

After the peak scanning, the peak locations are passed to the peak discriminator. The peak discriminator determines which of the detected peaks are of interest to the algorithm (step 382). The peak discriminator must determine if a given peak probably does not correspond to a line that was vertical or horizontal in the original scene. Referring to FIG. 12, it can be shown that lines that were vertical (parallel to the y-axis) in the original scene will result in image lines that have a common vanishing point falling on a vertical line passing through the center of the image, under the assumption that the scene is captured with an imaging device whose image plane is rotated about the x-axis. Similarly, it can be shown that lines that were horizontal (parallel to the x-axis) in the original scene will result in image lines that have a common vanishing point falling on a horizontal line passing through the center of the image, under the assumption that the scene is captured with an imaging device whose image plane is rotated about the y-axis. Thus, the peak discriminator rejects all peaks for which neither of the following conditions are not met:

$$r_v > \frac{V_i}{2}\cos\theta_v, \text{ with } 2\pi/5 < \theta_v < 3\pi/5 \qquad (5)$$

$$r_h > \frac{H_i}{2}\sin\theta_h, \text{ with } -\pi/5 < \theta_h < \pi/5 \qquad (6)$$

where $r_v$ and $\theta_v$ refer to the coordinates of the peak in the Hough accumulator for lines that are near vertical, $r_h$ and $\theta_h$ refer to the coordinates of the peak in the Hough accumulator for lines that are near horizontal, and $V_i$ and $H_i$ refers to the number of pixel rows and pixel columns contained in the original image.

Because the present invention is concerned with lines that were vertical or horizontal in the scene, the peak discriminator places the above limits on the θ coordinate of the Hough accumulator peaks, as appropriate for the lines that are near vertical or near horizontal. Peaks not rejected by the peak discriminator are hereafter referred to as accepted peaks.

Equations 5 and 6 represent predetermined criteria on the peaks corresponding to lines in the original image. Only those peaks meeting one of these criteria will be considered as accepted peaks.

The correction factor specifies the rate of re-sampling to be performed on the top or bottom row and the leftmost or rightmost column of the image. Note that perspective distortion may occur in both the vertical and horizontal directions. Also, the direction of the perspective distortion, and hence the direction of the vanishing point with respect to the image center is dependent upon the imaging plane position at the time of image capture. When re-sampling in the vertical and horizontal directions, the center row and center column, respectively, of the image are preserved when rotating the image about the x and y axis, respectively, and the degree of re-sampling increases linearly with distance from the center row and center column of the image.

Each correction factor, for vertical and horizontal correction, is calculated in the following manner. While this embodiment describes first applying z-axis rotational correction, followed by vertical correction (x-axis rotation) and then horizontal correction (y-axis rotation), those skilled in the art will recognize that the order in which these corrections are applied may be altered. A correction factor cf is calculated for each accepted peak, as determined by the peak discriminator.

With reference to FIG. 12, a line in the image corresponding to an accepted vertical peak is identified. Next, the shortest possible distance along the center row from a vertical line passing through the image center to the line corresponding to the accepted vertical peak is calculated (as shown by $V_1$). Then, the distance along the top row from the vertical line passing through the image center to the line corresponding to the accepted vertical peak (as shown by $V_2$) is calculated. The correction factor cfv is equal to $V_1/V_2$. Similarly, for an accepted peak that is near horizontal, the shortest possible distance along the center column from a horizontal line passing through the image center to the line corresponding to the accepted horizontal peak is calculated (as shown by $H_1$). Then, the distance along the right-most column from the horizontal line passing through the image center to the line corresponding to the accepted horizontal peak (as shown by $H_2$) is calculated.

As described infra, warping the image with the given correction factors cfv and cfh, respectively, will warp the line corresponding to the accepted vertical peak to be a vertical line parallel to a vertical line passing through the image center and warp the line corresponding to the accepted horizontal peak to be a horizontal line parallel to a horizontal line passing through the image center, displaced by $V_1$ and $H_1$ pixels, respectively.

If camera rotation is about the x-axis only, all vertical scene lines would be projected to image lines with the same vanishing point falling somewhere on a vertical line passing through the image center. Similarly, if camera rotation is about the y-axis only, all horizontal scene lines are projected to image lines with the same vanishing point falling somewhere on a horizontal line passing though the image center. Assuming distance Z from the vertical vanishing point to the image center and distance A from the horizontal vanishing point to the image center, the correction factors cfv and cfh of a line corresponding to an accepted peak may also expressed as:

$$cfv = \frac{z \tan \gamma}{\left(z + \frac{V_i}{2}\right) \tan \gamma} = \frac{z}{\left(z + \frac{V_i}{2}\right)} \quad (7)$$

$$cfh = \frac{A \tan \alpha}{\left(A + \frac{H_i}{2}\right) \tan \alpha} = \frac{A}{\left(A + \frac{H_i}{2}\right)} \quad (8)$$

The correction factor for image lines having their vanishing point on the vertical or horizontal axis of the image is dependent upon only the image size and the distance from the vanishing point to the image center. Thus, all lines having a common vanishing point falling on the vertical axis of the image have a common correction factor cfv and all lines having a common vanishing point falling on the horizontal axis have a common correction factor cfh. Thus, all vertical lines in space photographed with a camera rotated about the x-axis and all horizontal lines in space photographed with a camera rotated about the y-axis may be forced to the vertical and horizontal positions, respectively, on the image by a re-sampling process in which the rate of sampling along any row or column, respectively, varies linearly with distance from the center row or column, respectively, of the image. Those skilled in the art will recognize from well-known rotational matrix transformations having non-zero off-diagonal terms, if camera rotations about both the x-axis and y-axis exist for the same image, the x-axis rotation and the y-axis rotation will also impact the horizontal and vertical lines, respectively. However, extensive experimentation has unexpectedly shown that when image capture is performed as described above for FIG. 6, these off diagonal terms are sufficiently small that the vertical and horizontal correction factors may be determined and applied independently and either semi-automated or automated methods (FIGS. 9 and 10, respectively) may be used to apply corrections leading to satisfactory measurements. It may, however, be preferred to determine these correction factors iteratively.

Correction factors cfv and cfh are computed for each valid peak found in the Hough accumulator. Formulae for computing the correction factors cfv and cfh by knowing the radii $r_v$ and $r_h$ and angles $\theta_v$ and $\theta_h$ of each accepted peak are given by (the sign on radius r is ignored so that geometry may be used):

$$cfv = \frac{\frac{|r_v|}{\sin \theta_v}}{\frac{|r_v|}{\sin \theta_v} + \frac{V_i}{2 \tan \theta_v}} = \frac{|r_h|}{|r_h| + \frac{V_i}{2} \cos \theta_v} \quad (9)$$

$$cfh = \frac{\frac{|r_h|}{\cos \theta_h}}{\frac{|r_h|}{\cos \theta_h} + \frac{H_i}{2} \tan \theta_h} = \frac{|r_h|}{|r_h| + \frac{H_i}{2} \cos \theta_h} \quad (10)$$

In a preferred embodiment these equations are implemented to generate a correction factor for each accepted peak, based on whether the accepted peak is near vertical or near horizontal. The final corrections cfv and cfh for the entire image are found by computing a weighted average of the correction factor of each peak, weighted by the magnitude of the peak. This technique places more importance on peaks in the Hough accumulator that correspond to long lines in the image.

It is noted that selecting the median value for each correction factor is a more robust technique. In addition, a clustering approach may also be used as well (i.e. the correction factors cfv and cfh for the entire image are selected to be the most common correction factors computed among the accepted peaks.). Finally, a minimum number of peaks sharing a common correction factor may be required before attempting a correction. Any of these variations may be used to achieve the desired results.

The correction factors cfv and cfh may be modified as desired by implementing the following equations:

$$\text{new\_}cfv = (cfv-1)a + 1 \quad (11)$$

$$\text{new\_}cfh = (cfh-1)b + 1 \quad (12)$$

where a and b are arbitrary constants. In a preferred embodiment, the values of a and b are 1.0, therefore new_cfv=cfv and new_cfh=cfh. The constants a and b may be set between 0 and 1.0 to generate new_cfv and new_cfh that will cause the re-sampling to do a partial correction of the image. After new_cfv and new_cfh are calculated, cfv and cfh are assigned the value of new_cfv and new_cfh, respectively. The correction terms cfv and cfh constitute correction terms that will later be used to improve the digital image in order to produce a processed image.

The image re-sampling is designed to warp the image in such a manner as to alter non-vertical lines that are approximately close to being substantially vertical in the image to the substantially vertical position and to alter non-horizontal lines that are approximately close to being substantially horizontal in the image to the substantially horizontal position. The image re-sampling generates a processed image. To simplify the discussion, it is assumed that the vanishing points are below and to the left of the image center. To generate the processed image, the top row of pixels in the original image is re-sampled at the rate specified by the vertical correction factor cfv and the right-most column of pixels in the original image is re-sampled at the rate specified by the horizontal correction factor cfh. The center row of image pixels in the processed image is generated by re-sampling the center row and center column of the original image pixels at the rate of 1.0 (i.e. they are left unchanged). All other rows are re-sampled at a rate which varies linearly according to the distance of the row or column to the center row or column, respectively, of the image.

Described another way, at each location in the processed image a vector is computed which describes the position to sample from the original image for the purpose of finding a new pixel value. The vectors dx and dy which characterize the difference in position from the processed image pixel location to the original image pixel location is always horizontal position and vertical position, respectively. The equations describing this are:

$$dx = \frac{2(cfh-1)xy}{V_i} \quad (13)$$

$$dy = \frac{2(cfv-1)xy}{H_i} \quad (14)$$

where dx and dy represent the distances from the current pixel location to the position in the original image where a linear interpolation may be performed in order to calculate a pixel value for the current pixel location. x represents the number of pixels from the current pixel location to a vertical line passing through the center of the image, y represents the number of pixels from the current pixel location to a horizontal line passing through the center of the image, and $V_i$ and $H_i$ represent the number of rows and columns, respectively, of pixels contained in the image. Those skilled in the art will recognize that the preceding method of re-sampling described in the preferred embodiment may be varied without substantially deviating from the scope of the present invention.

Each pixel in the processed image is filled by using the displacements calculated in the following manner: At each pixel location (x, y) in the corrected image, the pixel value is calculated by performing a linear interpolation of the two pixels nearest the location (x+dx, y) and the two pixels nearest (x, y+dy) in the original image. Linear interpolation is a technique well known in the art and is not described in detail. Those skilled in the art will recognize that other types of interpolation (for instance cubic) may be used to generate the pixel values of the processed image. Pixel locations (x, y) in the processed image may be filled with black pixels if the location (x+dx, y) or (x, y+dy) falls outside of the range of the original image pixel locations.

In an alternative embodiment, the computation of the correction factors cfv and cfh may be performed on a subsampled version of the original image to save processing time. The correction factors cfv and cfh calculated may then be used to control the re-sampling of the original image for creating a processed image.

Figure 13:
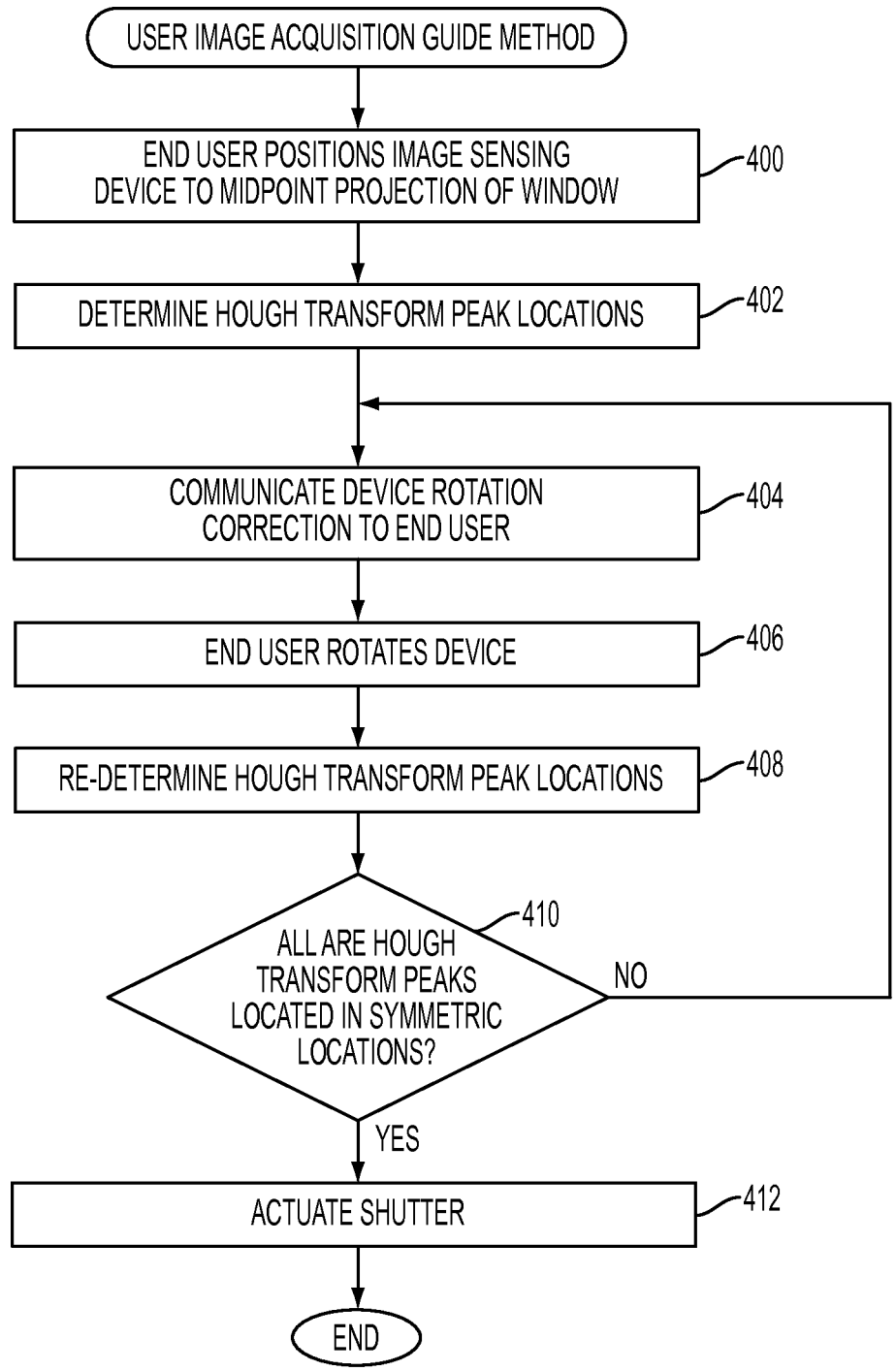
FIG. 13 is a flow diagram illustrating an example user image acquisition guide method.

While the above description uses the Hough transform to operate on an image after the image has been captured, the Hough transform may also be used to guide the person capturing the image immediately prior to and at the time of image capture, enabling distortion correction prior to image capture so post-capture perspective correction may be avoided or minimized, as shown in FIG. 13. The end user first positions the image sensing device (e.g., digital camera), to the midpoint projection of the window (step 400). The Hough transform is then calculated in real time and peak locations are determined (step 402). The person capturing the image is prompted to adjust the camera rotation or tilt angles and position with respect to the scene based on predetermined capture criteria (step 404). The end user rotates the device (step 406) and the Hough transform peak locations are re-determined (step 408). If all the Hough transform peaks are location in symmetric locations (step 410), the shutter is actuated (step 412), otherwise the method returns to step 404.

Thus, analyzing the Hough transform with respect to pre-determined capture limitations for having the image plane parallel to the plane of mutually perpendicular scene features allows for automatic shutter actuation when such limitations are met. When automatic shutter actuation is employed, it is preferred to delay the shutter actuation until the limitation is met for a predetermined time so that camera movement is minimized during capture.

Figure 14:
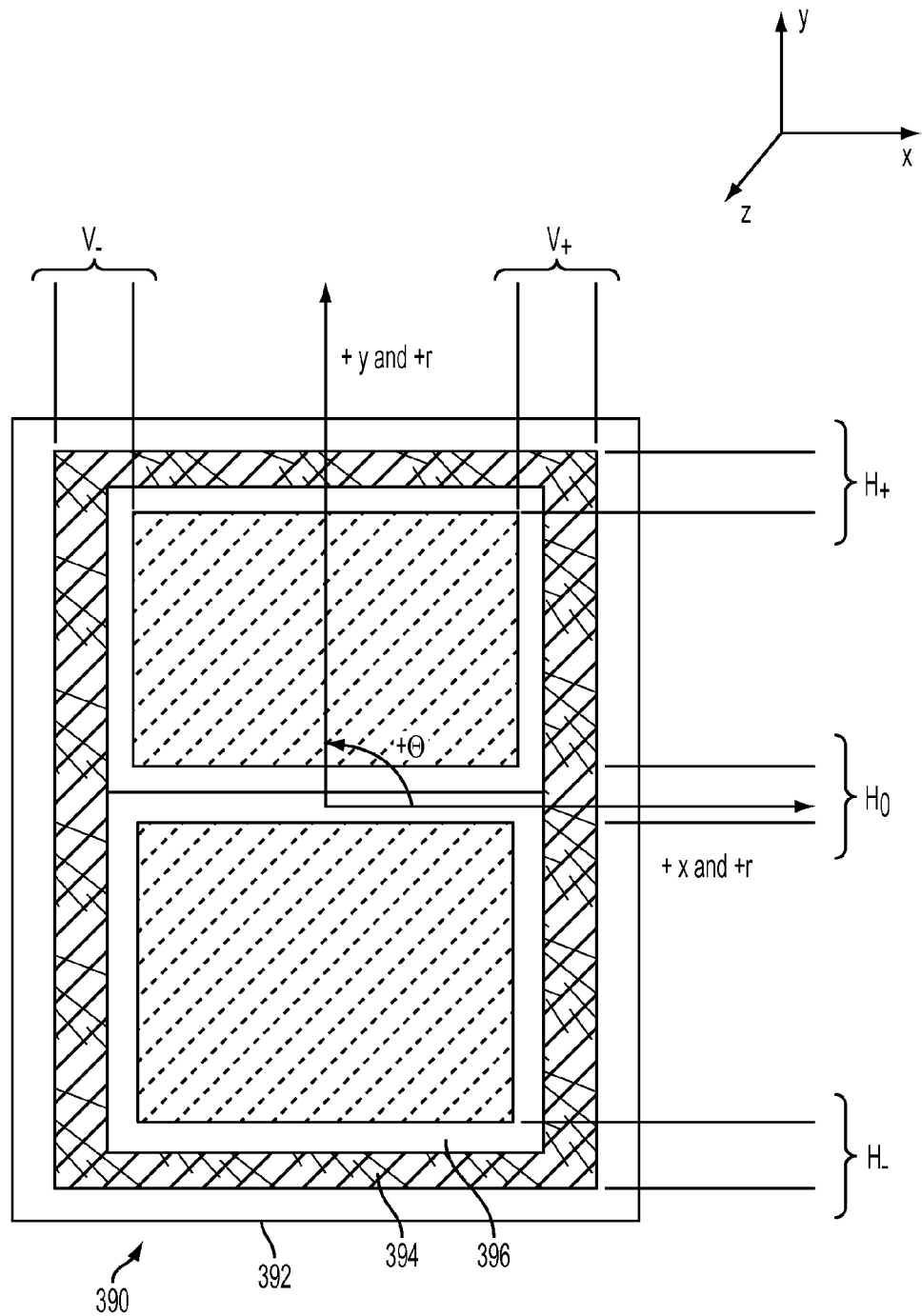
FIG. 14 is a diagram illustrating an example window and line sources for Hough transform accumulator peaks.
Figure 15:
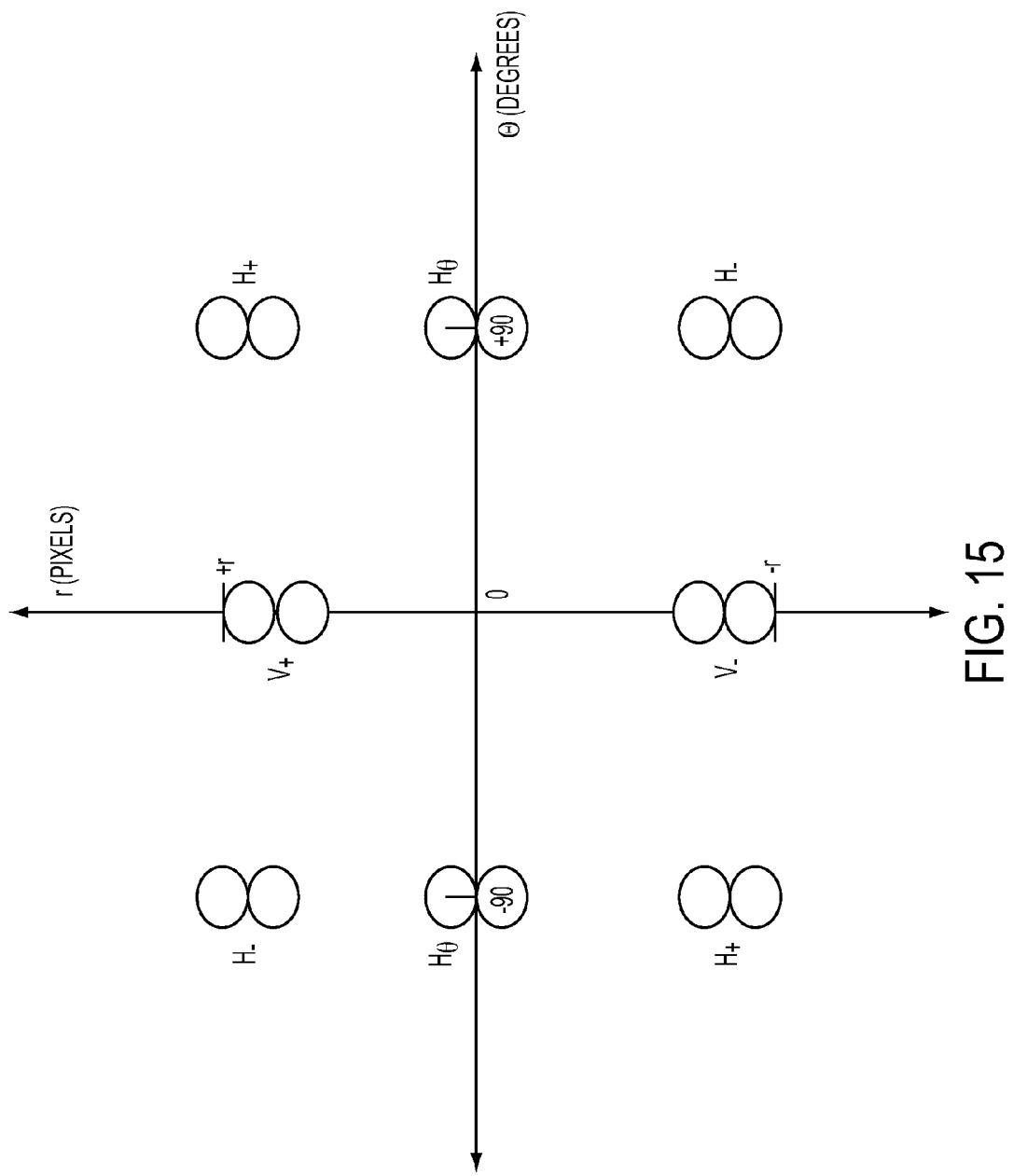
FIG. 15 is a diagram illustrating an example Hough transform accumulator with the digital camera centered and parallel to the window pane.
Figure 16:
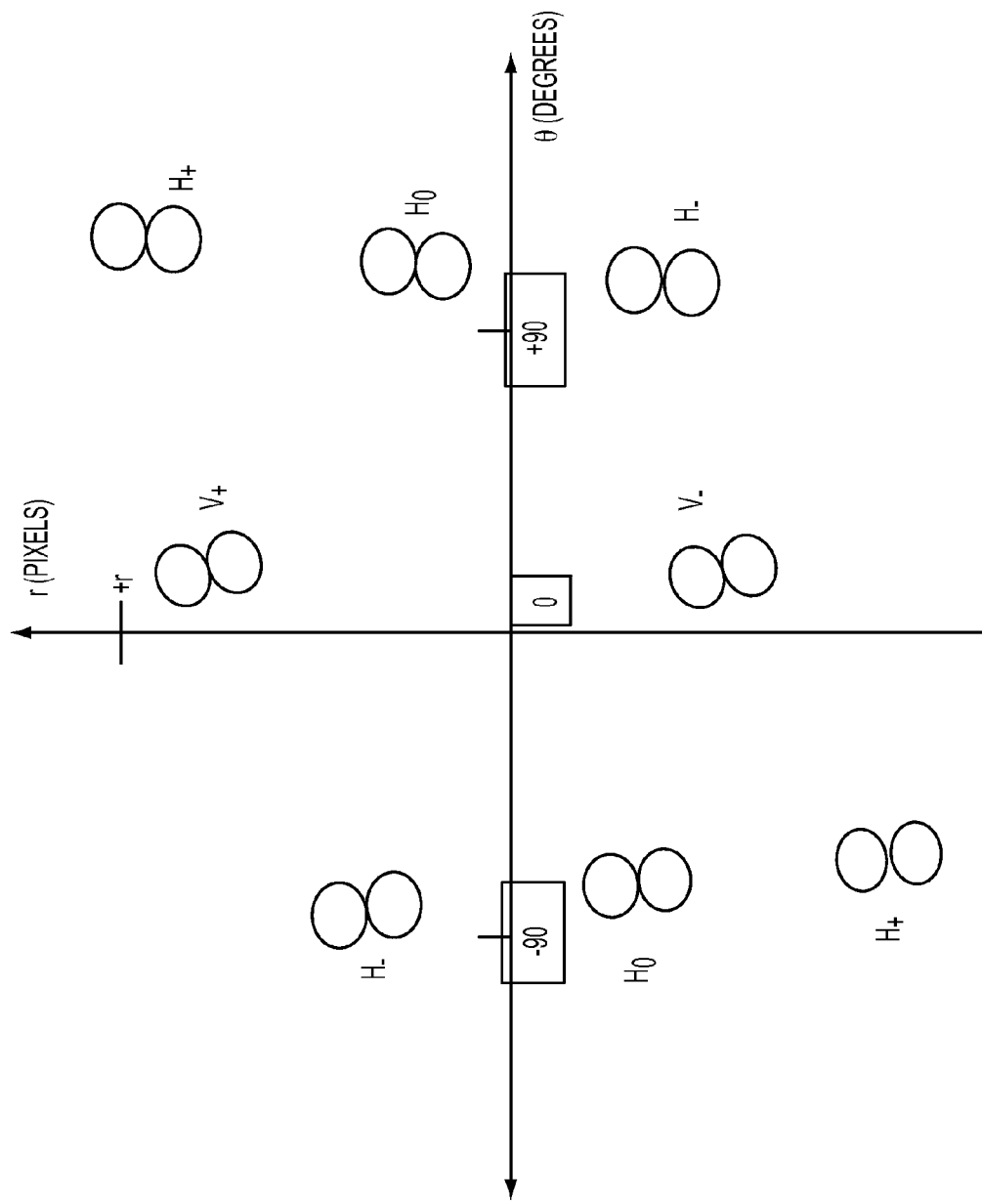
FIG. 16 is a diagram illustrating an example Hough transform accumulator with the digital camera off center and rotated about all three axes.

The Hough Transform accumulator for a scene containing a substantially unobscured rectangular window or frame casing with sufficient contrast is found to have characteristics that lend themselves to correction of camera rotations about the x (horizontal), y (vertical) and z (optical) axes. Thus, when imaging a window such as that shown in FIG. 14, several peaks will be found corresponding to lines formed by, for example, the frame casing/wall regions, the frame casing/sash regions, the sash/pane regions and, if present, the muntin/pane regions. When positioning the camera for capturing such a window with a reference object in the scene with the camera centered with respect to the window projection, the Hough Transform accumulator will contain peaks at particular values of θ and r. The strongest peaks result from lines or edges resulting from the regions just listed. Centering of the camera by the person capturing the image may be accomplished by using the window reflection of a front-lit scene such that the camera is approximately at the midpoint of the upper and lower sash overlap region. This midpoint corresponds to the (0,0) point in an x(horizontal)-y(vertical) plane of the scene. If the camera is positioned with the imaging plane exactly parallel to such a scene, the Hough Transform accumulator, with θ=0, r=0 at the center, will be as shown schematically in FIG. 15 for a window similar to that shown in FIG. 14 which is equivalent to FIG. 6 and ignores the contribution of the muntins. In this case, the peaks are symmetrical about both the θ axis and the r axis. However, most unaided end users will not be able to position the camera in this way. FIG. 16 shows an example of likely Hough Transform accumulator peak positions in a case where the camera is positioned with respect to the window of FIG. 14 in the lower left corner and also having the camera rotated with respect to the x, y and z axes. Clearly, such rotations destroy the symmetrical aspects present in FIG. 15. To correct for such rotations, the method shown schematically in FIG. 13 may be used. Preview images are subjected to the Hough Transform as described earlier to give, for example, accumulator peak positions shown in FIG. 16 in real time. The end user is instructed, for example by end user viewable text or icon display or sound (e.g., as provided by intelligent personal digital assistant software) provided by the capture device, to center the image sensing portion of the image capture device near the center of the primary object's projection, in this case the window of FIG. 14. When the end user has centered the imager, the end user may communicate this to the capture device software. In doing so, the preview image Hough Transform accumulator peaks will change positions in the accumulator, bringing the peaks closer to symmetric values of r. The capture device software then provides guidance to the end user to rotate the camera about one of the three (x, y or z) axes. The guidance may be in the form of a displayed icon or text or audible sound indicating the direction and amount of rotation needed to bring the camera parallel to the primary object plane. When sufficiently close to parallel about the first axis, the second and third axis rotations are corrected in an analogous manner.

For example, starting with peak positions shown in FIG. 16, software implementing the method of the invention may instruct the end user to rotate about the z-axis until the peaks labeled $H_o$ are located close to θ=+90 and −90 degrees and the peaks labeled $V_+$ and $V_-$ are located close to θ=0 degrees. The software may then instruct the end user to rotate the capture device about its y-axis so that the spread in 0 values of the $H_+$, $H_o$ and $H_-$ at both +90 and −90 degrees is minimized. After the first two rotation corrections, guidance regarding the third axis correction, in this case about the x-axis, is provided by the software to the end user. Such guidance is provided until the pair of peaks H+ at +90 degrees and H− at −90 degrees are brought to the same value of +r (i.e. the spread of r values is minimized), as well as the pair of peaks $H_+$ at −90 degrees and $H_-$ at +90 degrees are brought to the same value of −r. When all three axis rotation corrections have been performed, the preview image Hough Transform accumulator peak positions resemble those shown in FIG. 15 and the software provides a visual, tactile or audible indication that the camera is properly positioned. When the end user holds the camera in this position for a predetermined period of time, for example at least about 0.3 second, preferably at least about 0.5 second, software may then automatically activates an electronic shutter to capture the image with the image sensor very nearly parallel to and centered with respect to the primary object. It will be appreciated by those skilled in the art, that values for θ and the vertical and horizontal orientations may be different depending upon the Hough Transform space definition and the camera sensor orientation with respect to the scene. In addition, those skilled in the art will appreciate that a similar approach to correcting tilt prior to capture may be used for circular objects such that two lines at +r and −r are made straight through rotation corrections about the camera vertical and horizontal axes. In this case, the optical axis rotation has no effect on the Hough Transform.

If the reference object is in a substantially different parallel plane than the desired measurement length for custom part fabrication, a further error is introduced. For the reference dimensions to be substantially in the same plane as the constraint dimensions, the distance from the reference object dimension plane to the constraint plane is within 0.1 times the shortest calculated constraint dimension. A reference object edge dimension is preferably placed in contact with and parallel to a plane of the constraint dimensions to be calculated. In one embodiment, the reference object plane is placed in contact with and parallel to a constraint plane thus providing two reference dimensions from which constraint dimensions may be calculated. If desired, barrel or pincushion distortions may also be removed. Once such distortions have been substantially removed, reference objects in the image are located using semi-automated or automated methods (FIGS. 9 and 10), the reference dimension in the image is used to correlate the actual length to a number of pixels or other digital ruler. By counting pixel length, the actual length of any height or width dimension may be estimated using the known correlation. Alternatively, commercially available 3D metrology software such as Visual Size, uPhotoMeasure or Autodesk may be used to calculate the desired dimensions using the reference dimensions and identified measurement lengths.

Figure 17:
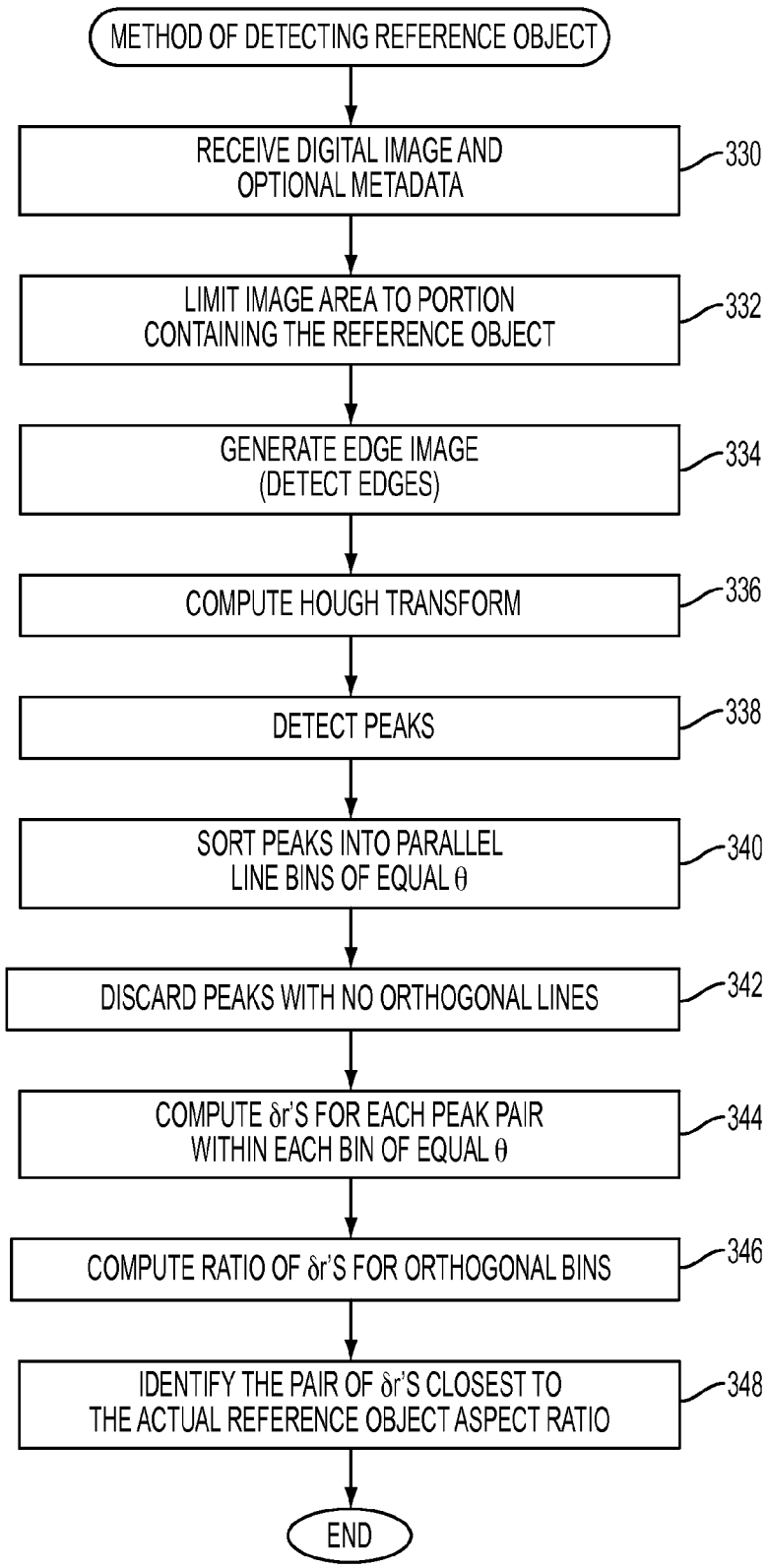
FIG. 17 is a flow diagram illustrating an example reference object detection method.

Locating the reference object in the digital image may be done using a variety of methods. One such method is shown in FIG. 17. For example, using metadata such as that provided by the end user by tapping a point on a touch screen display showing the captured image, where the point is near or part of the reference object in the captured image. Storing the location of the tapped point with the image as metadata allows later image processing to more easily find the reference object. The bounding edges of the reference object may be found during image processing using, for example, a Hough Transform to find pairs of perpendicular image lines surrounding the tapped point. Alternatively, the reference object may be found with end user supplied reference object type metadata. In one such embodiment, the end user may place the reference object as described above, but with its edges rotated with respect to sash or frame lines in the primary object so that a Hough Transform distinguishes the reference object from other rectangles in the image. Thus, a piece of printing paper or a credit card having its edges at an angle of about 20 to about 70 degrees relative to the lines of the primary object leads to maxima in the Hough Transform accumulator that are easily distinguished from the primary object maxima angles. Alternatively, metadata described above may be used to limit the portion of the image, for example by cropping and/or zooming, to that containing the reference object which may have edges aligned with other rectangles in the image. Such a limited image portion may then undergo the Hough Transform. In such embodiments, two pairs of maxima are generated which are separated by 90 degrees in θ, the first pair having an angle of $θ_1$ degrees being separated in distance by on and the second pair having an angle of $\theta_1+90$ degrees being separated in distance by $\delta r_2$. The reference object is confirmed when the ratio $\delta r_1/\delta r_2$ substantially equals the aspect ratio or inverse of the aspect ratio of the reference object as provided by the end user. The four lines found in this manner are the lines that bound the reference object and therefore provide the location and angular orientation of the reference object. The values of $\delta r_1$ and $\delta r_2$ may then be used as the pixel pair for the reference object and used directly from uncorrected or perspective corrected images or as a rough pixel pair in aspect ratio optimization, as described below, to calculate calibration factors.

Image processing may include several types of algorithms. In its most fundamental embodiment, the present invention utilizes perspective correction based on the perpendicular arrangement of features found in most windows. Using an orthogonal grid aligned to the original image borders to measure deviations for vertical and horizontal, features of the window are brought into alignment with the orthogonal grid through rotation, vertical and/or horizontal perspective adjustment. Optionally, barrel or pincushion distortion may also be used. The alignment may be done in a semi-automated process using software such as PTLens or Photoshop Camera Distortion Correction Filter where an operator visually judges the accuracy of the alignment to the grid. Alternatively, an automated process may be used in which edge, corner or rectangle detection algorithms as are known in the art, such as Canny or Sobel edge detection, Hough transforms, or contour detection algorithms, are used to identify lines, corresponding to frame or window elements as well as rectangular reference objects, that are perpendicular to each other. For reference objects having known aspect ratios, the known aspect ratio may be used to eliminate rectangles that are not sufficiently close to the true aspect ratio of the reference object and allow automatic identification of the reference object. Once such edges or lines are automatically identified, alignment differences with respect to the grid are minimized, for example by rotations about three mutually perpendicular axes. If curvature in such lines is detected, barrel or pincushion correction may also be applied automatically to minimize alignment differences. Multiple iterations of these corrections, in either the semi-automated or the automated method, may be necessary to minimize alignment differences.

Once distortion corrections have been applied to the image, the rotational relationship of a reference dimension with respect to the corrected image constraint length is used to align a reference dimension to a constraint length to be measured. Identification of a reference object within the image may be aided by the use of metadata regarding the reference object. For example, the end user may supply metadata such as indicating that the reference object is a credit card, its color, its approximate location in the image or its orientation in the image. The credit card's known aspect ratio may then be used, for example with a rectangle detector algorithm, to determine a rectangle within the image having a similar aspect ratio. If the image was captured with both front and back lighting, threshold generation of a black and white version of the image may be helpful in identifying reference object edges. In addition, a depth perspective correction may be applied if the reference dimension is in a plane to the interior or exterior of the plane containing the constraint length to be measured.

Additional metadata may be provided at any time during the process. For example, metadata may be provided prior to capture, immediately after capture, or after perspective corrections have been applied. Metadata may be provided by the end user through manual input, such as answering menu driven questions, or in a semi-automated method wherein image analysis may modify the questions answered by the end user. To aid manual or semi-automated metadata input, it may be beneficial to zoom to portions of the image that are relevant to the process. Methods utilizing random access JPEG, such as those described in U.S. Patent Publication 20080198177, U.S. Pat. Nos. 7,652,595 and 7,038,701, or other zooming methods as are known in the art may be useful for such metadata input.

A fully automated metadata gathering method may be used in which image analysis automatically generates metadata, for example window orientation based on the location of a windowsill or window treatment attribute, used in subsequent constraint calculation. Metadata that may be useful in the present invention includes the window orientation, window type (e.g., single or double hung, sliding, casement, fixed), and location and type of object in the image such as a reference object or window treatment and associated control mechanism. In addition to image related metadata, the end user may provide order information, such as payment and delivery information and preferences, at any time during the process prior to submitting an order. End user preferences may include the type of sheet including material composition, optical properties, the number and location of sheets and whether window or window shade operability is desired. Additionally, metadata or constraint calculation accuracy may be confirmed with the end user as part of the process, optionally using the digital image or annotated version of the digital image.

A flow diagram illustrating an example reference object detection method is shown in FIG. 17. The digital image and any optional metadata are received (step 330). The image area is limited to the portion containing the reference object (step 332). The edge image is then generated (i.e. edge detection is performed) (step 334). The Hough transform is performed (step 336) and the peaks in the transform results are detected (step 338). The peaks are sorted into parallel line bins of equal theta (step 340) and those peaks with no orthogonal lines are discarded (step 342). The $\delta r$'s for each peak pair within each bin of equal theta are computed (step 344). The ratio of $\delta r$'s for orthogonal bins is then calculated (step 346). The pair of $\delta r$'s closest to the actual reference object aspect ratio is then identified (step 348).

Prior to calculating constraint dimensions, it may be useful to calculate calibration factors, $C_v$ and $C_h$, for the image using the reference object pixel dimensions, $V_{ref}$ and $H_{ref}$ and the known reference object physical dimensions $V_{refphys}$ and $H_{refphys}$. Such calibration factors may be calculated using an uncorrected, perspective corrected or perspective corrected with aspect ratio optimization images.

$$C_v = V_{ref}/V_{refphys} \qquad (15)$$

$$C_h = H_{ref}/H_{refphys} \qquad (16)$$

Constraint pixel dimensions obtained from the image, $V_{con}$ and $H_{con}$, may then be converted to physical dimensions, $V_{concalc}$ and $H_{conpcalc}$, by dividing by the respective calibration factor.

$$V_{concalc} = V_{con}/C_v \qquad (17)$$

$$H_{conpcalc} = H_{con}/C_h \qquad (18)$$

Alternatively, when using an image with substantially square pixels, the calibration factors may be averaged to obtain a single calibration factor for the image. The calculated physical constraint dimensions may then be used to specify and design custom supplemental parts corresponding to the chosen constraint.

Figure 18:
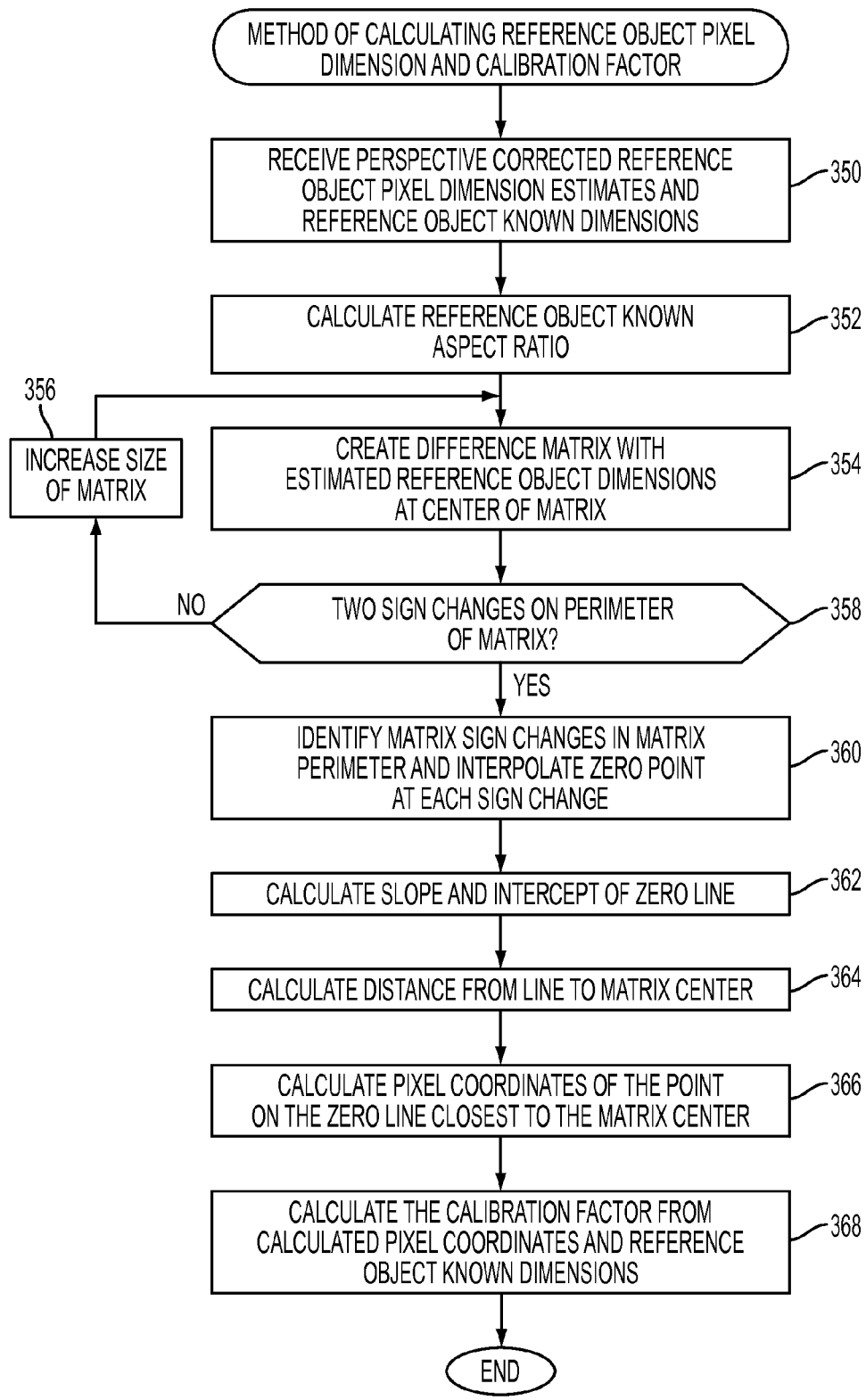
FIG. 18 is a flow diagram illustrating an example method of calculating reference object pixel dimensions and calibration factor.

With image correction and reference alignment information, constraint dimensions are calculated from the calibration factor and the reference object angular offset from the orthogonal features of the constraint. Due to window reflections, misalignment of the reference object plane and the constraint plane and camera movement, it may also be helpful to use the known aspect ratio of the reference object to determine a best fit for the pixel dimensions of the reference object in a perspective corrected image. Referring to FIG. 18, in one embodiment, the best fit may be found by initially determining rough reference object pixel dimensions ("rough pixel pair") using, for example, colors within a preselected tolerance such as that employed by the Adobe Photoshop "Magic Wand" tool, or edge detection within a preselected pixel width, such as that employed by the Adobe Photoshop "Magnetic Lasso" tool. Edge detection methods or shape detection methods such as a rectangle detector are preferred for defining the reference object in the image. Edge detection methods useful in the present invention also include such as Canny, Sobel or Laplacian of Gaussian (filtering) methods.

Beginning with the rough reference object pixel dimensions, a matrix of aspect ratio differences from the true aspect ratio of the reference object is constructed. The matrix should be within +/−10 pixels, preferably within +/−5 pixels, in both the vertical and horizontal directions from the rough pixel pair. Such a matrix should contain a diagonal bordered by integer pixel pairs that have different signs, thus corresponding to the locations of the correct aspect ratio within the matrix. Starting at the rough pixel pair in the matrix, the nearest pixel pair dimensions providing the correct aspect ratio is found. The nearest correct aspect ratio pixel pair may be an integer pair or a non-integer (fractional) pair determined by interpolation between an integral pair. When using an integer pair for subsequent calculations, it is possible that two pairs are equally close in the matrix to the rough pixel pair. In such cases, either of the following methods may be employed: 1) the pair having the lower difference from the true aspect ratio may be chosen for subsequent calculations or 2) averaging of the two horizontal values to obtain a horizontal pixel value and averaging of the two vertical values to obtain a vertical pixel value may be performed, followed by rounding to the nearest integer pair giving the smallest difference from the true aspect ratio.

Optionally, determining the pixel ratio of a known reference object feature (e.g., a portrait depicted on currency or magnetic stripe on a credit card) to the overall dimensions of the reference object may be used to assist in determining the length and width pair providing the best fit. Alternatively, the equation of the diagonal may be determined from interpolation between each of two integral pixel pairs bordering the diagonal and the nearest pixel pair on the diagonal may be calculated from standard equations used to determine the point on the diagonal line that is closest to the starting rough pixel pair. If the rough pixel pair for the reference object pixel dimensions determined using, for example, an edge detector on a perspective corrected image, is $(x_1, y_1)$, the slope of the zero difference diagonal is m and the y-intercept is b as determined by interpolation, the following equations may be used to calculate the nearest point $(x_0, y_0)$ on the zero difference diagonal:

$$x_0 = ((my_1) + x_1 - mb)/(m^2 + 1) \quad (19)$$

$$y_0 = ((m^2 y_1) + (mx_1) + b)/(m^2 + 1) \quad (20)$$

$x_0$ and $y_0$ are then used as the aspect ratio optimized reference object pixel dimensions for calculation of constraint pixel dimensions, $\lambda_h$ and $\lambda_v$.

When using methods that utilize edge detection, it may be useful to average a plurality of estimates, for example using starting points within and outside the object edge and averaging the detected edge locations, to obtain an initial rough pair of reference dimensions that can be used to generate the matrix from which the nearest minimum may be determined. Optionally, after determining a best fit for the pixel values, this pair may be compared to the image to confirm the match to the actual reference object edges in the image. If an arc is present in the constraint, such as in a circular or arch shaped window, chord lengths and angles may be calculated to determine the constraint dimensions.

If such a matrix just described fails to encompass a correct aspect ratio diagonal, a new rough pixel pair may be determined by the methods described above. If after a preselected number of attempts no correct aspect ratio diagonal is achieved within the matrix, the end user may be notified that capture of a new image is needed. Also, it will be appreciated by those skilled in the art that a matrix similar to that described above may be constructed using the quotient, rather than the difference, of aspect ratios where a diagonal of quotients equal to one is used to find the closest correct aspect ratio.

A flow diagram illustrating an example method of calculating the pixel dimensions and calibration terms of the reference object is shown in FIG. 18. The method begins with a perspective corrected reference object pixel dimension estimates and reference object known dimensions (step 350). The reference object known aspect ratio is then calculated (step 352). A difference matrix is calculated with estimated reference dimensions at the center of the matrix (step 354). If there are no sign changes on the perimeter of the matrix (step 358), the size of the matrix is increased (step 356). Otherwise, the matrix sign changes in the matrix perimeter are identified and the zero difference point at each sign change is interpolated (step 360).

The slope and intercept of the zero difference line is then calculated (step 362) and the distance from the line to the matrix center is calculated (step 364). The pixel coordinates of the point on the zero difference line closest to the matrix center are calculated (step 366). Finally, the calibration factor is calculated from calculated pixel coordinates and reference object known dimensions (step 368).

When using automated methods to determine the reference object aspect ratio, metadata is used to zoom or subsample the image so that the reference object provides the dominant lines. The Hough Transform will then provide four peaks, assuming a rectangular reference object, corresponding to lines of the reference object edges, in two pairs separated by ninety degrees. The difference in the r values of the peaks at the same angle provides the reference object pixel dimensions as described earlier. Again, a matrix method such as just described may optionally be used to optimize the reference object pixel dimensions before calculating the calibration factor.

Other approaches to constraint dimension calculation useful in the present invention utilize vanishing point techniques or 3D image processing algorithms. Vanishing point methods, such as those described by Criminisi (for example, International Journal of Computer Vision 40(2), 123-148, 2000) or uPhotoMeasure may utilize a single image with a reference dimension, such as a reference object of the present invention, or using two or more images. 3D image processing algorithms, for example those offered by uPhotoMeasure which uses a known dimension in one image, or Autodesk or VisualSize, which use a known dimension in at least two images, to obtain other dimensions within the images. Again, a reference object of the present invention may be used with these algorithms. Vanishing point and 3D techniques may also be useful to provide depth information where sill plane and edges, top edges of a lower sash and in-frame corners and planes may be used to aid in determining the vanishing point.

In the above methods, it may be necessary to locate the intersection of a lower interior face sash plane and an inward facing sill surface plane, which often will be very similar in color and contrast throughout the length of an intersection line. In the case of replacement windows, caulking, also of similar color and contrast, may also be present at the intersection line. To aid in defining such an intersection line, as well as other lines around the frame including constraint lines, application of filters such as high pass, Laplace, directional filtering, use of structuring elements, shadow/highlight or brightness contrast adjustments can be useful. When the image is captured under backlit conditions, shadows from frame, sash or muntins may be cast onto the sill that may be used to identify the intersection line, though often with small errors due to any depth offset of the element causing the shadow from the intersection line. A preferred method for capturing an image is to backlight or front light a portion of the window at an angle that may cast a shadow on the sill while also front lighting the fenestration. This may be accomplished when a portion of the window is movable, for example, by capturing the image at night with room lighting and a small battery operated lamp (e.g., a book light or small flashlight) placed in the frame behind a muntin or sash/pane interface or placed to the outward edge of a vertical frame element. In these cases, the shadow/highlight line cast on the sill plane will change direction at the sill-sash intersection line. Alternatively, once the sill plane is defined, it may be used as a "ground plane" from which distances may be measured using a vanishing point along a vertical.

Alternatively, an object that conforms to the sill and sash planes and their interface and which provides sufficient contrast to allow the line interface to be identified may be placed in the scene by the end user during image capture. For example, a piece of opaque tape such as electrical tape, duct tape or masking tape or a piece of lined paper may be adhered on an angle, preferably about 45 degrees to the line interface of the inward facing sill surface and the lower interior face sash plane. The parallel tape edges that cross the interface line will then change direction at the interface forming a detectable angle, thus providing two positions that define the interface line. This method is particularly useful when image capture is performed under front lighting conditions.

Additional accuracy of reference and constraint line determination may be obtained using methods that minimizes the effect of camera motion during exposure. In one such method of image deblurring, the camera motion kernel during exposure is obtained from the blurred image. The motion kernel is then used to correct the blurred region of interest in the image. Preferably, such correction is limited to the image regions containing the reference object and constraint surfaces and lines to minimize computational power required for such correction.

In another embodiment, software incorporated in the capture device, such as CameraSharp, corrects for camera movement at the time of capture or measures the amount of movement and alerts the end user to capture a new image if the movement is found to be above a predetermined threshold. The predetermined threshold may be varied depending upon the size of the reference object used or the ratio of its size to the size of the image captured. Also, it is preferable to keep the exposure time as small as possible while still capturing sufficient light to identify the reference object and constraints in the image. Preferably, the exposure time should be less than 0.125 second. Additionally, to inhibit the impact of end user movement during image capture, it is preferred to minimize or remove delay between the end user shutter actuating movement and the actual shutter actuation or to use voice actuation of the shutter. Such exposures may be enabled using software that overrides any device manufacturer incorporated shutter actuation delay.

The digital image undergoes image processing that provides dimensional information for the fenestration, frame and treatments so that appropriately dimensioned custom supplemental parts may be designed and manufactured for installation at the fenestration site. More specifically, an end user, such as the owner or renter of an indoor space having a window or someone hired by such owner or renter, selects a window in that space for modification to decrease optical transparency or heat flow by conduction and/or emission through the fenestration. The end user obtains a digital image of the selected window. The digital image may be obtained using any type of image capture device such as a mobile device containing an image sensor or in communication with an external image sensor (e.g., a webcam), for example a digital still, including rapid multi-exposure digital still, or video camera, a camera phone or smartphone, a laptop computer, a tablet computer or other mobile device.

After obtaining the digital image, the digital image and associated metadata undergo digital image processing. The digital image processing may occur in one or more locations depending upon computing power and software availability as well as the extent to which automation is used. In one embodiment, the end user sends the digital image and associated metadata to a service provider. As part of the metadata provided by the end user, the end user may click or tap on lines or surfaces or use a crop tool to identify locations on the fenestration image to be used for calculating constraint dimensions. The end user metadata input may be provided using a software application that prompts the end user for specific information that will aid in calculating the constraint dimensions.

When custom supplemental parts for more than one window is desired by the end user, the end user may indicate aspects of all the windows that are to be the same so that the metadata input by the end user may be less cumbersome and redundant images may be omitted. The software application may also include image comparison capability so that similar windows may be automatically suggested or identified. Such image comparison capability may include identifying windows having the nearly identical dimensions, framing, sash in-frame and tilt lock locations, muntin type and location, and sash handle type and location.

In one embodiment, the service provider uses digital image processing algorithms to determine the dimensions of, for example, the window, window frame or window treatments. The dimensions are used to design, either automatically or semi-automatically, custom supplemental parts that will fit to the window and/or frame, taking into consideration operability of the window, any window treatment present and end user preference. The design is then used to custom fabricate at least custom supplemental part and means for supporting such custom supplemental part so that at least a portion of the window may be covered. Alternatively, software may be used by the end user so that image processing and calculations may be performed with the capture device. Image processing and/or calculational software may also be used by the end user, service provider and/or fabricator in conjunction with a computing device, store based kiosk or other computing devices or services such as cloud computing services, or any combination thereof.

In one embodiment, metadata regarding the conditions of the image capture at the time of digital image capture are obtained. If the device used to obtain or capture the digital image provides metadata with the digital image, such metadata is used to minimize end user input of metadata. For example, the present invention can beneficially use standard metadata formats such as those governed by Exif, IPTC, XMP, DCMI or PLUS. Such formats provide information that may be useful for applying image corrections including the capture device make and model, orientation/rotation, compression, resolution, flash use, focal length, aperture value, ISO speed and pixel dimension, shutter speed and lighting.

Additional metadata provided by the end user may be provided at the time of image capture or at another time using another digital device such as a computer, kiosk or website. End user metadata may include specific window information if custom supplemental parts are to be provided for more than one window. For example, a window identifier such as "Joe's Bedroom South Wall" might be used to distinguish from "Joe's Bedroom West Wall". Such an identifier may remain with the image through manufacturing of the parts associated with a given window so that the identifier may be printed or embossed on each part associated with that window. Also, the end user may wish to specify what type of custom supplemental part is desired. For example, different types of plastic sheets may be used to cover a window, such as transparent, semi-transparent, opaque, tinted or low-e with variations of solar gain. The plastic sheet may have additional functionality such as a flexible solar cell array as is known in the art, for example as suggested in U.S. Pat. No. 7,675,057 and U.S. Patent Publication 20120125419.

In addition, the end user may provide a manual measurement to aid in the calculation of other dimensions. Depending upon what type of supplemental part is desired by the end user, different sets of mounting surfaces may be used so the user may specify, on the capture device or other device, which surfaces are to be used for mounting as part of the metadata. Manual measurement may be done using devices such as rulers, tape measures and digital measuring devices such as laser distance measuring tools. When providing manual measurements, the end user may specify the length measured along with pixels in the digital image corresponding to the end points of the length measured. Further, the end user may provide metadata about reference dimensions in each image such as location and numerical value of reference dimensions. Methods for facilitating location metadata input may include zoom capability as is known in the art, which may be exemplified by software such as random access JPEG described in U.S. Pat. Nos. 7,038,701; 7,652,595; and 7,847,711 to allow for location identification using the capture device. Alternatively, the image may be transported to a computer, uploaded to a website or transferred to a kiosk to allow the user to point and click on the reference object and enter information about the reference object.

Additional user provided metadata may include identification of surfaces to which the supplemental parts are to contact. Once the contact surfaces are identified, either based on user provided metadata or automated determination, these surfaces are provided to a two dimensional or three dimensional algorithm for calculating their dimensions so that appropriately sized supplemental parts may be fabricated. For single sheet overlays, flat surfaces are preferred and may include portions of the interior frame, sill, or wall immediately surrounding the window. When one or more sheets are to be placed within the frame, inner frame surfaces, channel edges, sash bottoms and/or outside storm framing edges are identified either by the end user or in an automated or semi-automated manner. When depth information is required for order fulfillment, an image containing a nearly perpendicular view of the side channels with an appropriate reference object is helpful. In addition to sash depth information, the frame depth and sill to stool height may also be calculated.

The methods described for correcting images of fenestration are particularly useful when used to design custom supplemental parts having means of conformable deformation when compressed within the constraint surface dimensions calculated. Deformation means may be incorporated into the custom supplemental parts through the use of continuously deformable means, for example, cantilevers, compressible foam, for example a polymer foam, or tube, or piles. Such conformable compression means may also be used in conjunction with continuous or non-continuous adjustment means such as a snap fit means. The compressible and adjustment means may be used to provide compression fit to more than one depth location of the window frame since there are relatively small differences in the window frame dimensions at different depths within the window frame. Thus, a single set of custom supplemental parts may be used with different constraint surfaces.

In another embodiment of the present invention, measurements from end user provided images may be corrected using lookup tables and camera metadata. The lookup tables may contain camera specific information about distortions (e.g., optical distortions such as lens related distortions) that could lead to measurement errors, including barrel, pincushion or complex distortions. The lookup tables may be based on previous calibration studies for each particular camera.

With image and associated metadata information, relevant constraint surface dimensions are calculated. The calculation of lengths may be done automatically for all possible products and surfaces or may be limited to those selected by the end user/designee provided metadata. Lengths may be automatically calculated based on image information showing consistent continuous surfaces for mounting. Alternatively, a semi-automated method may be used in which such surfaces may be identified from metadata provided by end user/designee or by the service provider with human intervention.

With calculated lengths available from measurement algorithms described supra, custom supplemental parts are then fabricated. Using metadata provided by the end user or designee, appropriate materials are used, cut to size, imprinted with relevant information and packaged. For example, the end user or designee may specify among several options such as overlay or in-frame, adhesive or pressure mounting, location of adhesive mount if chosen, whether window or window blind operability is desired, if multiple sheets are to be used how many and where they are to be mounted. Such metadata may have been provided prior to submission of an order.

Alternatively, the end user or designee may wish to obtain a cost estimate prior to submitting an order. In this case, very rough measurements made prior to any image distortion correction may be used to estimate the materials needed for various supplemental parts so that various options and their associated costs may be provided prior to order submission. With this information, an order may be generated to a centralized fabrication site or multiple distributed fabrication sites. Centralized fabrication entails fabrication of all custom supplemental parts at a single site where the parts may also be assembled for packaging and delivery to the end user. When distributed fabrication is used, each fabricator may fabricate a subset of the parts necessary for full functionality of the delivered product. The subset parts may be sent to an order collation site for packaging and/or assembly of final product parts prior to shipping to the end user. To minimize material waste during fabrication, it may be desirable to compile multiple orders for each subset part to allow for an optimized fabrication run.

It will be appreciated that measurements made by the methods described herein may also be useful for applications that do not lead to fabrication of parts. For example, if the primary object in each of a plurality of images is a different wall of the same room, it is possible to obtain the dimensions of a room for real estate, architectural, engineering, or any other purpose. Alternatively, by measuring a dimension of a piece of furniture located remote to a room in which it is desired to place the piece of furniture, it is possible to determine whether the piece of furniture will fit properly within a desired space in the room using the present invention to measure room dimensions. It will also be appreciated that using multiple reference objects residing in different planes and substantially coplanar with primary objects that are parallel to the imaging plane may be used to measure multiple primary objects that are captured in the same digital image.

Mounting Embodiments

Figure 19:
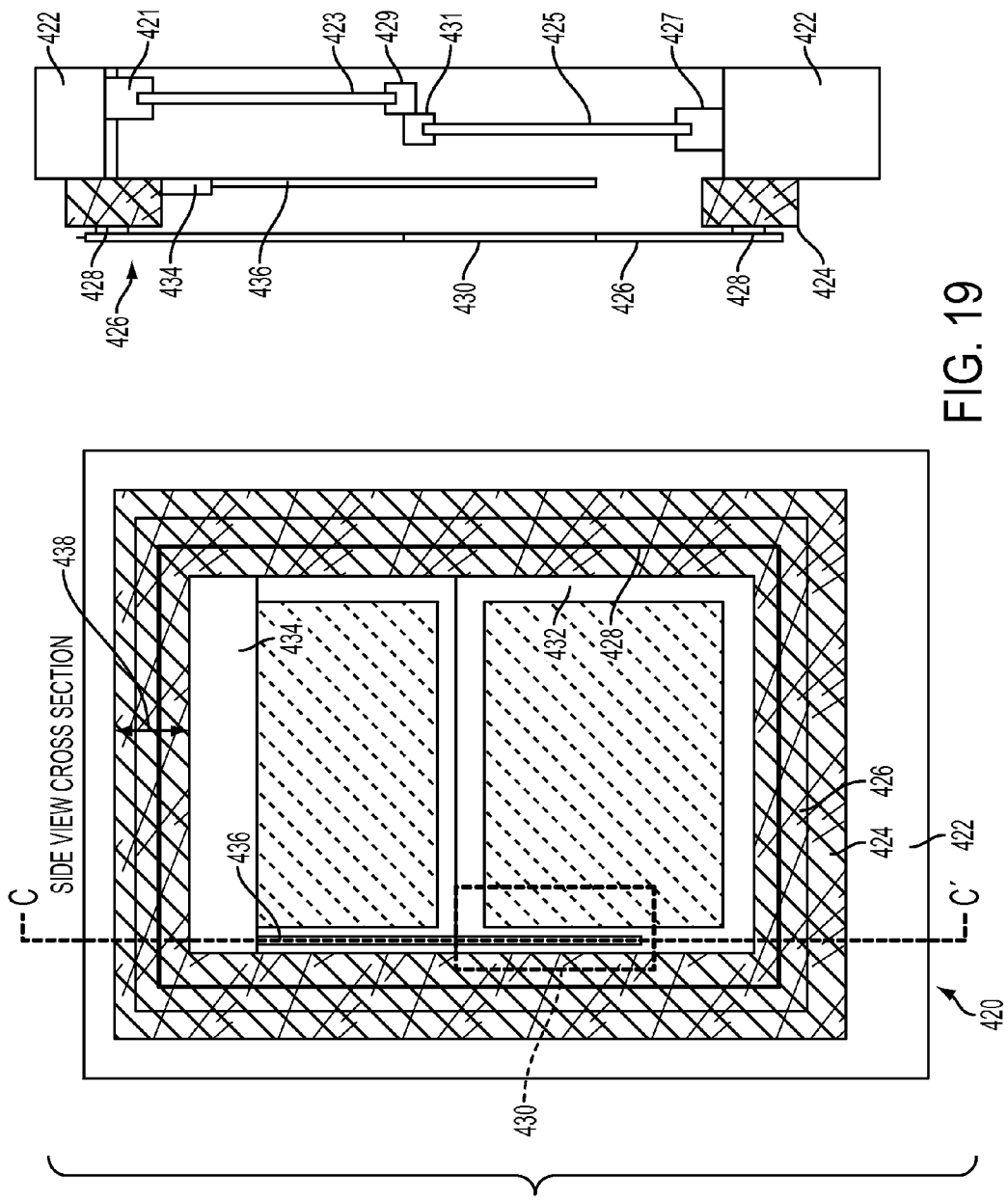
FIG. 19 is a diagram illustrating a first example mounted custom supplemental part manufactured in accordance with the present invention.

The present invention provides for several embodiments for mounting of plastic sheet material in or over fenestration. In all embodiments, there is an adjustable feature in the mounting, examples of which are shown in FIGS. 19 through 25. For example, if mounting on the interior face of a window frame, the width 438 of the frame casing elements may provide for on-site continuous adjustment of the mounting, as shown in FIG. 19. In this Figure, a front and side view of the window is shown. The window, generally referenced 420, comprises wall 422, frame casing 424, plastic sheet 426, adhesive 428, re-sealable hatch cover 430, upper and lower double hung window 432, blind 434 and blind actuator (e.g., wand) 436, sash rails 421, 427, 429 and 431, top sash window pane 423 and bottom sash window pane 425.

Another example of a continuously adjustable feature is a compressible portion of the support that holds the plastic sheet material. Such compressible portions may contact inward or outward facing surfaces of the frame or trim casing. Optionally, a second adjustable feature may include a continuously or discretely settable locking element that allows for multiple set positions of custom supplemental parts with respect to each other. In addition, each embodiment creates a "dead air" space, preferably having a depth of less than about 0.75" so as to inhibit formation of convective loops. Such "dead air" spaces optionally may have within their volume a desiccant material to keep the humidity of the space low and decrease the possibility of condensation forming in the space, particularly when one side of the space is a windowpane in direct contact with the outdoors.

To allow for actuation of window or window treatment operating elements with the supplemental parts still mounted, a re-sealable hatch closure 430 may be incorporated as part of the plastic sheet as shown in FIG. 19, though this feature may be incorporated in embodiments mounted as described elsewhere. Such an embodiment may include the use of an adhesive that is resealable or zipper type connections including plastic zippers, such as those used to seal plastic bags and heavy duty plastic zippers such as Maxigrip zip closures available from ITW, having one side of each zipper pair adhesively, melt or solvent seal connected to the sheet and one side adhesively, melt or solvent seal connected to the hatch. When incorporating a hatch closure, it is preferred to have one edge of the hatch in close proximity to the support or frame so that the support or frame may act as a surface against which pressure may be applied in order to reseal the hatch. In a further embodiment, a portion of the hatch may be closed using a portion of the support or frame casing.

In one embodiment, the present invention is particularly well suited to work with windows and associated framing that are substantially rectangular in shape where the intent is to provide sealed cover for at least three edges of rectangularly framed windows where the fourth edge may be substantially blocked by a window treatment or frame that inhibits the flow of air out of the cavity. Preferably, the cover seals all four edges of rectangularly framed windows. While the examples of groove and spline supports show the groove to be exterior to the spline, the positions of these support pieces may be interchanged. While the following embodiments are described as supplemental parts to be added to windows, those skilled in the art will appreciate that these embodiments, or the mounting support portions thereof, may also be provided as integral parts of enhanced new or replacement windows.

The length dimensions needed for custom supplemental part fabrication are dependent upon the type of part desired. Referring to FIG. 19, in one embodiment of the present invention, a plastic sheet and associated support is provided so that the plastic sheet covers all or part of the interior face of the window. Such a plastic sheet may be supported by means known in the art such as adhesive that connects the plastic sheet to the window frame and window sill or to the wall into which the window is placed. In such cases, lengths of the height and width of the frame sides, top and bottom are used. If a sill framing element is present, its depth measurement is useful. Also, the depth of each interior facing frame element is desirable if adhering to the wall adjacent to the window. Alternatively, adhesion to the interior or exterior sash frame surfaces may be used such that the sash is operable with the plastic sheet attached. In one embodiment, the adhesive is provided in the form of double-sided tape or on the connecting surface of a male/female interlocking snap-in channel. In the former case, one side of the double-sided tape may adhere to the plastic sheet and the other side may adhere to the window frame or wall. In the latter case, the adhesive is on one side of one of the interlocking snap-in channel parts and the adhesive may contact the wall or window frame face.

In the present invention when using double-sided tape or applying adhesive, for example a pressure sensitive adhesive such as a water-based acrylic, silicone, or polyvinyl acetate adhesive or a composition containing a plurality of components to provide adhesion over a wide temperature range and/or under ultraviolet radiation as are known in the art, directly to the plastic sheet and covering the applied adhesive with a protective cover for shipping prior to mounting, the appropriate size and shape of plastic sheet as well as the position of adhesive on the plastic sheet is determined from the digital image and, optionally, from metadata provided by the end user. For example, the end user may indicate as metadata where on the window frame, sash or wall adhesion is desired. Such metadata may be provided by the end user using a software program on a capture device, a computer, a website or a retail kiosk.

Figure 20:
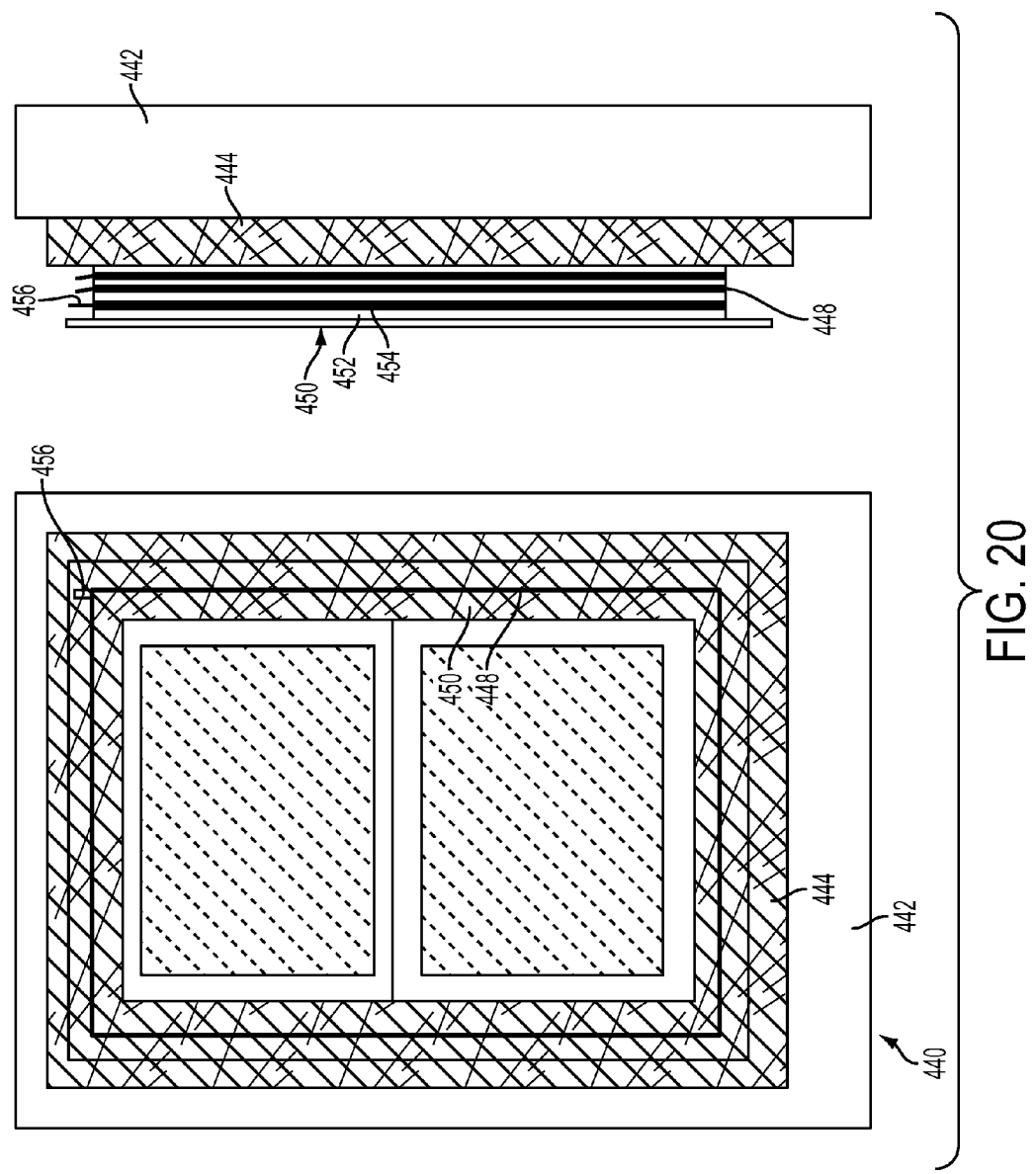
FIG. 20 is a diagram illustrating a second example mounted custom supplemental part manufactured in accordance with the present invention.

Alternatively, the service provider may choose the adhesion sites in a semi-automated or fully automated way, which optionally may be based on other metadata, such as cost, the position of secondary objects near the fenestration site, or other preferences provided by the end user. From dimensions obtained from the digital image, plastic sheet material is provided to match the desired size and shape so that the end user does not need to alter the provided plastic sheet size or shape. Further, when using adhesive, multiple layers of alternating adhesive and non-adhesive material may be used, providing a stack containing a plurality of superimposed adjacently adhered frame forming stripes comprising multilayer adhesive 448, to allow re-use of the same plastic sheet through multiple mount/de-mount cycles, as shown in FIG. 20. In this Figure, a front and side view of the window is shown. The window, generally referenced 440, comprises wall 442, frame casing 444, plastic sheeting 450 and multilayer adhesive 448 consisting of layers of adhesive 452 and non-adhesive material 454.

Such multilayer adhesive 448 may be designed in a continuous frame shape or a frame shape composed of two or more segments that abut each other so as to provide an air barrier when mounted to the window frame. In such configurations, after demounting, the contacting adhesive layer may be removed, thus exposing a fresh adhesive layer for subsequent mounting with satisfactory formation of "dead air" space. In addition, the custom supplemental product of this embodiment may be provided with a replaceable removable non-adhesive protective layer to guard the outermost adhesive layer when it is not mounted. Adhesives useful for mounting plastic sheet to window frames for applications such as the present invention are known in the art, for example those described above, and may also be used in the adhesive layers of the multilayer frame described supra.

In another embodiment, a portion of the non-adhesive layers may be provided as a tab 456 that does not adhere to neighboring non-adhesive layers to facilitate removal of the used adhesive layer after demounting and prior to remounting of the multilayer. Such a non-adhering tab may extend beyond the multilayer frame as shown in FIG. 20 or it may be created at the edge of the multilayer frame through application of an additional thin non-adhesive coating as are known in the art, for example a coating that contains a silicone material, at a corner of a previously applied adhesive layer or omitting adhesive application from the corner portion of the previous non-adhesive layer. In a further embodiment, more than one plastic sheet may be provided with such multilayer frames or other separator frame, preferably made from insulating material such as plastic, rubber, foam or felt, separating the plastic sheets, preferably with less than about 0.75 inch spacing between the plastic sheets. Such additional plastic sheet and multilayer or separator frame may be supplied either with the first plastic sheet or may be added by the end user subsequent to the receiving first plastic sheet.

For very large windows, such as picture or bay windows, whose smallest dimension may exceed the dimensions available for plastic sheeting, the fenestration area may be subdivided by custom supplemental muntins or mullions providing spacing between the plastic sheet and window and providing surface adhesion area so that more than one plastic sheet be used to cover the entire window area.

In alternative embodiments, support of one or more plastic sheets using pressure mounting may be used within the opening of window framing or around trim casing elements of a window or window complex. FIGS. 21, 22, 23, 24 and 25 show a mounting arrangement for pressure mounting on inward facing frame casing surfaces forming a rectangular opening. Using the opening height and width dimensions and optionally the depth of the handles enables fabrication of support means, such as interlocking snap-in groove/spline, and weatherstrip material, such as foam and/or other compressible and conformable loading mechanism, which may be placed within the opening. Spring loading may be provided by compression of foam or felt weatherstrip materials or mechanical springs such as compression, cantilever, coil springs or a combination thereof, incorporated into the length of at least two, preferably at least three, perpendicular sides of the opening. In one such embodiment, a relatively thin, compressibly conformable material 466, such as foam, felt or pile, resides in the space between the support means and an inward facing frame surface, preferably without use of adhesive on inward facing frame surfaces.

Figure 21:
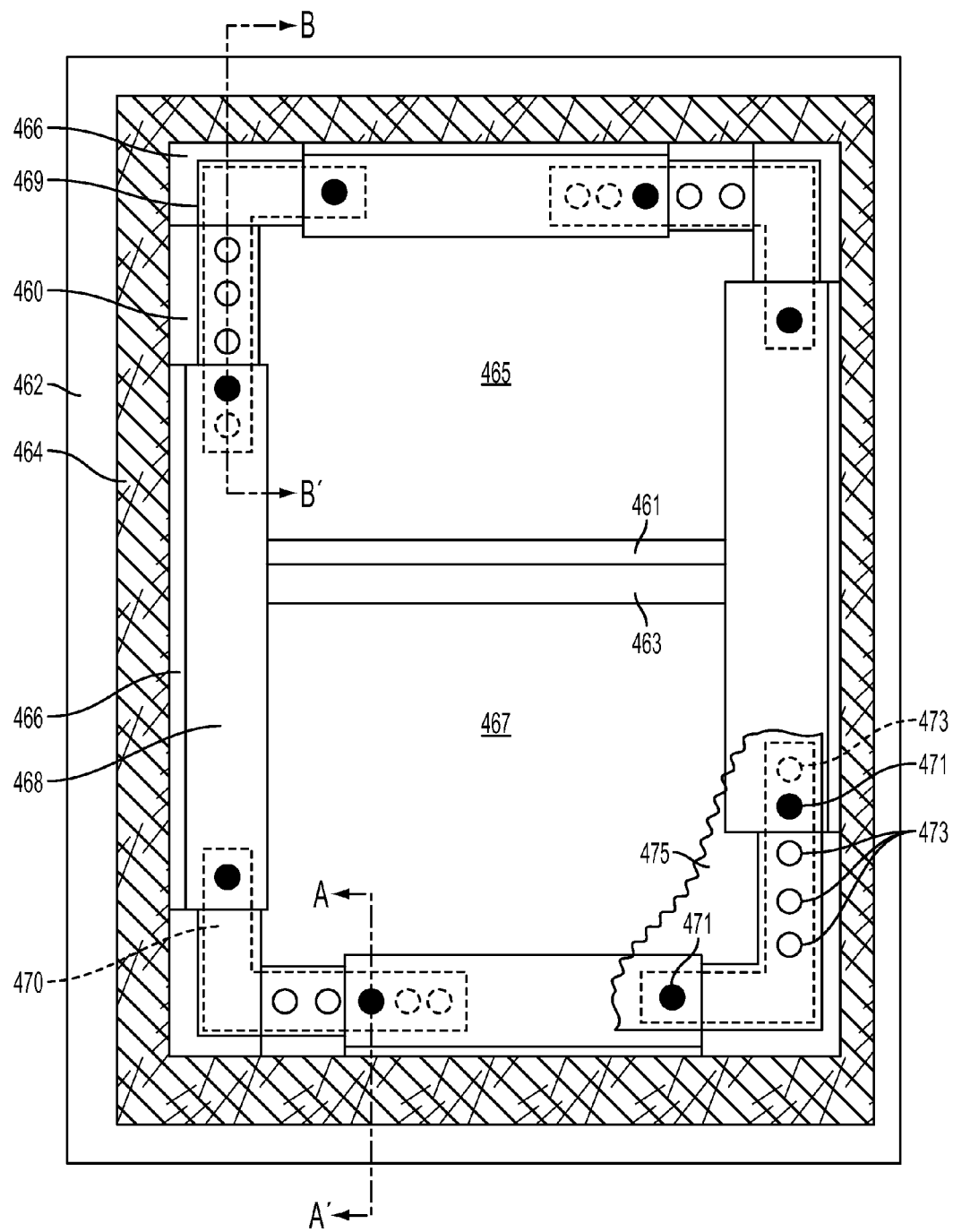
FIG. 21 is a diagram illustrating an example mounting scheme in accordance with the present invention.

A diagram illustrating an example mounting scheme in accordance with the present invention is shown in FIG. 21. An embodiment of window thermal insulation according to the invention is shown mounted in a frame casing 464 of an existing window opening structure to be insulated. Four individual straight linear structural groove members (not shown) are arranged in successive longitudinal end to end relation for forming a perimetric selectively sized and right rectangularly shaped generally planar support in conjunction with selectable multi-position right angle connectors 470 and compressibly conformable material 466 which defines a window space formed by plastic sheet 475 therewithin and which correspondingly has an outer perimetric edge portion or outside boundary wall surface at the outermost point of its periphery.

Figure 22:
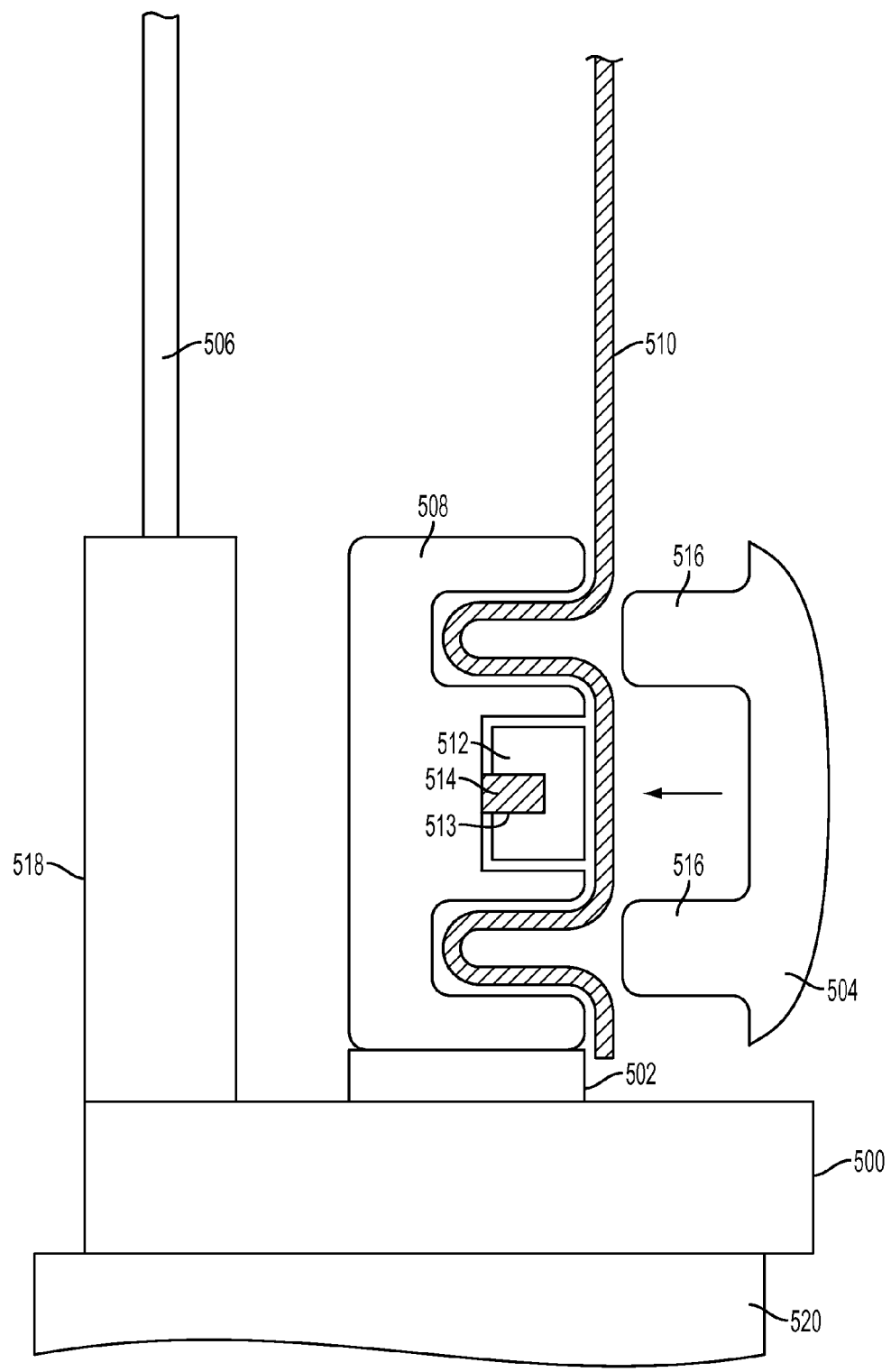
FIG. 22 is a diagram illustrating the cross sectional view of slice A-A' of FIG. 21 in more detail.

Retaining groove means 508 shown in FIG. 22, for example in the form of straight linear internal cavities, are disposed to the exterior side of the plastic sheet and spline snap-in cover 468 shown in FIG. 21 and may extend throughout the length of groove means on each side of the support. Selectable multi-position right angle connectors 470, located at each corner of the support, engage groove means 508 as shown in FIG. 22, by means of male position selector 514. The male position selector may, for example, be a pin, dowel, screw or bolt arrangement as a separate part or as a portion of the groove member, that fits into or through cavity or hole 471, leaving cavities or holes 473 unoccupied. The length of a support side may be changed by placing the male position selector one of the cavities or holes 473. Once placed in position, the groove and right angle connectors are covered by fitting spline 468 into the groove means and placing foam or other compressibly conformable material 466 at the corner and highly compressible material 460 within each edge, each having slit or channel 469, for example as described below.

While the support described above comprises fitting the spline into the groove by a force in the exterior direction, those skilled in the art will appreciate that a similar mounting arrangement may be provided in which the spline fits into the groove by an outwardly applied force wherein the groove and spline are rotated ninety degrees from that described. When such outwardly applied force is used for mounting, it is preferable that the plastic sheet path through the groove means be such that the plastic sheet edge is accessible and enables insertion of the spline. Similarly, the direction of insertion of the male position selector may also be rotated ninety degrees from that described. In addition, it will be appreciated that the relative positions of the groove means and spline means may be interchanged.

Two embodiments will now be described, a single groove/spline and a double groove/spline. Referring to FIG. 22, a cross-section, at plane A-A' in FIG. 21, of a general double groove/spline mechanism, prior to sealing, for supporting a plastic sheet 510 over a window 506 and sash rail 518 in wall 520 and sealing against an inward facing frame casing surface is shown. The plastic sheet 510 is held in the snap-in groove/spline. The groove snap-in member 508 is pressed toward the frame casing (in this view, the sill or stool 500) due to the positioning of the selectable multi-position right angle connectors 512 located at each corner of the support arrangement. When pressed into the frame casing, the perimeter compressibly conformable material 502 is compressed to form a seal by conforming to the surface of the frame casing.

As shown in FIG. 21, the plastic sheet 475 is held by the interlocking groove/spline along most of each of the four sides of the support shown. When the plastic sheet is held in the groove/spline, the plastic sheet forms a corner, which may be formed by folding of the plastic sheet, near the intersection of perpendicular grooves at the corners of the support due to being forced into each groove. It is noted that the engagement profiles of the groove 508 and spline 504 shown in FIG. 22 may be modified by any of several means known in the art for improving the tautness of the engaged sheet, such as, for example, to provide a force on the plastic sheet which is effective in taking up any slack that may exist in the plastic sheet, for example as described for FIGS. 5A and 5B in cols. 5 and 6 of U.S. Pat. No. 4,189,880. It is also noted that although groove snap-in member 508 is shown in a spaced apart relationship to sash rail 518, groove snap-in member 508 may abut sash rail 518 and may also have a depth chosen to provide a distance between plastic sheet 510 and window pane 506 that minimizes or eliminates convective currents in the space between plastic sheet 510 and window pane 506.

Figure 23:
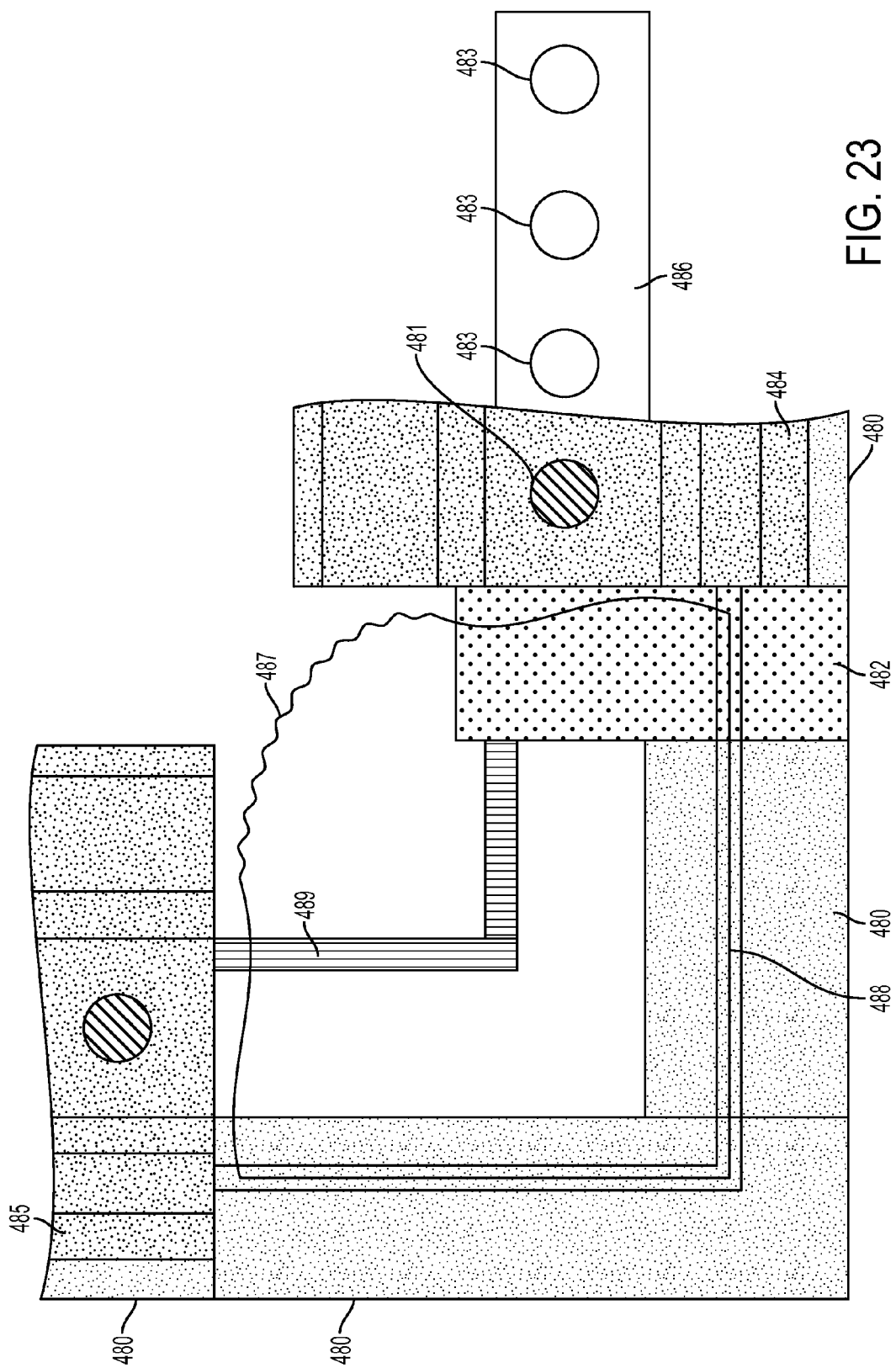
FIG. 23 is a diagram illustrating an example mounting scheme of FIG. 21 in more detail.
Figure 24:
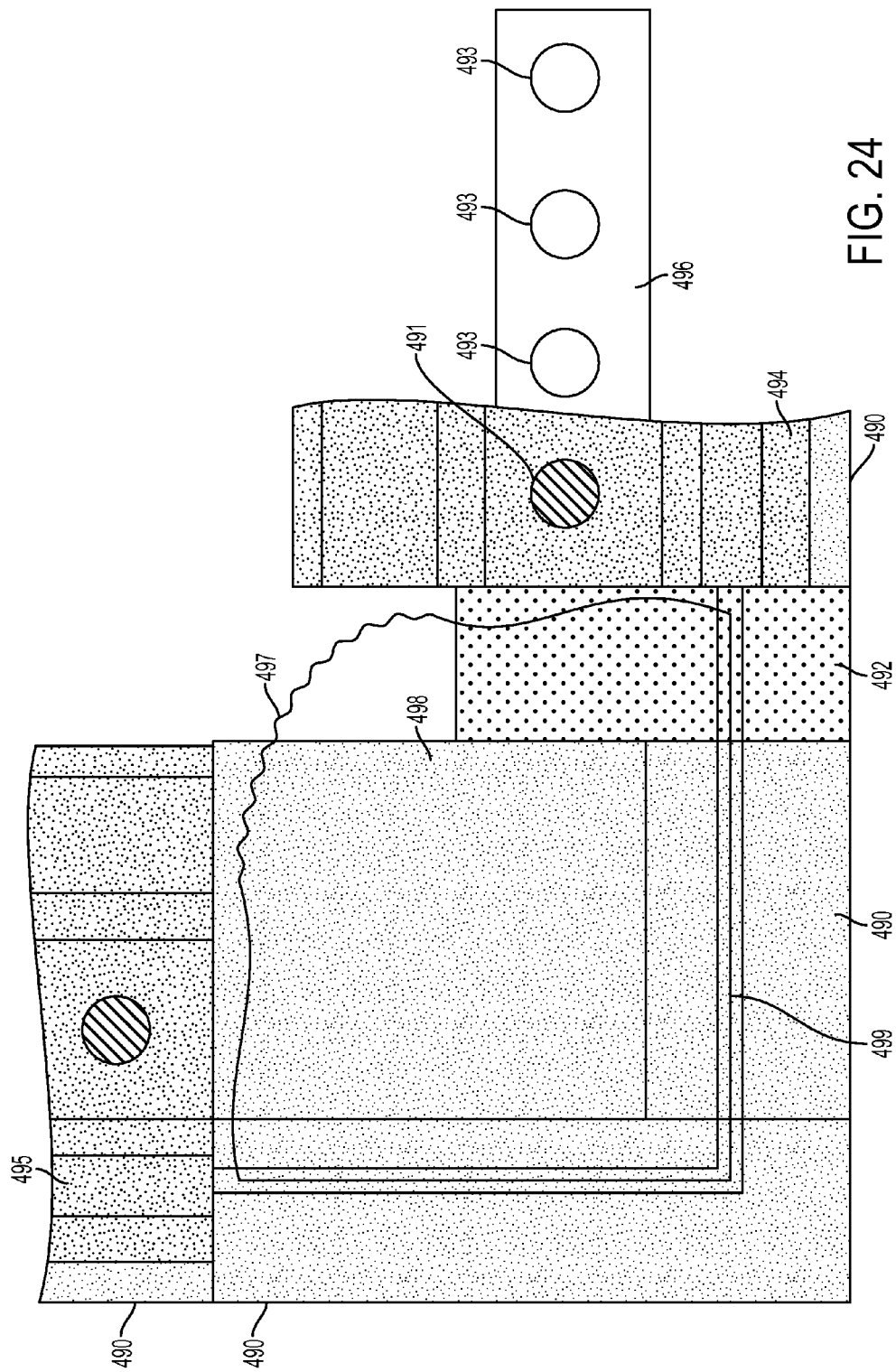
FIG. 24 is a diagram illustrating an example mounting scheme of FIG. 21 in more detail.

To seal and accommodate the plastic sheet corners, corner sealing compressible parts having compressible channels extending between the ends of groove members may be used as shown in FIGS. 23 and 24. FIGS. 23 and 24 show embodiments of the present invention, omitting the spline snap-in covers for clarity. In both of these embodiments, plastic sheet 487 or 497 is engaged in groove snap-in member 484 or 494 by spline snap-in covers (not shown) and plastic sheet 487 or 497 exterior face may seal against one or more of channel 488 or 499 walls in compressibly conformable foam 480 or 490 and the portion of interior face of highly compressible foam 482 or 492 that is inward of channel 488 or 499. While foam 480 and 482 or 490 and 492 are shown as three distinct parts, the function of these parts may be accomplished by one part or two parts having comparable overall shape as the parts shown. To aid in conforming and sealing to the entire length and corner of channel 488 or 499, plastic sheet 487 or 497 may be cut and positioned, preferably to approximately bisect the corner angle of channel 488 or 499, and the corner of the inward channel if using a double groove/spline, when plastic sheet 487 or 497 is engaged. To further seal and accommodate for this folding deformation of the plastic sheet, compressible sealing material such as pile 489 (FIG. 23) or foam 498 (FIG. 24) may optionally be placed at the corner, shown in these cases for a single groove/spline mechanism.

Referring to FIG. 23, pile 489 is placed on the interior face of right angle connector 486 in the corner region between highly compressible foam 482 and orthogonal side groove means 485 such that upon engagement with spline snap-in covers (not shown), plastic sheet 487 exterior face seals against the interior faces of pile 489 and highly compressible foam 482.

Referring to FIG. 24, foam 498 is placed on the interior face of right angle connector 496 in the corner region between highly compressible foam 492 and orthogonal side groove snap-in member 495 such that upon engagement with spline snap-in covers (not shown), plastic sheet 497 exterior face seals against the interior face of foam 498 and highly compressible foam 492. Note that while highly compressible foam (482, 492), compressibly conformable foam (480, 490) and foam 498 are shown as four distinct parts, the function of these parts may be accomplished by one part, two parts, or three parts comparable overall shape as the separate parts shown.

The foam 498 or pile 489 used for sealing in the corner may be shaped to conform or attach to the right angle connector (486, 496, 528) and form an air movement inhibiting seal against the surface of the right angle connector. To minimize deleterious aesthetic impact of the compressibly conformable material, it is preferred that this material have perimeter lengths of less than about one inch and more preferably less than about one half inch when in the mounted compressed state.

It is also preferred that the amount of compression of the conformable material be limited to an amount that maintains mechanical stability of the support means. Such simultaneous friction fitting and mechanical stability may be enabled by a second compressible and/or extendable disengagably attachable length adjustment means. This second adjustment means also allows for adjustment in case of measurement error or if the support means is to be repositioned to a different part of the fenestration. This second adjustment means, when adjusted properly by the end user, enables a compression force on the compressibly conformable material when the support means is mounted. Preferably, the second adjustment means is positioned, prior to delivery to the end user, to a length that will provide a stable, snug fit along two parallel sides based on dimension information provided by the end user or analysis of a digital image as described above. Two or more, preferably insulating, removable pieces may be used instead of a single highly compressible foam piece shown, where the number of pieces is adjusted depending upon the desired position of the position selector. Further, such pieces may be designed so as to fit into the locking positions that are not covered by the spline snap-in cover strip.

The second adjustment means may be in the form of a continuously adjustable locking mechanism or discontinuously spaced locking positions, as shown for example in FIGS. 21 through 25 as a male position selector (471 481 491 514 532) and positioning cavities or holes (473, 483, 493, 513, 534) provided as part of the groove snap-in member (484, 494, 508, 538) and the right angle connector (470, 486, 496, 512, 528), at intervals that are less than or equal to the total available compressible length parallel (i.e. longitudinal or in line with the groove snap-in member and its connecting right angle connector leg) to the force applied by the second adjustment means that is available in the compressibly conformable material. If through holes are used for locking positions, it may be beneficial to provide a covers or plugs to block air flow through holes not covered by the spline snap-in cover strip (468, 504, 530).

It will be appreciated by those skilled in the art that similar functionality is derived with the male position selector associated with the right angle connector and the cavities or holes associated with the groove member. While the embodiments illustrated in FIGS. 21 through 25 describe one location for the right angle connector and male position selector with respect to the groove member, it will be appreciated by those skilled in the art that the right angle connector and male position selector may be located elsewhere in relation to the groove member such that pressure on the compressibly conformable foam is maintained when mounted.

Figure 25:
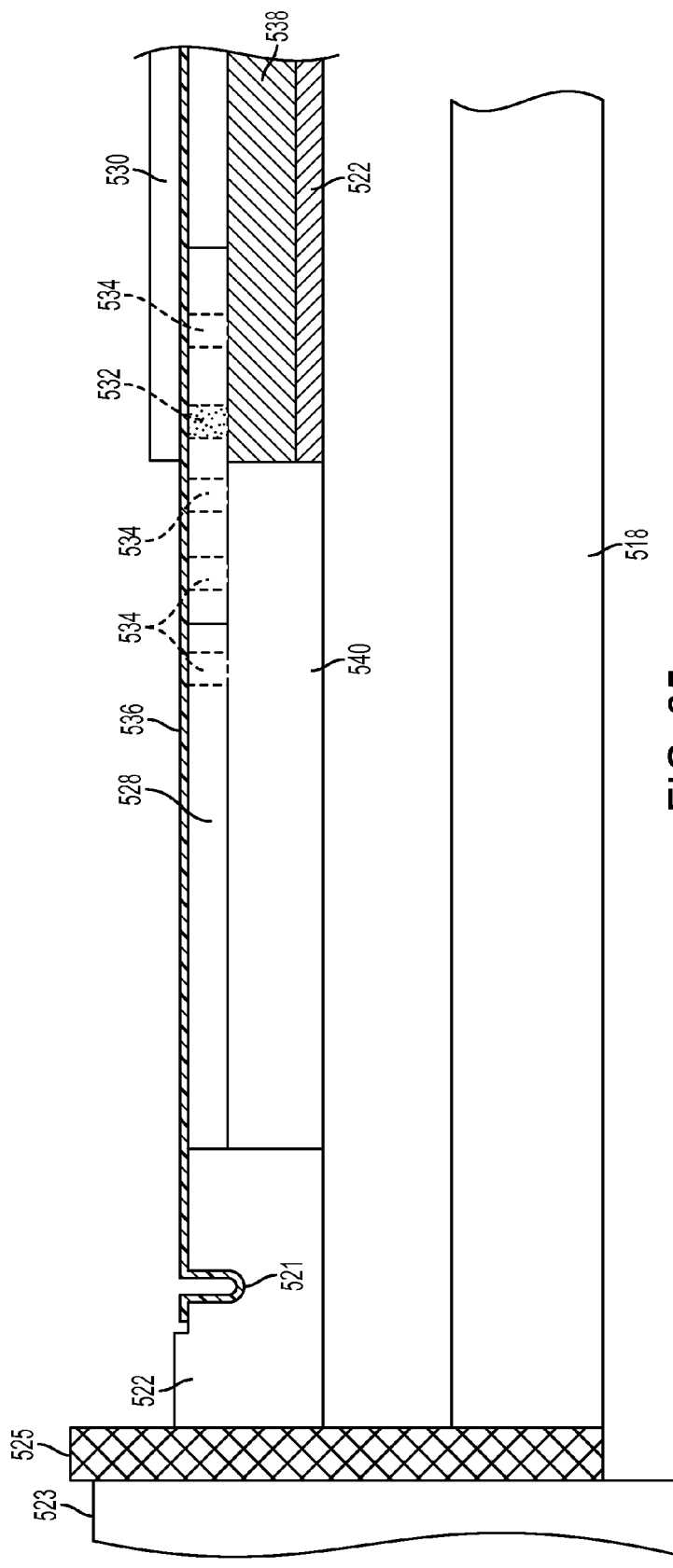
FIG. 25 is a diagram illustrating the cross sectional view of slice B-B' of FIG. 21 in more detail.

FIG. 25 shows section B-B' of FIG. 21 looking in an inward direction. FIG. 25 shows the discontinuously spaced locking positions where the groove snap-in member 538, male position selector 532 and the right angle connector 528 are positioned in the locking position that is second from the right with spline snap-in member 530 in place atop plastic sheet 536. If such a configuration were found to be too long to obtain a proper fit and seal, the male position selector of the groove snap-in member could be repositioned to provide a shorter side by placing the male position selector in the locking position that is chosen from one of positions 534 to the left of position 532. In making this adjustment, the highly compressible foam piece 540 would undergo compression relative to its state in FIG. 25. As shown in FIG. 25, if highly compressible foam 540 extends inward to an extent such as shown in FIGS. 23 and 24 (parts 482 and 492), right angle connector 528 may pass through a channel or slit 521 in highly compressible foam 540. Although highly compressible foam 540 and compressibly conformable foam 522 are distinguished from each other in FIG. 25, their functions may be provided by a single continuous part.

In one embodiment, the groove is compression fitted to the opening's flat perimeter with weatherstrip material, for example felt, foam, pile, deformable tube, or cantilevered plastic between the back face of the groove and the opening perimeter. The plastic sheet is then pressed into the groove with the spline such that an edge portion of the plastic sheet is friction fixed between an inner wall of the groove and the spline. For such pressure mounting to the opening's perimeter, using a digital image that provides the perimeter depth dimension can be used. In such cases, a second image may be used with a different reference object and dimension (e.g., an electric plug with visible prongs, blades or pins) oriented parallel to the perimeter depth and in close proximity to the perimeter opening.

In addition, the second image or a third image may also provide sash handle depth information to allow for offsetting of the sheet plane to the interior side of the perimeter opening. Optionally, the sheet edge portion folds around and is friction fit on both sides of the spline and both interior surfaces of its mating groove. Preferably, the groove and spline have projections that provide additional force to hold the edge in the groove. Optionally, a plurality of parallel plastic sheets may be held in such a configuration using parallel sets of grooves and splines in which case, parallel grooves and splines may be fabricated as single pieces or separate pieces that interconnect. While FIGS. 19 through 25 show the perimeter edge of plastic sheet ending near the frame casing, the plastic sheet may be designed and fabricated so as to extend toward the room interior to inhibit convective air flow between plastic sheet and a closed window treatment (e.g., drapes or blinds) associated with the window. Such airflow inhibition may also be accomplished by additional custom supplemental parts separate from the plastic sheet placed around the periphery of the window or window frame extending into the room interior to meet or approach a closed window treatment. In a further embodiment, the edge portion of the plastic sheet may undergo a heat treatment to provide a core set fold prior to mounting.

A further embodiment provides pressure fitting plastic sheet support means along two parallel sides of a window opening. In this case, the plastic sheet may be closed against the top and bottom rectangular sash rail by pressure fitting support means that exerts outward force while having a compressibly conformable contact with the interior face of the sash rail. The side support pieces may be configured to allow opening and closing of the sash with the plastic sheet remaining in the same relationship to the sash. The compressibly conformable contact surface of the support means on the two sides of the window opening may remain in contact with the inward facing surfaces of the window opening with the sash in either the open or closed position or in the closed position only.

Another embodiment provides clip means to hold plastic sheeting at one or more rails or stiles of a sash. The clip mechanism has one side of the clip in the interface between the sashes and the other side providing force for sealing to one or more sash faces. The vertical seals may optionally be provided as described previously with the compressibly conformable material able to slide along it contacting surface. The edge opposite and parallel to the clip may seal at the sill and head jamb or on the opposite sash rail. Such configurations may allow opening and closing of the sash of sliding, single or double hung windows with little or no change to the mounted supplemental part.

For support parts such as groove, spline or corner parts, materials that are more rigid than the plastic sheet are desirable to minimize deformation while mounted. In the present invention, such support parts along with their respective adjustable mechanisms are preferably designed, constructed and mounted so as to be held by and continuously contacting their constraint surfaces with any bowing that occurs being toward the window or sash being covered.

For very large windows, such as picture or bay windows, whose smallest dimension may exceed the dimensions available for plastic sheeting, the window may be subdivided by groove and spline pieces so that more than one plastic sheet is used to cover the entire window area. In a further embodiment, additional depth information from a digital image is used to specify use of multiple plastic sheets or an insert within the frame of a double hung window, though analogous embodiments exist for single hung and sliding windows. In this case, a digital image with a view nearly parallel to the window with the bottom sash opened may be used with additional reference objects and dimensions in addition to a view from within the window projection described above. This allows for measurements such as the bottom jamb to lower sash bottom surface, channel height, width and depth, side jamb and stop dimensions, sash overlap, distance between the top of the opened lower sash and the head jamb, sash depth or size and location of any sash stops. Software provided to the end user may be used to allow end user designation of channel edge locations and other constraints.

Multiple plastic sheets may be used with the window sashes in either a closed or open state. For example, with the window sashes in a closed state, a plastic sheet may be mounted above the lower sash to the interior of the top sash. Such mounting may use the top of the lower sash, the upper half of the interior side channels and the head jamb. Mounting may be done with adhesive or pressure mounting as described above. Since this plastic sheet may be mounted to the exterior of the opening "overlay", an above described "overlay" sheet may be used in addition to form two additional "dead air" space cavities over the top portion of the window. Also, a plastic sheet may be mounted to the exterior of the bottom sash using the bottom of the top sash, the bottom half of the exterior side channels and the bottom jamb. Analogous use of an "overlay" sheet leads to two additional "dead air" space cavities over the bottom portion of the window, though in this case the original window is between the two custom supplemental sheets. Finally, the two custom supplemental sheets each covering one sash just described may be used at the same time leading to one additional "dead air" space cavity over each of the top and bottom portions of the window with the lower sash in the closed position. Again, this configuration may be used with the "overlay" sheet to form two additional "dead air" space cavities over each of the top and bottom portions of the window. In each of the above configurations, weatherstrip material such as foam, felt, pile or rubber may beneficially be used across or within the gap between the two sashes to inhibit heat or air transfer across the interface where the bottom of the top sash and top of the bottom sash meet, or may be used in combination with interface insulating means as are known in the art. The interface where the bottom of the top sash and top of the bottom sash overlap may also be closed with the aid of a mechanism that holds the closure material over, below or in the interface area to inhibit heat or gas communication through the interface. Such a mechanism may be on the top of the bottom sash or the bottom of the top sash, with pressure against at least one of the sash surfaces bounding the gap. The mechanism may also have provision for a groove and spline mechanism to allow for sash overlay or insert of a plastic sheet for one or both sashes. Alternatively, the "dead air" space may be created using a valved enclosure that is inflated. Such an enclosure may be mounted adhesively around it perimeter or with sheet-like flaps that seal into groove/spline parts. The mounting supports aid in keeping the opposing faces of the enclosure parallel to each other. When using such an enclosure, gases other than air may be used for inflation, such as argon, xenon or carbon dioxide. When the lower sash is in an open position, the space between an opened lower sash and the upper sash may be closed while using an insert to close the open area formed by opening the lower sash. The closure for the space between the lower and upper sashes may be provided using a plastic sheet supported by adhesive or pressure mounting as described above. The sealing plastic sheet may be vertically, horizontally or angularly mounted, i.e. from the interior or top face of the lower sash to the upper sash, such that the cavity formed between the two window sashes is closed. Alternatively, a cushion, the supplemental part storage cylinder, or other blocking device may be used to decrease air communication between this space between the sashes and the interior or exterior air. A single sheet, multi-cavity element or other insert element, such as are known in the art, is inserted into or over the open portion of the window with the lower sash in a fully opened position. Such a multi-cavity element may be fabricated by combining two loops of plastic sheet, either one loop within the other or side-by-side. In each case, three parallel cavities result. In another embodiment, a single sheet may be mounted within the frame exterior to both sashes. In this case, pressure mounting using the top and bottom inward facing frame surfaces along with the inward facing side frame surface exterior to the top (outer) sash are used. If a storm window/screen system is in place, the mounting is to the interior side of such storm system. The vertical supports for such a configuration may be provided in more than one piece or as a foldable piece. Again, this configuration may be used with the "overlay" sheet and/or the "half frame" custom supplemental sheets just described to form two or three layers of additional "dead air" space cavities over the window. For the overlay and insert sheet embodiments described, it may be beneficial to incorporate pressure activated valve means to aid in decreasing any interior to exterior pressure differential across such sheets, thus minimizing noise and/or maintaining contacting integrity of the mounted sheet or element, its support and the window frame elements. Fabrication of plastic sheets may be performed using master rolls of the material desired using slitting, chopping or punching techniques known in the art. In addition, the present invention includes printing and/or embossing to allow identification of individual custom sheets. Such printing or embossing may be done before or after slitting, chopping or cutting operations. The printing or embossing may provide specific window identification information, an SPI resin identification code and recycling symbol indicating the material and its recyclability, information regarding how the sheet is to be mounted (e.g., top, bottom, right, left, inside, outside, etc.) or numbering related to installation instructions. In addition, cutting techniques such as plotter cutting may be employed in the current invention.

Also, custom assembly of the sheet may include forming a loop that may be sealed using adhesive or heat sealing or welding. Such loops may be nested or connected in series to provide multiple dead air cavities in conjunction with appropriate support mechanisms and closures. Custom sheeting may also be made into a complete dead volume enclosure with an optional valve for filling and emptying of the enclosure. Optionally, such enclosures may be filled during the fabrication process with a gas chosen by the end user, such as air, argon, xenon or carbon dioxide. When using such gases, it is preferred to pair the gas with a plastic material and thickness that will minimize loss of the gas from the enclosure. Extension flaps fabricated from the same or a different sheet material as the plastic sheet may also be attached to such loops or enclosures to aid in closing and attachment to support mechanisms.

Support mechanisms for the plastic sheet material may be fabricated in several ways. For example, for a custom overlay mounted with adhesive, a plastic sheet may undergo a printing operation in which printing of alternating adhesive/non-adhesive layer patterns may be performed. Alternatively, such a part may be fabricated by subtractive methods in which the alternating adhesive/non-adhesive layers are made in a continuous fashion and subsequently slit, chopped and/or punched to provide the desired custom pattern and adhered to the plastic sheet. When fabricating an alternating adhesive/non-adhesive layer pattern, it is useful to provide knurling or other easily separable tabs at least one portion of each non-adhesive layer to aid in the removal of individual layers of adhesive between uses. Other support mechanisms include hook/loop (Velcro) connections or zipper type connections including plastic zippers such as those used to seal plastic bags and heavy duty plastic zippers such as Maxigrip zip closures (ITW) having one side of each pair adhesively, melt or solvent seal connected to the sheet and one side adhesively, melt or solvent seal connected to the window component (e.g., sash or frame). When mounting is to be achieved with a groove and spline configuration, the groove and spline may be fabricated by extrusion or three-dimensional printing methods. Optionally, such extrusion or printing may include a compressible portion to act as a portion of the compressible seal of a compression fit custom supplemental part. If extruded, the groove and spline may be chopped or cut using methods known in the art to an appropriate length for stable and snug fit based on the measured dimension provided. Optional corner pieces that form a seal at the corners of compression fit custom supplemental parts may be fabricated by injection molding or three-dimensional printing methods. As part of extrusion, injection or 3D printing operations, printing, embossing or other means of part identification, material type and recyclability, installation instructions and mating indicator may be imparted on each such part. Other aspects of fabrication may include the chopping, cutting or slitting of weatherstrip materials, application of adhesives and associated protective covers for applied adhesives and packaging material. Pre-attachment of compressibly conformable foam or other weatherstrip material to a custom supplemental support part during fabrication may be performed to minimize installation complexity. Such weatherstrip material may be adhered or, preferably fit into an outward facing channel of the custom supplemental support part to aid in end-of-life recycling or re-use of the materials. Packaging may be fabricated from the same material as the plastic sheet and formed into a container that may be sized or may telescope to a dimension of the window for which the custom supplemental parts are intended. The packaging container is preferably fabricated from a reusable or recyclable transparent material that may be used for storage of the custom supplemental parts or as a custom supplemental part by the end user. Additionally, some of the custom supplemental parts may be pre-assembled prior to their placement in the container. For example, in the case of a pressure fit system, the short edges of the plastic sheet may be inserted into their respective groove and spline assembly and rolled up to fit into the container. The other custom supplement parts are placed into the container and transported to the end user for installation.

Storage of the custom supplemental parts, including plastic sheet and support materials, is preferably done by disassembly and placing in a plastic cylindrical tube or box that may be sized to have its longest dimension fitting to the inside width or height of the window frame. Disassembly may be complete or partial, as long as all of the custom supplemental parts may be fit into the storage container. For example, the top and bottom groove/spline assembly may remain attached to the sheet during storage, so long as the sheet may be rolled into a tube shape without creasing. The storage container may be made to be telescoping to allow for change of its longest dimension for storage or use as part of the window insulation.

The service provider may provide installation assistance support to the end user by a number of means. Customized installation instructions may be provided in written form based on the digital images in hardcopy form or a digital document. Such customized instructions may show a progression of images based on those supplied by the end user so the end user has a custom representation of the progression of the installation for comparison. Alternatively, such a progression of the installation may be provided by customization of a generally applicable video of the installation process. A service provider authorized representative may be physically present to perform or assist with the installation. Such assistance is facilitated by the fact that the representative has access to the digital images related to the installation. Alternatively, such a representative may assist remotely via telephone or Internet based video conference service such as Apple's Face Time or Microsoft's Skype.

When an end user no longer wishes to use the custom supplemental parts, for example due to moving to a different location, the custom supplemental parts may be recycled or re-used by a subsequent occupant at the location of the installation. When recycling the custom supplemental parts, such recycling may be achieved by the end user through a local recycling program, sent to a local retailer for recycling or sent to the service provider for recycling. When sent to the service provider for recycling, the custom supplemental parts may also be resold, with refurbishment or remanufacturing if necessary, to a different end user having similar, though perhaps slightly different, design requirements as the original end user. For example, the shape of a plastic sheet might be altered slightly by cutting along an edge while the support means are re-used without modification. Alternatively, the service provider may separate the custom supplemental parts from multiple end users so that such parts may be recombined in different combinations to meet the design requirements of a new end user. Another recycling route that may be used by the service provider or fabricator is to have the received parts enter a recycling stream in which the parts re-enter a manufacturing stream at a raw material stage where they are reformed into a new shape or part.

The materials used for custom supplemental parts may be chosen to optimize certain characteristics, depending on the part and end user design choices. Preferred materials are those that can be readily recycled, such as but not limited to flexible glass, polyethylene terephthalate, polyethylene, low density or linear low density polyethylene, high density polyethylene, polypropylene, polyvinyl chloride, acrylic such as methyl methacrylate, nylon, acrylonitrile-butadiene-styrene, cellulose acetate, polystyrene and rubber modified polystyrene, polyurethane, and polylactic acid. For use as plastic sheet, materials that are also flexible and may be rolled for storage and transport are preferred. If transparency of the window opening is desired, materials having relatively high transparency, clarity and gloss as well as low haze are useful in the present invention. Additionally, materials to which surface treatments may be applied are particularly useful when emissivity and/or reflectivity control is desired. For use as corner, groove or spline parts, materials having sufficient stiffness to maintain sealing against the sealing surface and mechanical stability is desirable. Because the custom supplemental parts may be exposed to sunlight for extended periods, ultraviolet stabilizers may be added to the materials to maintain optical and mechanical properties.

For plastic sheet parts, mechanical, optical and thermal conduction properties of the sheet may be optimized in different ways depending upon the end user product choices. For cases in which the sheet is fit into a groove and spline configuration, the plastic must have mechanical properties allowing it to have a small radius of curvature without fracturing. At the same time, having a coefficient of friction that allows for both holding the plastic sheet in place and adjustment by the end user with the plastic sheet mounted is desirable. When the sheet is designed with a hatch, using a tear resistant material is advantageous. When used to the exterior of the original window, high impact resistance may be desirable.

While the embodiments described have focused on fenestration related objects, it will be appreciated that the present invention may be used for designing and fabricating custom supplemental parts for other objects. For example, similar "dead air" spaces may be formed when using a door or wall as one side of the "dead air" space in the present invention. In addition, original or replacement windows with associated framing may be designed and fabricated based on the method of the present invention where the adjustable dimensions are made adjustable by the thickness of materials surrounding the frame.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A computer implemented method of determining measurements for designing a part, said method comprising:
    obtaining a digital image, on a computer, containing at least a primary object constraint dimension to which said part is to conform and a standard reference object having one or more readily identified known linear dimensions viewable in said digital image;
    detecting, on a computer, said reference object in said digital image utilizing at least one of color, edge or shape detection;
    determining, on a computer, pixel dimensions of said standard reference object based on said one or more known reference object dimensions and calculating a calibration factor therefrom using said one or more known linear dimensions;
    calculating, on a computer, a planar constraint dimension from said digital image in accordance with said calibration factor; and
    wherein said digital image is obtained substantially within a projection of said primary object.

2. The method according to claim 1, further comprising determining the dimensions of a part adapted to fit within said calculated constraint dimension.

3. The method according to claim 2, further comprising calculating a cost for said part.

4. The method according to claim 1, further comprising applying distortion correction to digital image before calculating said constraint dimension.

5. The method according to claim 1, wherein calculating comprises at least calculating a Hough transform from said digital image.

6. The method according to claim 1, wherein said standard reference object dimension is substantially parallel to said constraint dimension.

7. The method according to claim 1, wherein said standard reference object dimension is made substantially parallel to constraint dimension utilizing one or more two dimensional transformations.

8. A method of obtaining a measurement from a digital image, said method comprising:
    obtaining said digital image containing the measurement to be obtained and a standard reference object having one or more readily identified known linear dimensions viewable in said digital image and located substantially in the plane of the distance to be measured, said measurement plane nearly parallel to the digital image plane;
    correcting distortion of said digital image;
    detecting said reference object in said digital image utilizing at least one of color, edge or shape detection;
    determining pixel dimensions of said standard reference object based on said one or more known reference object dimensions;
    calculating a pixel calibration factor relating the known standard reference object pixel dimensions to the corrected digital image; and
    determining said measurement in accordance with said pixel calibration factor.

9. The method according to claim 8, wherein the ratio of two standard reference object dimensions is used to determine the reference object pixel dimensions for calculating said pixel calibration factor.

10. The method according to claim 8, further comprising providing a user an ability to identify locations on the digital image to be used for calculating constraint dimensions.

11. The method according to claim 8, further comprising storing the digital image such that both the service provider and the end user may access the digital image.

12. The method according to claim 8, further comprising displaying the measurement over the digital image.

13. The method according to claim 8, wherein said digital image is obtained from video.

14. The method according to claim 8, wherein said digital image is obtained from an image capture device.

15. The method according to claim 8, wherein said measurement is displayed on the device used to capture said digital image.

16. The method according to claim 8, wherein distortion correction occurs prior to image capture.

17. A system for measuring a distance in a digital image, comprising:
    a receiving unit operative to receive a digital image containing said distance to be measured and a standard reference object having one or more readily identified known linear dimensions viewable in said digital image and located substantially in the plane of the distance to be measured, said measurement plane nearly parallel to the digital image plane;
    an image processing unit operative to:
        correct distortion of said digital image;
        detect said reference object in said corrected digital image utilizing at least one of color, edge or shape detection;
        determine pixel dimensions of said standard reference object based on said one or more known reference object dimensions;
        calculate a pixel calibration factor in accordance with said standard reference object pixel dimensions; and
        calculate said distance in accordance with said pixel calibration factor.

18. The system according to claim 17, wherein said image processing unit is operative to calculate a Hough transform from said digital image.

19. The system according to claim 17, further comprising storage media for storing at least one of said digital image, corrected digital image and calculated distance.

20. The system according to claim 17, further comprising a viewing unit operative to permit a user an ability to identify locations on at least one of said received digital image and said corrected digital image to be used for measuring said distance.

* * * * *